Dec. 9, 1958  B. M. J. LECLERC ET AL  2,863,604
ELECTRONIC CALCULATOR FOR MULTIPLICATION AND DIVISION
Filed Sept. 23, 1952  17 Sheets-Sheet 1

INVENTORS
BRUNO MARIE JEAN LECLERC
HENRI GÉRARD FEISSEL
PIERRE JACQUES CHARLES CHENUS
BY Haseltine, Lake & Co.
AGENTS Dec. 9, 1958  B. M. J. LECLERC ET AL  2,863,604
ELECTRONIC CALCULATOR FOR MULTIPLICATION AND DIVISION
Filed Sept. 23, 1952  17 Sheets-Sheet 2

INVENTORS
BRUNO MARIE JEAN LECLERC
HENRI GÉRARD FEISSEL
PIERRE JACQUES CHARLES CHENUS
BY Haseltine, Lake & Co.
AGENTS Dec. 9, 1958　　　B. M. J. LECLERC ET AL　　　2,863,604
ELECTRONIC CALCULATOR FOR MULTIPLICATION AND DIVISION
Filed Sept. 23, 1952　　　　　　　　　　　　　　17 Sheets-Sheet 3
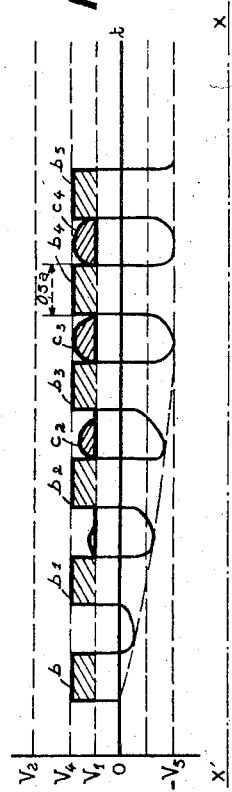
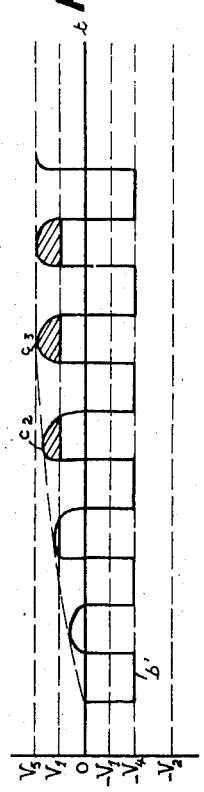
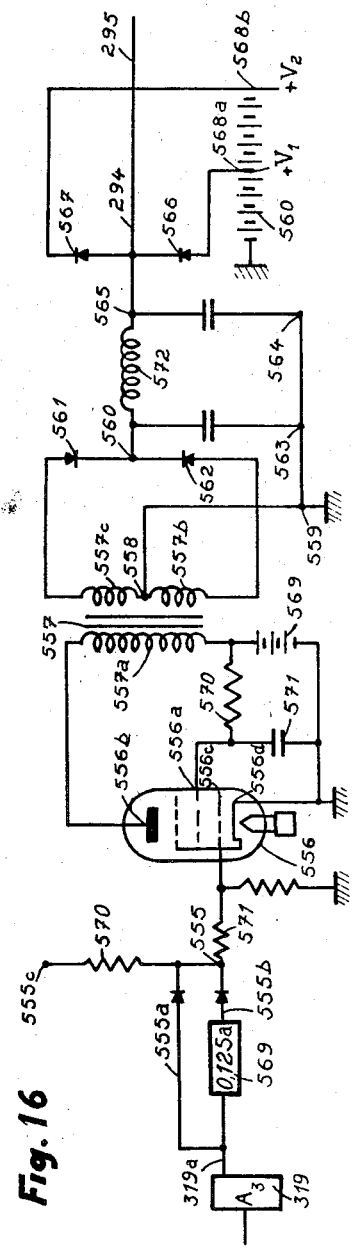
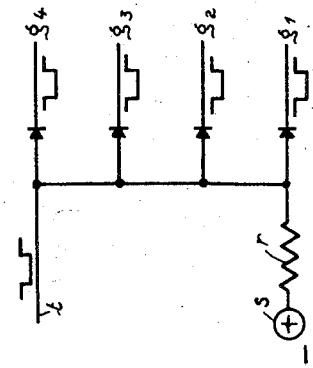
INVENTORS
BRUNO MARIE JEAN LECLERC
HENRI GÉRARD FEISSEL
PIERRE JACQUES CHARLES CHENUS
BY Haseltine, Lake & Co.
AGENTS Dec. 9, 1958   B. M. J. LECLERC ET AL   2,863,604
ELECTRONIC CALCULATOR FOR MULTIPLICATION AND DIVISION
Filed Sept. 23, 1952   17 Sheets-Sheet 4

INVENTORS
BRUNO MARIE JEAN LECLERC
HENRI GÉRARD FEISSEL
PIERRE JACQUES CHARLES CHENUS
BY
Haseltine, Lake & Co.
AGENTS INVENTORS
BRUNO MARIE JEAN LECLERC
HENRI GÉRARD FEISSEL
PIERRE JACQUES CHARLES CHENUS
BY
Haseltine, Lake & Co.
AGENTS Dec. 9, 1958  B. M. J. LECLERC ET AL  2,863,604
ELECTRONIC CALCULATOR FOR MULTIPLICATION AND DIVISION
Filed Sept. 23, 1952  17 Sheets-Sheet 9

INVENTORS
BRUNO MARIE JEAN LECLERC
HENRI GERARD FEISSEL
PIERRE JACQUES CHARLES CHENUS
BY
Hoseltine, Lake & Co.
AGENTS Dec. 9, 1958    B. M. J. LECLERC ET AL    2,863,604
ELECTRONIC CALCULATOR FOR MULTIPLICATION AND DIVISION
Filed Sept. 23, 1952    17 Sheets-Sheet 12

Dec. 9, 1958     B. M. J. LECLERC ET AL     2,863,604
ELECTRONIC CALCULATOR FOR MULTIPLICATION AND DIVISION
Filed Sept. 23, 1952                     17 Sheets-Sheet 13

INVENTORS
BRUNO MARIE JEAN LECLERC
HENRI GÉRARD FEISSEL
PIERRE JACQUES CHARLES CHENUS
BY Haseltine, Lake + Co.
                AGENTS Dec. 9, 1958  B. M. J. LECLERC ET AL  2,863,604
ELECTRONIC CALCULATOR FOR MULTIPLICATION AND DIVISION
Filed Sept. 23, 1952  17 Sheets-Sheet 16

INVENTORS.
BRUNO MARIE JEAN LECLERC
HENRI GERARD FEISSEL
PIERRE JACQUES CHARLES CHENUS
BY
ATTORNEYS

INVENTORS.
BRUNO MARIE JEAN LECLERC
HENRI GERARD FEISSEL
PIERRE JACQUES CHARLES CHENUS
BY
ATTORNEYS

United States Patent Office 2,863,604
Patented Dec. 9, 1958

2,863,604
ELECTRONIC CALCULATOR FOR MULTIPLICATION AND DIVISION

Bruno M. J. Leclerc, Fontenay-sous-Bois, and Henri Gérard Feissel and Pierre Jacques Charles Chenus, Paris, France, assignors to Compagnie des Machines Bull (Societe Anonyme), Paris, France Application September 23, 1952, Serial No. 311,072

Claims priority, application France October 4, 1951

10 Claims. (Cl. 235—61)

The invention relates to a combined arrangement for arithmetical multiplication and division, comprising a number of circulation memories, wherein the operation to be performed takes place in a number of working stages comprising different modes of circulation.

The said cyclically operating arrangement comprises at least three circulating memories adapted to store in the form of pulses coded in the binary decimal notation, the multiplier or the right-hand part of dividend in the first memory, the multiplicand or divisor in the second one, and the dividend left-hand part in the third one, a decimal computer connected to the second and third memories and forming each partial product of multiplication in the third memory by successive additions of the multiplicand to the left-hand part of a partial product previously formed in this third memory, this computer also being adapted to introduce in this third memory any partial remainder by subtracting the divisor from the partial remainder previously formed in this same memory and adjoining to the result of this or these subtractions the dividend digit of highest order stored in the first memory. This arrangement comprises also a comparator and a so-called counting and deducting device, which cooperate with the memories and the operator to stop each series of additions and subtractions when the required partial result is obtained, step selecting means for transferring one by one, in the first memory, the product digits successively formed in the second one while suppressing before each transfer, the multiplier digit taken in account in the formation of this digit. These step selecting means permit also to form each quotient digit in the first memory by unit accumulations and to set either a new partial remainder in instantaneous positions corresponding to those of divisor, or a new partial product in instantaneous positions corresponding to those of the multiplicand and the new multiplier part. After a calculation, some of the said memories may be read-out and the resulting read-out pulse trains are transmitted to the printing members of a tabulating machine to make these members print a number stored in a circulating memory.

Further features of the invention will appear from the following description:

In the accompanying drawings, which are given solely by way of example:

Figure 3 shows a switch of the gate-type comprising 4 inputs;

Figure 6:
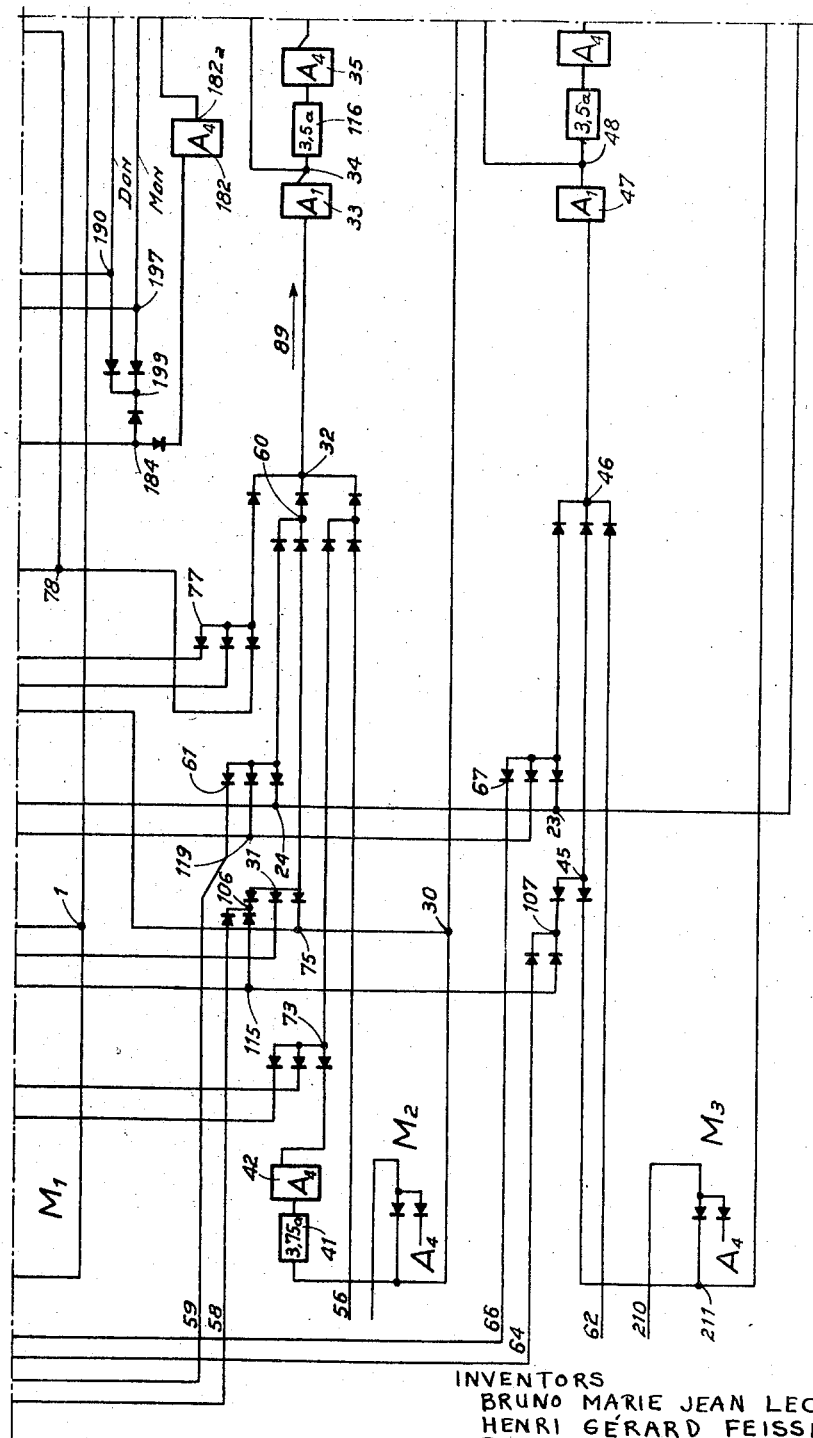
Figure 7:
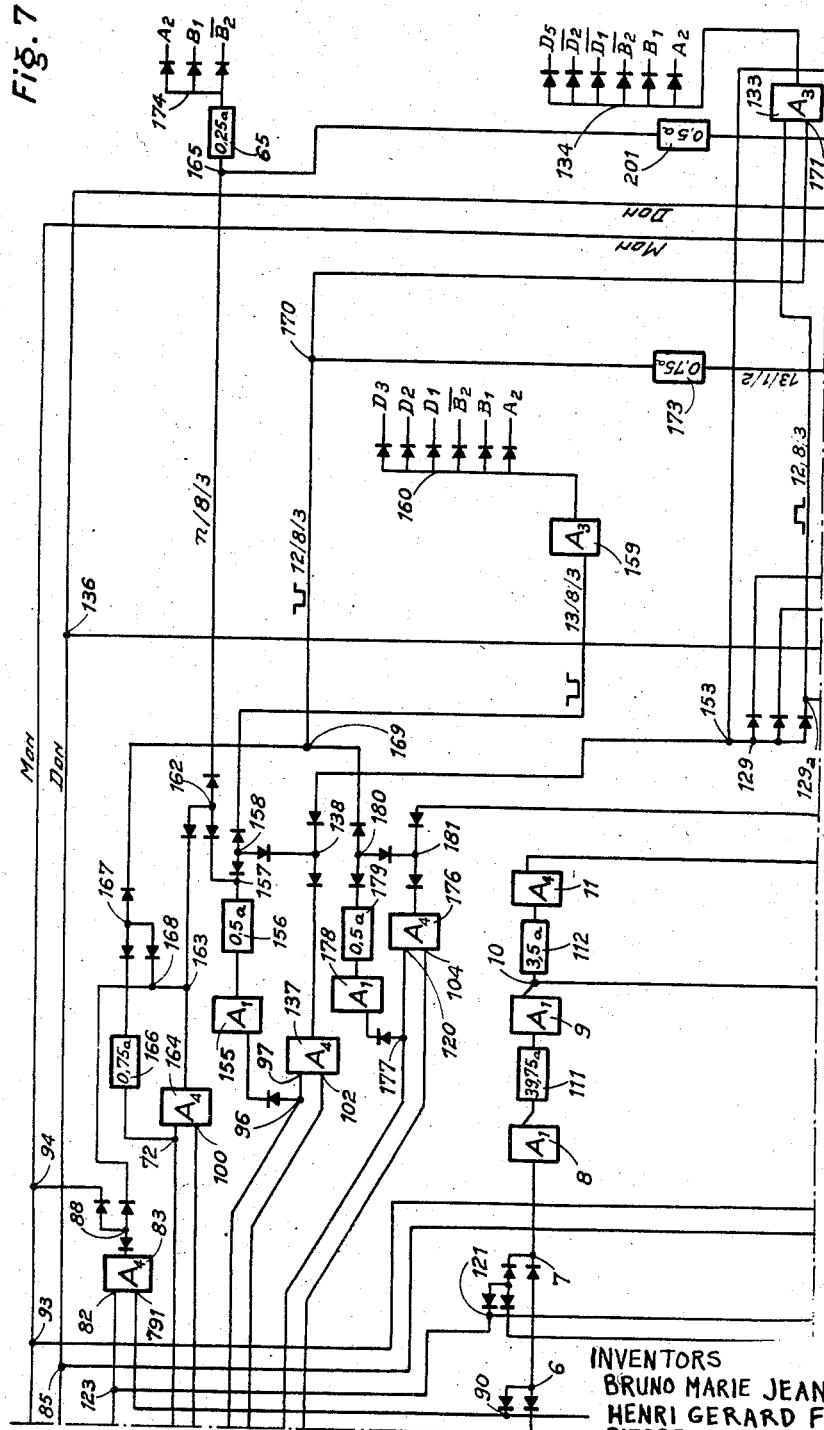
Figure 8:
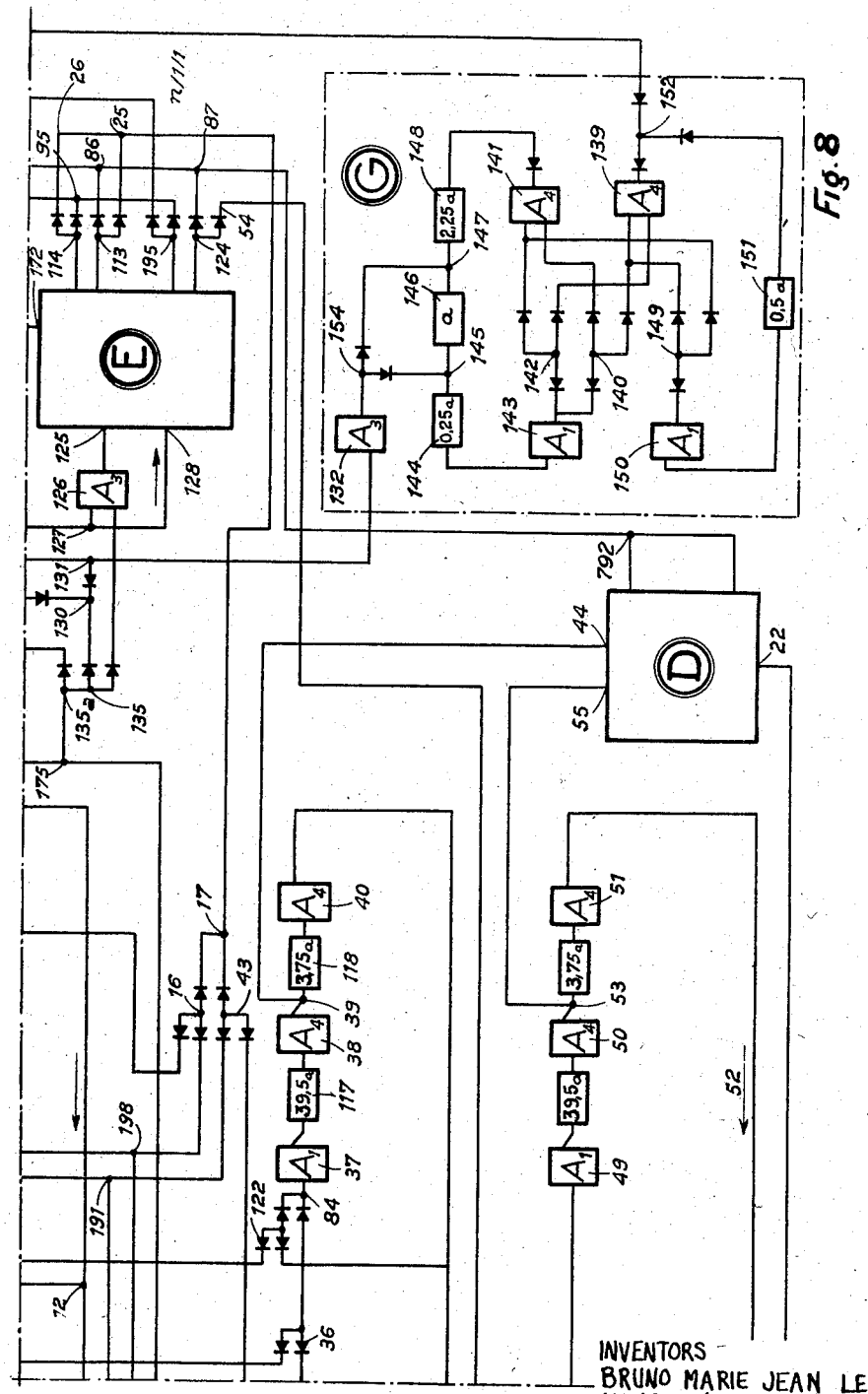
Figure 12:
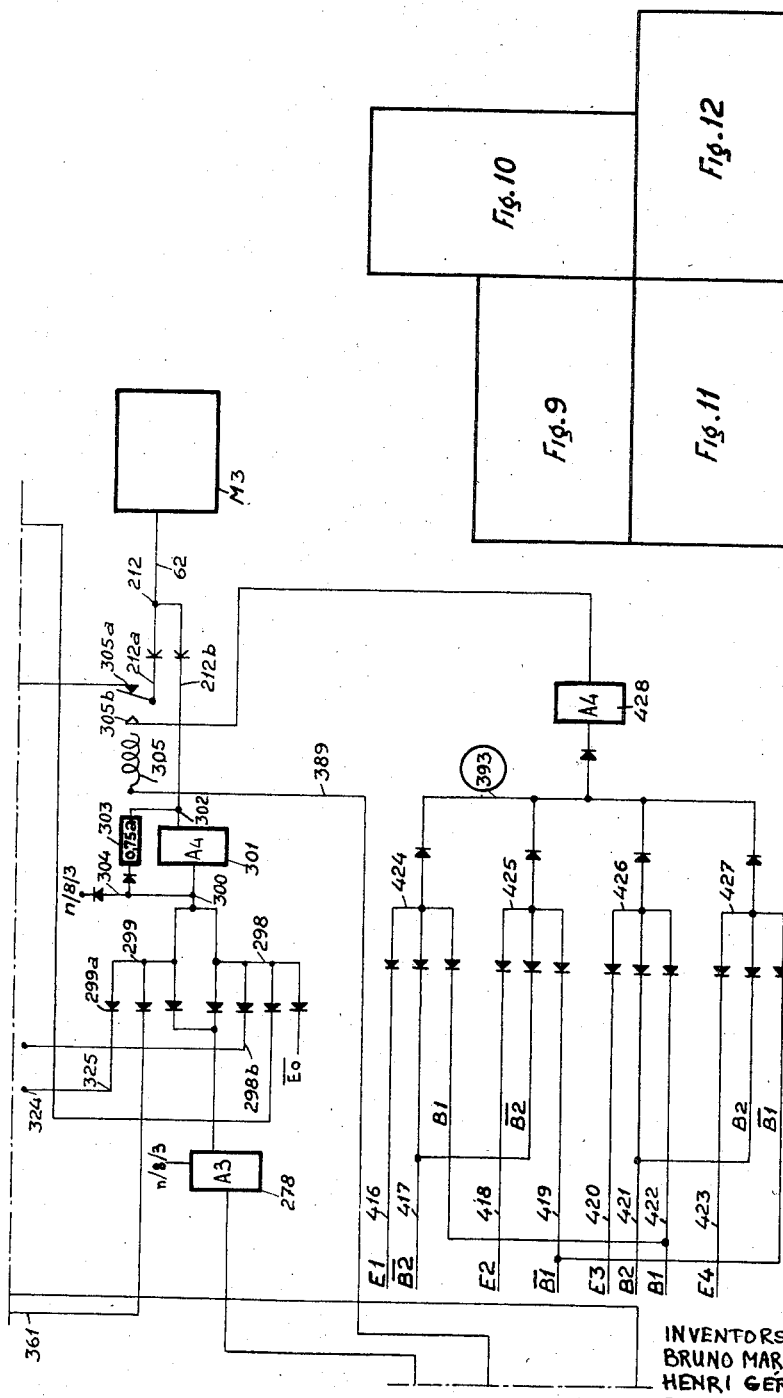
Figure 13:
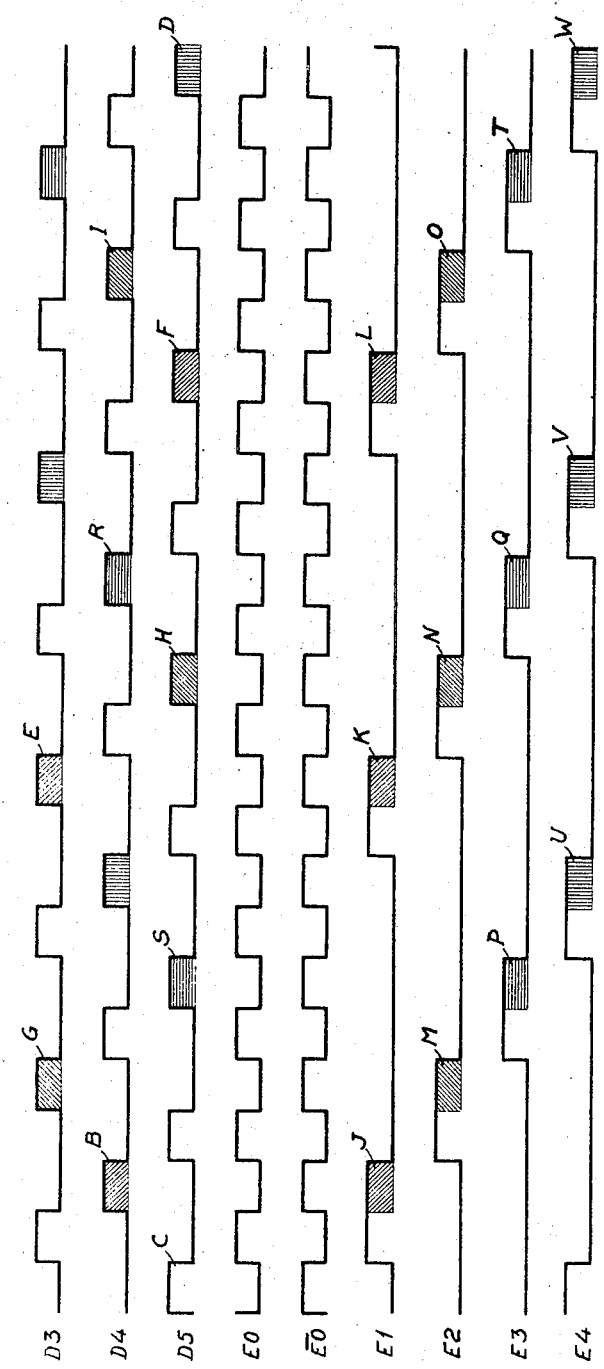
Figure 14:
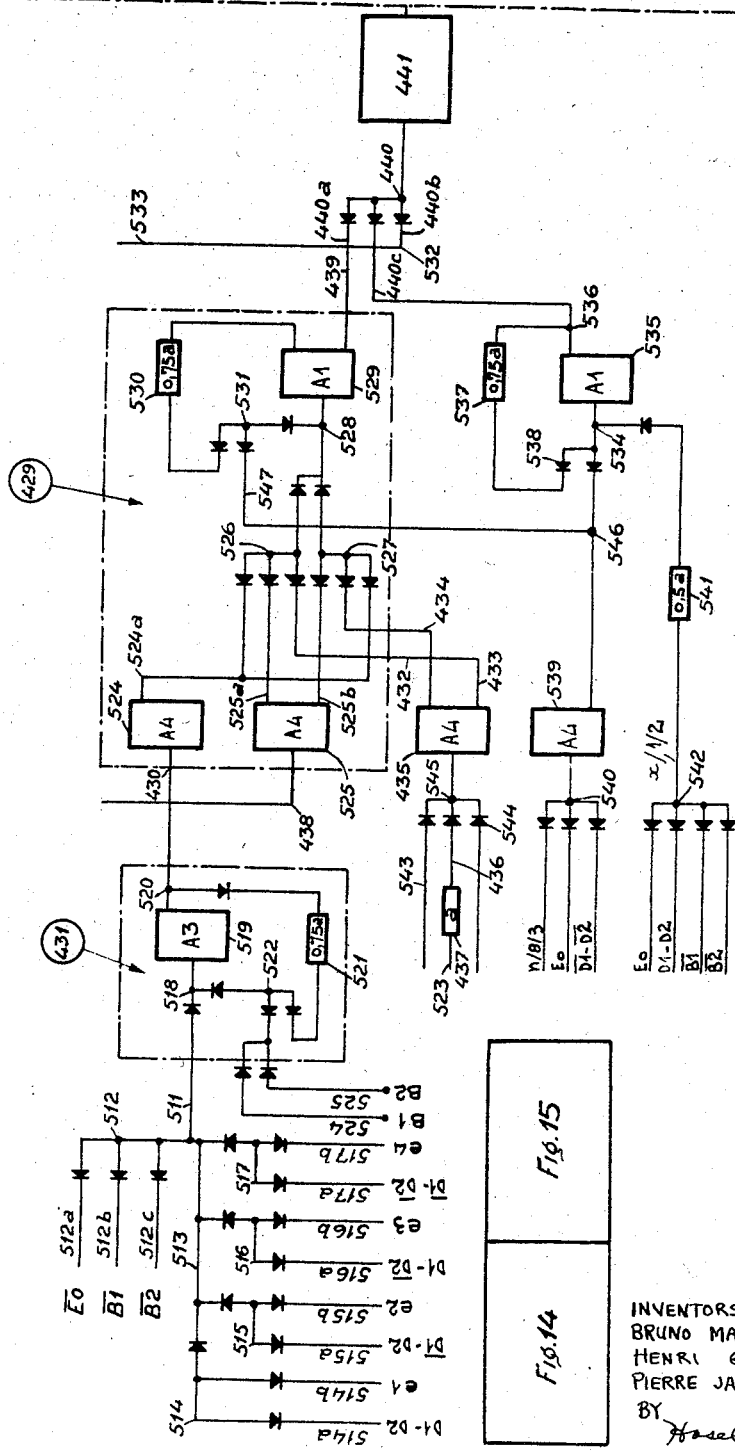
Figure 15:
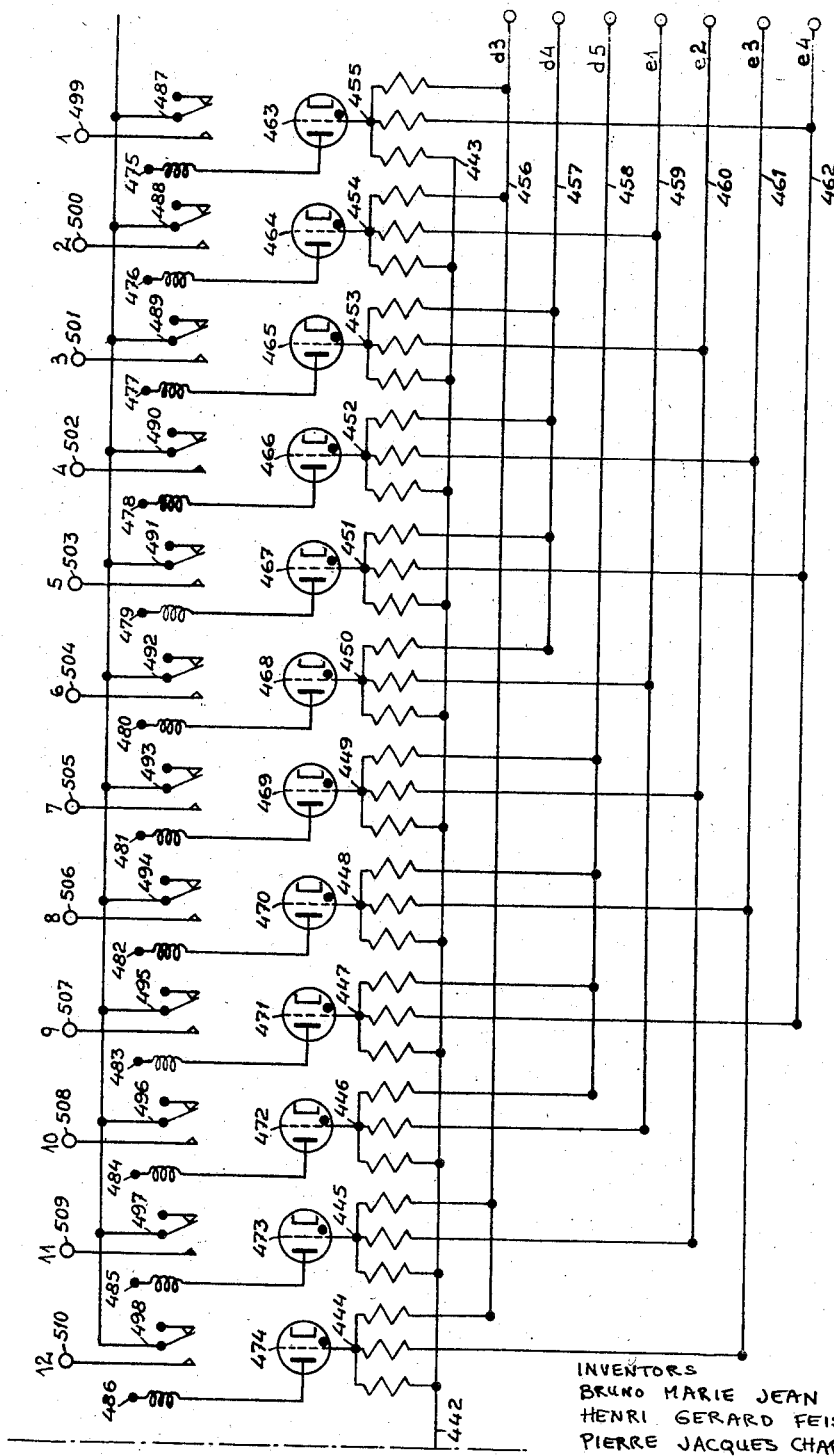
Figure 18:
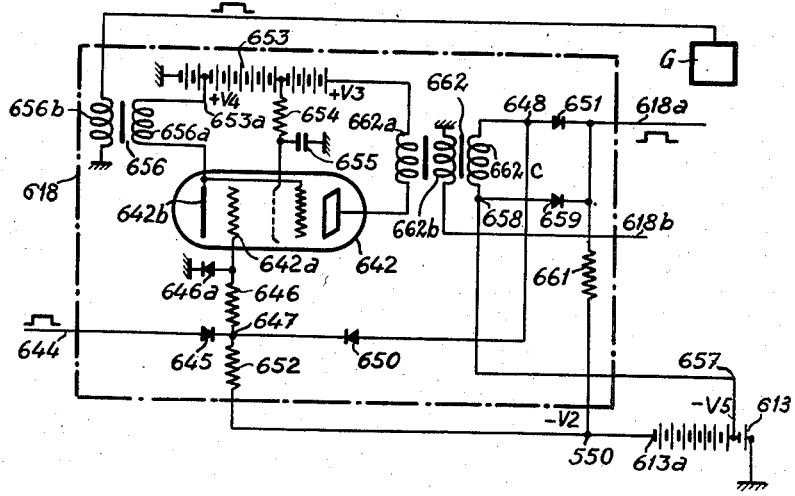
Figure 21:
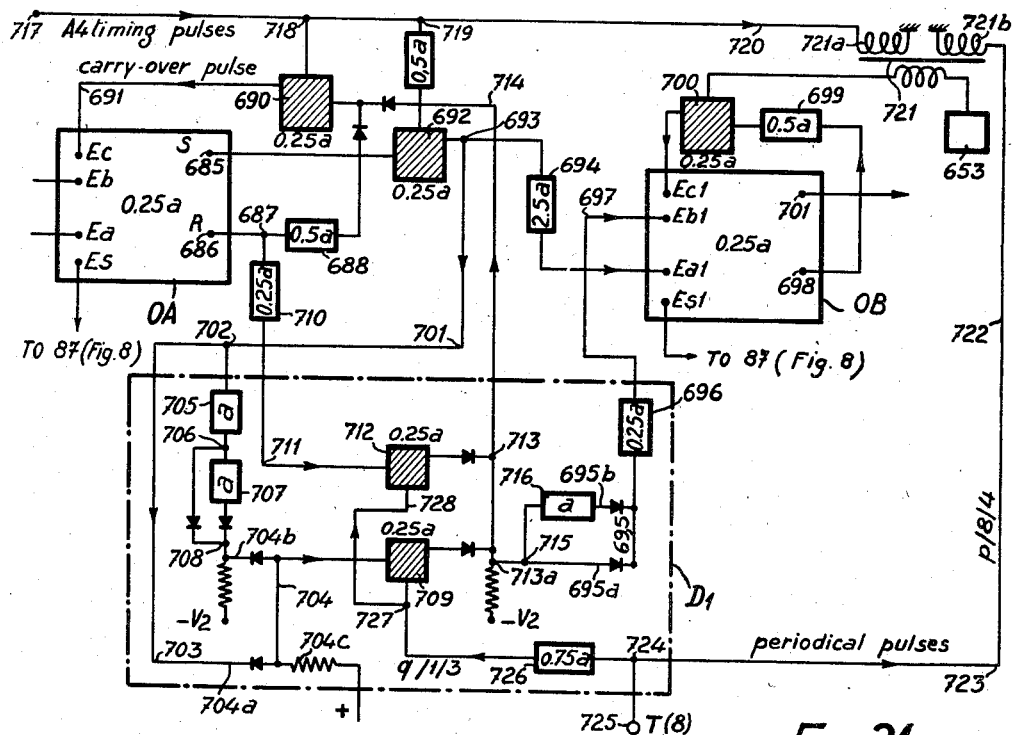
Figure 19:
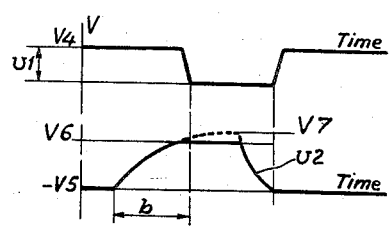
Figure 22:
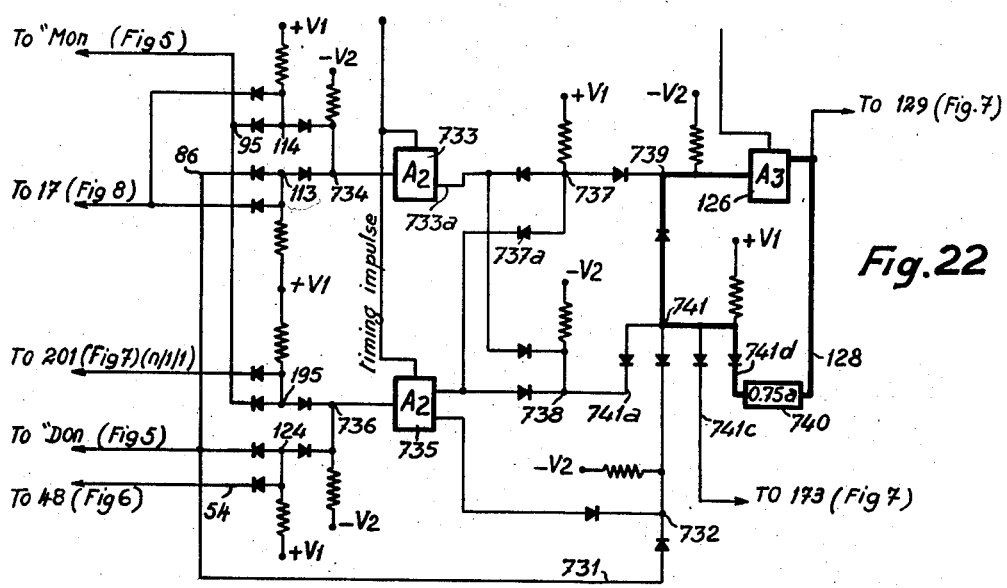
Figure 20:
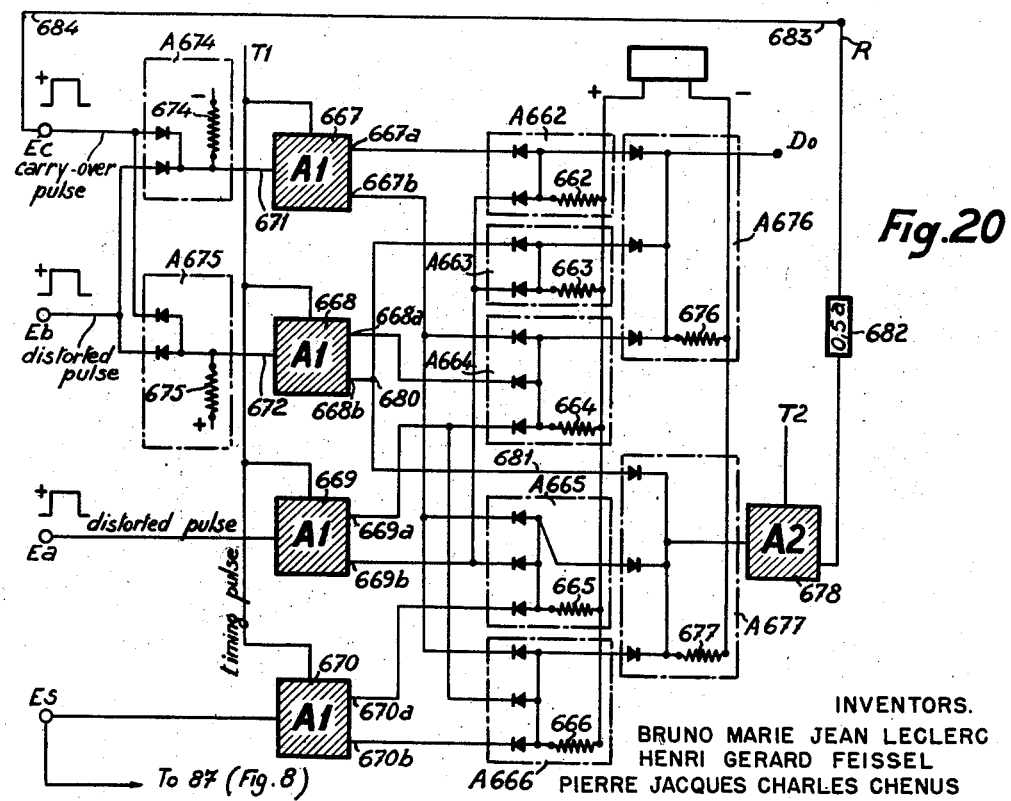

Figure 6 shows a second part of this diagram;
Figure 7 shows a third part thereof;
Figure 8 shows a fourth part thereof;
Figures 9 to 12 show a simplified diagram of a device for introducing a number into a memory having a capacity of twelve digits;
Figure 13 shows one part of the timing impulse trains, used for the introduction of data and the extraction of numbers from a memory;
Figures 14 and 15 show a simplified diagram of a device for extracting a number from a memory having a capacity of twelve digits;
Figure 16 shows the complete arrangement of a part of the device which is represented by the Figures 9 to 12;
Figures 17a and 17b are pulse diagrams which show the operation of the arrangement of Fig. 16;
Figure 18 is a diagram of a pulse regenerator of a known type;
Figure 19 shows the distorted numerical impulsions and the timing impulses represented versus time;
Figure 20 is a simplified diagram of a binary adder-subtractor of a known pattern;
Figure 21 is a simplified diagram of a decimal operator for making additions and subtractions;
Figure 22 is a diagram of a digit comparator.

The execution of a division by the apparatus according to the invention differs from the execution of a division by the conventional manual method in that the figure of the quotient being formed in the memory increases by one unit each time the divisor is subtracted from the corresponding dividend group or partial remainder, until there is thus obtained a partial remainder smaller than the divisor.

Figure 1:
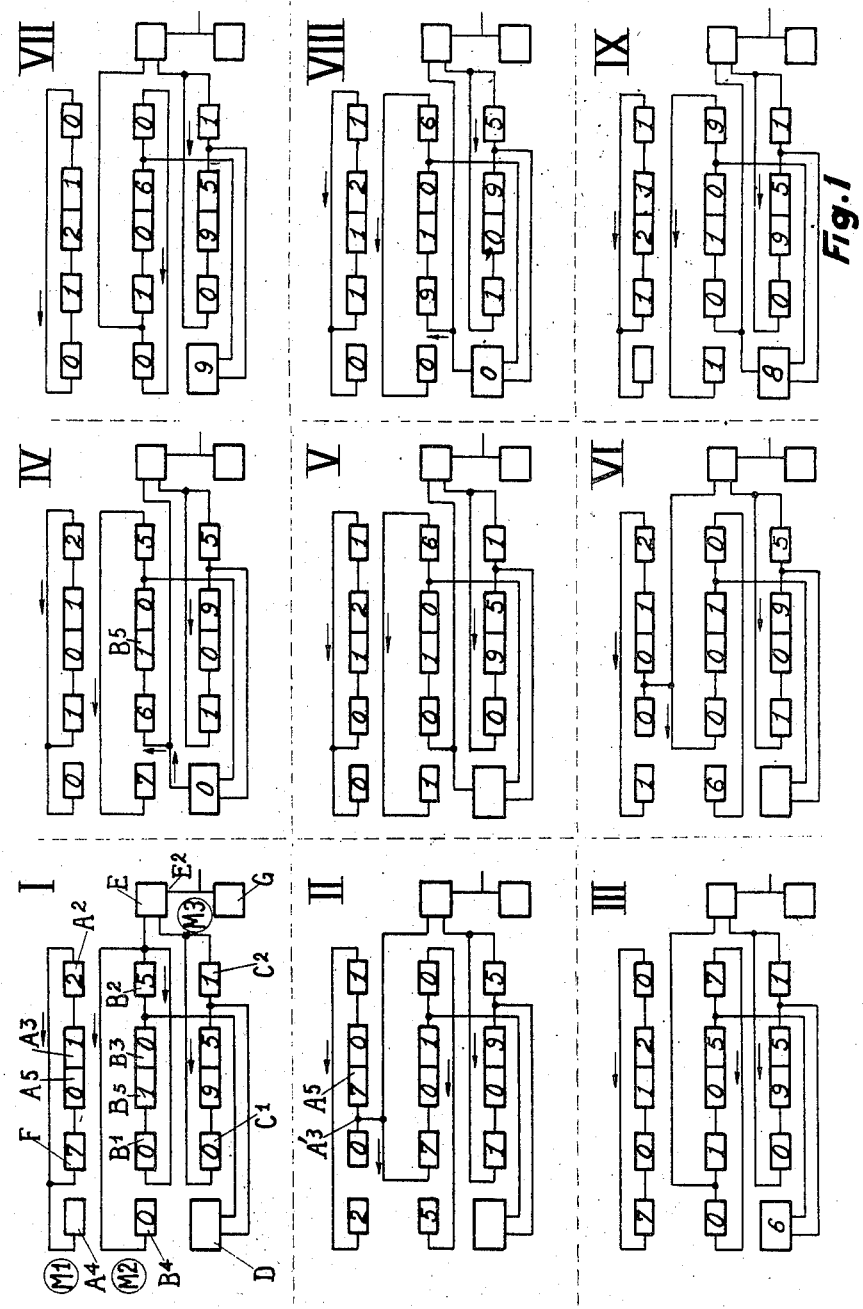
Figure 1 shows diagrammatically the connections established in nine stages of a division.

Figure 1 relates to the particular case in which the dividend is equal to 1,057,012 and the divisor to 951, and illustrates the following simple operation effected by successive subtractions:

```
1057012 | 951
 -951   |------
--------| 1111
  1060  |
  -951  |
--------|
  1091  |
  -951  |
--------|
  1402  |
  -951  |
--------|
   451  |
```

Diagrams I to IX of Figure 1 represent a number of stages of this division. The apparatus is reduced to three circulating pulse memories M1, M2 and M3, to operator or arithmetic element D connected to the two lower memories M2 and M3, to comparator E, to counting and deducting device F incorporated in the higher memory M1, and to shift counting device G, the respective functions of which will be seen from the explanations given in the following.

Diagram I shows the connections made during the preparatory phase $P_0$ concerned with the introduction of the dividend into memories M1 and M2 and of the divisor into memory M3. This phase is followed by phase $P_1$, caled the exchange phase of Diagram II, in the course of which the digit of highest order contained in memory M1 is introduced into memory M2. This phase $P_1$, which lasts one decimal period, is automatically succeeded by the phase $P_2$, called the shift phase of Diagram III, in the course of which the left-hand group of the dividend previously introduced into memory M2 and increased by the newly introduced digit takes up in this memory a suitable position in relation to the divisor in memory M3.

After three decimal periods, this phase is automatically replaced by phase $P_3$ of Diagram IV. In the course of this latter phase, the divisor is subtracted from the left-hand group of the dividend as many times as is necessary to form the figure of the thousands of the quotient.

The cycle $P_1$, $P_2$, $P_3$ then re-commences a number of times equal to the number of digits contained in the quotient, less one.

Each memory comprises five storage cells or decimal places, but only the right-hand four storage cells, for example the storage cells B1, B5, B3 and B2 of memory M2, which form a loop, are used in the preparatory phase $P_0$.

The storage cells may represent identical delay lines through which the times taken by the electric impulses to travel are all equal to the time of introduction of one pulse group for any decimal digit expressed in the binary-coded decimal system of notation, each impulse representing one of the values 1, 2, 4, 8. To each of the said values, whether utilised or not, allocated a binary bit period $a$, at the commencement of which the impulse utilised is emitted so that the total time of emission of one digit is always equal to $4a=T$, that is to say, to one decimal period, even if this digit is equal to zero. The numbers stored in the memories are expressed on the binary-coded decimal system, that is to say, each of them is formed of at least one term taken from the series 1, 2, 4, 8–10, 20, 40, 80–100, etc. Each term is represented by a numerical impulse, of which the time of emission, calculated from a predetermined origin, is proportional to the order of the term in the series.

These impulses may be provided either by a known system for the static exploration of an accumulator or totalizer comprising wheels of the standard type registering a decimal number or by a device for scanning two zones of a card, the perforations of which correspond to the decimal system, or by any device for extraction from a storage device comprising flip-flops or the like. The conversion into binary impulses of the impulses provided by the scanning device or by the totalizer takes place with the aid of impulse selecting means which will hereinafter be described. The latter permit sending into the corresponding memory the impulse or group of impulses representing each digit of the dividend, or of the divisor, with a delay corresponding to its relative position in the memory. The left-hand storage cell of memory M1, occupied by counting and deducting device F, has a time of passage T, like the storage cells B1 and C1 of the other memories which are located just below it. The three memories have an individual capacity of four digits. The introduction of the data into the memories is controlled in both the aforesaid cases by a timing impulse system which will hereinafter be referred to. The points of introduction of the numerical impulses into the memories are situated at the left-hand end of the memories. The four digits of the first group 7012 of the dividend are passed successively into memory M1, commencing with the digit 2 and finishing with the digit 7.

Memory M2 receives successively the three digits of the second group 105 of the dividend, commencing with the digit 5. Memory M3 successively receives the three digits of the divisor 951, commencing with the digit 1. Assuming that three digits having the same denomination from the right-most digits in the two groups of the dividend and in the divisor are simultaneously introduced into the three corresponding memories, the impulses introduced in each memory are so regenerated that at any instant those which represent three simultaneously introduced digits occupy in the three memories of Figure 1 exactly superimposed positions. The directions of circulation are indicated by arrows.

In the most general case in which the numbers of significant digits of the second group of the dividend on the one hand, and of those of the divisor on the other hand are different, the introduction of the divisor into memory M3 takes place in such manner that the divisor is greater than this second group lodged in the loop of memory M2. As will in fact be seen from the description of the first operating phase $P_3$, represented by Diagram IV, the first digit of the quotient can only be formed by introducing the digit 7 located to the left of the first group of the dividend from loop F—A5—A3—A2 into loop B1—B5—B3—B2. This transfer frees in loop F—A5—A3—A2 a decimal place which occupies the storage cell F on Diagram IV and receives as shown in this diagram, the first digit 1 of the quotient, which is formed entirely in this loop. In the case of Fig. 1, which ever are the division factors chosen, the quotient will have four digits at the maximum and the dividend cannot have more than seven digits. Consequently, the divisor will have at the most three digits. Each memory actually has a capacity of twelve digits at the minimum, and in the accounting operations for which the computer is particularly designed no calculations are ever made on numbers having more than twelve decimal digits.

When the dividend and the divisor are extracted from one or from two perforated cards, the number of columns of the perforated zones to be analysed are so determined as to obtain automatically the second group of dividend which is smaller than the divisor. This condition can readily be fulfilled because the orders of magnitude of at least two of the three terms affecting the division are always known in advance.

Referring to Diagram I, it will be seen that the right-hand storage cells A2 and B2 of memories M1 and M2 are connected respectively to the left-hand storage cells A4 and B4 of these memories, which absorb their output impulses without performing any function. Storage cells B2 and C2 of memories M2 and M3 have their outputs connected to comparator E and the inputs to the arithmetic element D.

The binary adders incorporated in this operator are described in the patent application No. 280,820, filed on April 5, 1952, now Patent No. 2,781,968, and the operator itself in the patent application No. 311,039 filed on September 23, 1952. Both applications are filed by Pierre Jacques Charles Chenus. It may effect, according to requirement, the addition or subtraction. The comparator E, is described in the patent application No. 307,325 which was filed on August 30, 1952 by Henri Gérard Feissel, receives during one complete passage through the loop the impulses representing the divisor 0951 and the corresponding second group 0105 of the dividend.

It emits an impulse through its output end E2 as soon as it has compared these two numbers, only when this group is lower than the divisor. This impulse is emitted when the digits occupy the positions indicated in the diagram, and it almost instantaneously actuates means not shown in the drawing, which modify the connections as shown in Diagram II of Figure 1, which relates to a first phase $P_1$, called the exchange phase, in the course of which the digit 7 passes from loop M1 into loop M2.

The same impulse is set in circulation in shi ft counting device G, the object of which is to stop the division when the four quotient digits have been formed, that is to say, when the first group of the dividend has been transferred from memory M1 into memory M2.

It will be seen from Diagram II that loop F—A5—A3—A2 is open because the input of counting and deducting device F is no longer connected to the output of the compartment A2. The output from this counting device is maintained connected not only to the adjacent storage cell A5 of memory M1 but also to the input of storage cell B1 of memory M2. One of the inputs of comparator E is connected to this output of F and disconnected from the output of storage cell B2. The latter output is connected to the input of storage cell B4, so that the counting and deducting device is connected in series with the intermediate memory M2. There is no change in the connections which connect respectively the arithmetic element D and comparator E to the other elements of the computer.

Diagram II shows the position of the digits in the three memories, one decimal period after the commencement of the phase $P_1$. The digit 7 contained in counting and deducting device F is passed simultaneously into the comparator, into storage cell B1 of memory M2 and into storage cell A5 of memory M1. It has left a zero in the counting device F and the figure 012 stored in memory M1 has moved by one storage cell to the right. The number 105 has moved also in memory M2 as the divisor 0951 in memory M3.

At the precise instant when the digits occupy this position, means not shown in the drawing, which will hereinafter be described, modify the connections of Diagram II so as to establish those of Diagram III, which corresponds to a first phase $P_2$, called the shift phase. This change of connections has the effect of converting memories M1 and M2 into closed loops comprising five compartments and of eliminating the connection connecting M1 to M2. The connections of memories M2 and M3 to operator D and comparator E remain unchanged.

During phase $P_2$, which lasts three decimal periods, each of the digits shown in Diagram II is moved by three storage cells in the memory containing it in the direction of the arrows.

It is thus seen that, since the end of the introduction phase $P_0$ any digit of the lower memory M3 has moved by four storage cells and has thus taken up again at the close of phase $P_2$ the position which it occupied at this instant.

The digits circulating in the other memories, on the other hand, are shifted to the left by one storage cell since this same instant. The position of the digits at the end of phase $P_2$ will be seen from Diagram III.

During phases $P_1$ and $P_2$, comparator E has successively received at its higher input the digits 7, 5, 0 and 1, and at its lower input the digits 1, 5, 9 and 0. Following the comparison effected between the numbers 1057 and 951, it does not emit any impulses at its output end, contrary to what happened at the end of phase $P_0$, because the second group of the dividend is greater than the divisor. The connections are then automatically modified so as to be represented by Diagram IV, which corresponds to a first phase for the formation of the first digit of the quotient, this phase being called $P_3$.

As has been stated in the foregoing, each time the divisor is subtracted from the initial divident or from the reduced dividend, the corresponding digit of the quotient, lodged in memory M1, is increased by one unit. In order to permit these subtractions, operator D is then connected by its output end to storage cell B1 of memory M2, its input connections to this memory and to memory M3 remaining the same as in the diagram II. Memory M3 always remains a closed circuit, while memory M2 forms an open circuit and memory M1 comprises a loop of four storage cells identical to the loop formed during the introduction phase $P_0$. The connections of comparator E to memories M2 and M3 remain the same as in Diagram III.

Diagram IV shows the position of the digits in the memories one decimal period after the passage from phase $P_2$ to phase $P_3$. The digits represented by the impulses constantly circulating in the memories have been displaced therein during said period by a distance corresponding to one storage cell. The digit 1, which occupied storage cell B1 in Diagram III, is therefore now in the adjacent storage cell B5, while storage cell B1 contains the digit 6, which results from the subtraction $7-1=6$ effected by operator D during the preceding decimal period. This type of decimal operator, in fact, delivers the impulses representing a subtraction or an addition in the decimal period which succeeds the period of the reception of the data.

It will be seen that the digit 7 contained in storage cell A4 of memory M1 at the end of phase $P_2$ has disappeared from this memory as a result of the break which has taken place between this storage cell and counting and deducting device F. The digit 1, which represents the first unit of the quotient, has been formed in this counting device with the aid of means which will hereinafter be described. During this period comparator E has simultaneously received the digits 6 and 1. Diagram V, which relates to said phase $P_3$, indicates the positions and values of the digits situated in the three memories four decimal periods after the commencement of this phase. The digits registered in memories M1 and M3 have moved by three storage cells in the direction of the arrows in relation to their positions in Diagram IV. It will be seen that the digits 5, 0 and 1 have been successively shifted into storage cell B4 of memory M2 which has absorbed them. The digit 7, which occupied this storage cell in Diagram IV, has also been absorbed. Storage cells B1, B5, B3 and B2 of this memory now contain the difference $1057-951=106$.

Comparator E now detects that the dividend group 106 is smaller than the divisor 951 and emits at its output end an impulse as it did at the end of phase $P_0$ (Diagram I).

This impulse, which penetrates into shift counting device G and circulates therein like that which has already been entered, initiates in addition the passage from phase $P_3$ to a second phase $P_1$ and Diagram VI indicates the position of the digits in the three memories at the end of this phase $P_1$. Apart from these positions, this diagram obviously is identical to Diagram II. It shows that the first digit of the quotient 1 is situated in storage cell A4 and that the digit 0, which was situated in the counting and deducting device F at the end of the first phase $P_3$, has now descended into storage cell B1 of memory M2, leaving in the said counting device a space which will be utilised during the subsequent phase $P_3$.

At the precise instant represented by Diagram VI, the passage into the second phase $P_2$ takes place. Diagram VII shows the connections made during this phase and is therefore identical in this respect to Diagram III, but it indicates in addition the position of the digits in the three memories three decimal periods after the commencement of this phase $P_2$. It is seen that the first digit of quotient 1 is about to enter storage cell A2 of memory M1 and that the space left in this memory by the introduction of a second digit 0 of the first group of the dividend 7012 into memory M2 is situated in the aforesaid storage cell A2. The divisor has returned to the position 0951 which it occupied at the end of the phase $P_3$ of Diagram V and the corresponding group of the reduced dividend 1060 appears in memory M2.

As before, comparator E has compared the two numbers 1060 and 0951 during phases $P_1$ and $P_2$ and it does not emit any impulse for the passage into phase $P_1$ which would cause the lowering of the third digit 1 of the aforesaid first group into memory M2.

A second phase $P_3$ is therefore immediately entered and during the first decimal period which follows the commencement of this phase operator D sends the difference $10-1=9$ into storage cell B1 of memory M2. Counting and deducting device F forms the first unit of the second quotient digit and the respective positions of the different digits at the end of this period are indicated by Diagram VIII, which is identical in other respects to Diagram IV.

It may be seen that the second digit of this quotient is formed in the place of storage cell left empty by the transfer of the second digit 0 of the first group of the dividend, into memory M2. The fact that this digit has been a zero, which is not represented by any impulse, is of little importance.

Diagram IX represents the positions of the digits in the memories at the end of the second phase $P_3$, that is to say 4 decimal periods after the commencement of this phase. The divisor occupies its initial position as indicated by Diagram I, the corresponding group of the dividend is equal to 0109 and the first two digits of the quotient, 1 and 1, are situated in the last two storage cells to the right of memory M1. It is known that during phase $P_3$ the comparator has compared the numbers 0109 and 0951 and that it will emit an impulse at the end of this comparison, as it happened at the end of phase $P_0$.

This impulse will penetrate on the one hand into shift counting device G and will produce on the other hand the passage of the digit 1 of the dividend from memory M1 to memory M2 and the formation of a new remainder 1091, from which the divisor 951 will again be deducted. Finally, the fourth digit 1 of the quotient will be obtained in the fourth storage cell of the loop of memory M1. When the shift counting device has received the phase-changing impulse which causes the last digit to the right of the dividend, namely 2, to pass from memory M1 into memory M2 and produces the evaluation of the last digit to the right of the quotient, it will periodically emit impulses which will prevent a new digit transfer. The end of the division will be brought about by the impulse which will be emitted by comparator E when the last remainder obtained is lower than the divisor.

The performance of a multiplication by the machine according to the invention takes place by a series of additions. In contrast to the method adopted in multiplications effected by hand, in which the product of the multiplicand by each of the digits of the multiplier is directly formed, each multiple of the multiplicand is formed in the computer by adding the product of the multiplicand by $10^{(n-1)}$ to itself a number of times, $n$ being the denomination of the corresponding digit of the multiplier.

Figure 2:
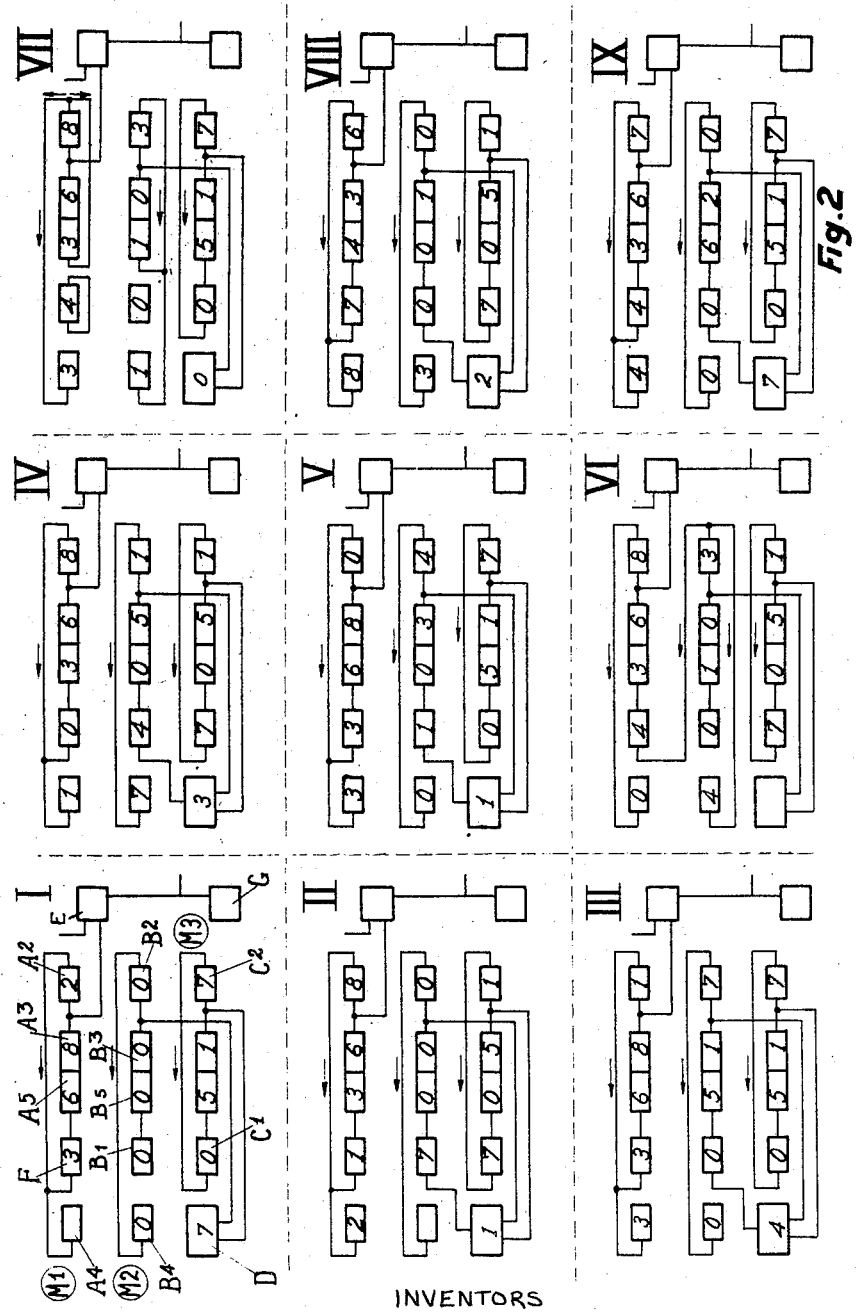
Figure 2 shows diagrammatically the connections established in nine stages of a multiplication.

Figure 2 shows in Diagrams I to IX nine stages of the multiplication of the number 517 by the number 3682. These diagrams show the three memories, M1, M2, M3, operator D, comparator E, counting and deducting device F and shift counting device G. The preliminary phase for the introduction of the data, hereinafter called phase $MP_0$, is shown by Diagram I of Figure 2. This introduction of data is effected in the same manner as that described with reference to division, with the help of members to be described later on.

This preliminary phase is followed by a first series of phases $MP_1$ for the formation of the partial product of the multiplicand by the last digit to the right of the multiplier. This first series of phases $MP_1$ is represented by Diagrams II to V of Fig. 2. In the course of these phases which lasts as many times four decimal periods as the digit in question comprises units, this product is progressively stored in memory M2. Phase $MP_2$, which lasts 1 decimal period, automatically succeeds it. During this phase, represented by Diagram VI, the last digit to the right, that is 4, of the aforesaid partial product is transferred into storage cell F of memory M1. At the end of this period, the operation automatically enters a phase $MP_3$, at the end of which the multiplican takes up the same place as at the beginnings of phases $MP_1$, while the multiplier reduced to its three left-hand digits occupies positions equivalent to those of the multiplicand. This phase $MP_3$ lasts three decimal periods.

The sequence $MP_1$, $MP_2$, $MP_3$ then recommences twice in succession involving the multiplier digits 8 and 6, whereafter three phases $MP_1$ take place, at the end of which the memories M2 and M1 respectively contain pulses representing the numbers 1903 and 5940. Thereafter, the multiplication terminates with a last shift phase $MP_2$, followed by a final phase $MP_3$, at the end of which the memories M2 and M1 contain pulses representing 0190 and 3594 or final product. Diagram I of Figure 2 shows the positions at the end of the phase $MP_0$, during which the first digit to the right of the partial product is formed. It will be seen that the multiplier is stored in the upper memory M1 and the multiplicand in the lower memory M3. During multiplications the storage cells A4 and B4 of memories M1 and M2 are of no use.

One of the inputs of comparator E is here connected to the input of storage cell A2 of memory M1, which comprises a loop of four storage cells, in the same way as memory M3. On the other hand, the storage cells of memory M2, which are at first empty and in which the multiple 1 will be stored, followed by the multiple 2 of the multiplicand, are connected in series with operator D. The connections of the inputs of the latter to memories M2 and M3 are the same as in the circuit arrangements shown in Figure 1, so that D has effected, at the instant in question, the total of the codes representing zero and 7.

The position of the various digits one decimal period later is represented by Diagram II, which corresponds to the first decimal period of the first phase $MP_1$. It will be seen that the units digit 2 has been reduced by one unit by counting and deducting device F, while the multiple 1 of the multiplicand is not yet formed, and the digit 7 is lodged in storage cell B1 of memory M2.

The reduction effected by counting and deducting device F therefore takes place during the first decimal period of each phase $MP_1$, and therefore always on the same digit of the multiplier which corresponds to the multiple of the multiplicand being formed. This reduction is controlled by comparator E, into which this digit always passes one decimal period before it enters F. This comparator E compares this digit with unity each time and when the aforesaid multiple is formed, that is to say when the digit in question has become zero, the comparator emits an impulse, as will hereinafter be seen.

Diagram III represents the position of the digits in the three memories four decimal periods after the commencement of the first phase $MP_1$. The multiplier and the multiplicand have obviously returned to their initial positions in memories M1 and M3 and the multiple 1 of the multiplicand has been formed in memory M2. The last digit to the right of the multiplier, reduced to unity, has been received by the comparator, which allows the additions to continue in operator D. This is shown by Diagram IV, which represents the conditions brought about one decimal period after those represented by Diagram III. It will be seen that the last digit to the right of the multiplier has been reduced to zero on its passage into counting and deducting device F and that the first digit to the right of the sum 517+517=1034 has been introduced into the storage cell B1 of memory M2.

Diagram V shows the position of the various digits at the end of the formation of the multiple 2 of the multiplicand, namely 1034, that is to say, at the end of the second phase $MP_1$. The receipt of a zero by the comparator E produces at the same instant, through means not shown in the drawing but hereinafter described, a change of connections corresponding to the passage from phase $MP_1$ to phase $MP_2$, called the exchange phase.

Diagram VI represents the position of the digits in the three memories one decimal period later, that is, at the end of this phase $MP_2$. It will be seen that the arithmetic element is not connected by its output end to storage cell B1 of memory M2 and that the output end of storage cell B2 of this memory is connected to the input of storage cell B4 of memory M2, and to the input of storage cell F of memory M1, which forms an open circuit. In the space of one decimal period, the digit 4, which represents the digit of the units of the product 517×3682, is passed from memory M2 into memory M1, the other digits stored in the memories all being normally displaced by one storage cell from left to right. The digit 1, which has left storage cell B1 of memory M2, has left a space corresponding to the digit zero.

At the instant corresponding to Diagram VI, a change takes place, by means of a new change of connections, from phase MP₂ to phase MP₃. Diagram VII represents these new connections and the position of the digits at the end of this phase, which lasts three decimal periods. It will be seen that memory M1 comprises two closed loops, one comprising three storage cells and the other one storage cell. Similarly, memory M2 comprises a loop of three storage cells. The connections of memory M3 remain unchanged and the output of operator D remains cut off from memory M2.

Under these conditions, at the end of phase MP₃, the digits of memories M1 and M2 occupy the same places as at the commencement of this phase, these places being indicated in Diagram VI. At the end of phases MP₂ and MP₃, the digits of memory M3 have obviously returned to the positions indicated in diagram V, which correspond to the end of the second phase MP₁. The digit 8 has been received by comparator E four decimal periods after the digit zero, and this comparator causes the additions to take place by causing the instantaneous passage from phase MP₃ to a third phase MP₁.

Diagram VIII represents the position of the various digits in the memories one decimal period after the commencement of this phase MP₁, in the course of which the operation 103+8×517=103+4136=4239 will be effected. It will be seen that the last digit to the right of the sum 103+517=620, namely zero, has been introduced into storage cell B1 of memory M2. It will also be seen that the digit 8 of the multiplier which will henceforth be operated on, has been reduced to 7 by counting and deducting device F of memory M1. Proof of the foregoing operation is given by the calculation of the product, which is obtained in the following manner:

```
      517
  ×  3682
  ───────
     1034
     4136
     3102
     1551
  ───────
   1903594
```

It will be seen that the second figure of the product is the 9 which constitutes the last digit to the right of the number 4239 mentioned above.

Diagram IX represents the position of the digits in the three memories 4 decimal periods after the commencement of the third phase MP₁. The multiplicand 517 has returned to its position at the commencement of this phase and the digit 7 of the multiplier has been received by the comparator. In addition, the total 620=103+517 has been stored in memory M2 so as to correspond to the multiplicand, decimal order by decimal order, in the course of the further addition 620+517=1137 which is to be effected. The subsequent sequence of adding and shifting operations will be readily seen from the explanations given in the foregoing.

The operative inter-relations of the various elements of the calculator will be more apparent when discussing the detailed circuit diagrams.

Figure 4:
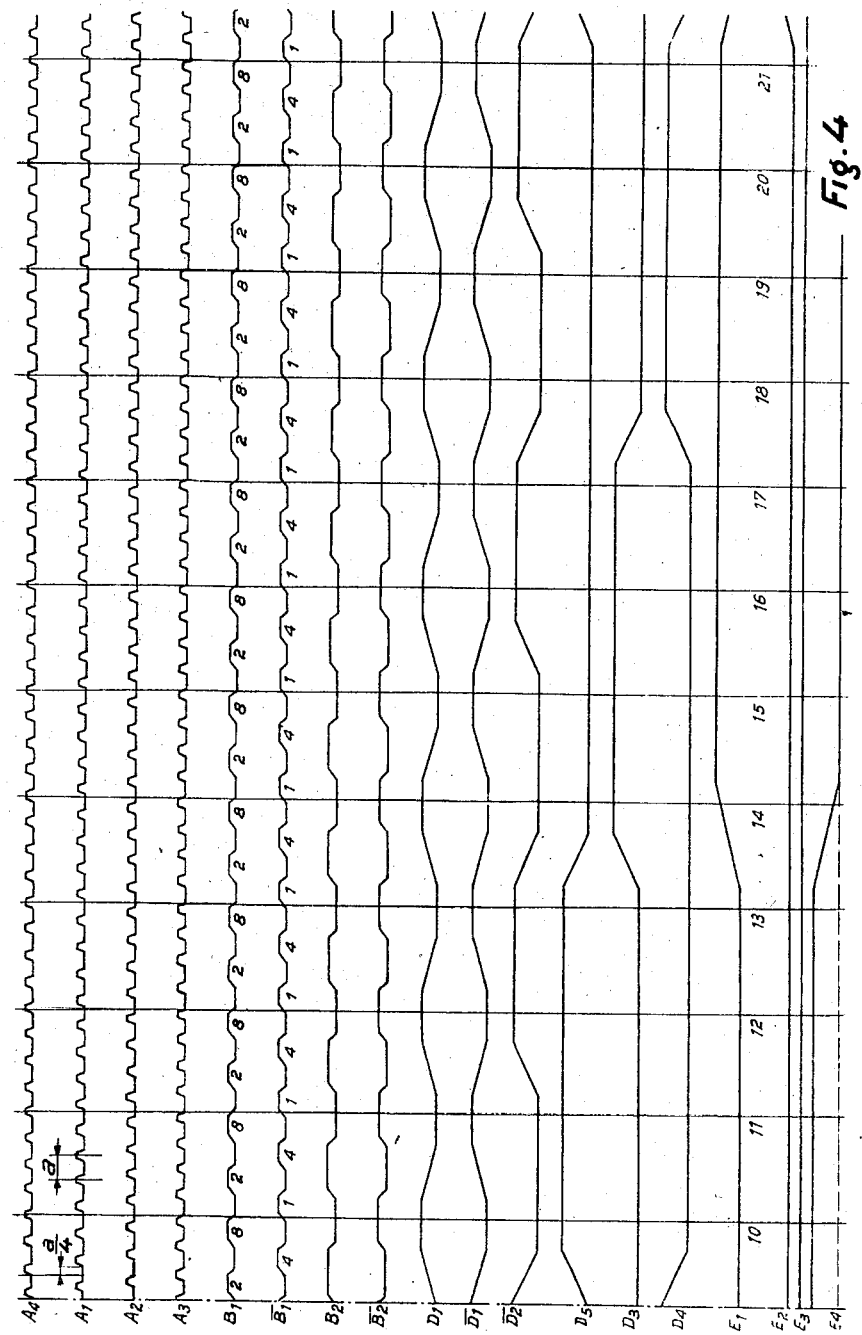
Figure 4 shows some of the timing impulse trains employed in the multiplication and the division, not only for the execution of the operations, but during the stages of introduction and extraction of the impulses.

Figure 4 shows first of all as a function of time the impulses used by the computer and generated by a pulse generator arrangement not shown on the drawings. This generator arrangement may be of any convenient type operating according to the principles of frequency division or serial pulse counting. Many such generator arrangements are now well known in the art of electronic calculators, but some examples of realizations may be found in U. S. Patents 2,512,851 issued June 27, 1950, or 2,579,174 issued December 18, 1951. The pulse trains A4, A1, A2 and A3 have the same repetition rate, but are staggered in relation to one another by one-quarter of a binary period $a$. Each of these trains is composed of impulses emitted every binary period.

The impulses trains B1 and $\overline{B1}$ are identical but staggered in relation to one another by one binary period $a$. Each of them is composed of impulses of duration $a$, the repetition period of which is $2a$.

The impulses trains B2 and $\overline{B2}$ are identical but staggered in relation to one another by $2a$. Each of them is composed of impulses of duration $2a$, the repetition period of which is $4a$, that is, a decimal period T.

The impulse trains D1 and $\overline{D1}$ are derived from trains B2 and $\overline{B2}$ by doubling the repetition periods, the impulse durations and the relative staggering by which the latter are characterised. Their repetition period is therefore equal to $8a$, that is, two decimal periods T.

The impulse train $\overline{D2}$ has a repetition period of 4T, each impulse having a duration 2T. The inclination of the leading and trailing edges of the impulses is due to in the use of transformers for generating and reproducing them. Impulse trains D3 and D5 have a repetition period equal to 12T and an impulse duration of 4T. Train D5 is staggered by 4T with respect to train D3.

The impulse trains E1, E2, E3, and E4 are used only for the introduction of data into the memories and for the extraction of numbers from these memories. This will be therefore discussed when the complementary phases of an operation are described.

By feeding a "gating circuit" with suitably chosen impulse trains, it is possible to obtain at its output terminal impulses having a definite repetition period and the emission of which is effected at well-determined instants of coincidence in the cycles of the apparatus. An example of such a gating circuit may be seen at 134 or 160 on Figure 7. The instant defined by such a coincidence is hereinafter designated in the form $r/p/q$ ($r$ designating the decimal period, $p$ the binary bit period, which characterises an impulse B1 or $\overline{B1}$ and $q$ the number of the timing impulse train A). $q$ therefore has one of the values 1 to 4. An impulse occurring at every decimal period is designated by $n/p/q$.

These gates, of which general use is made in the computer, are electric rectifier-cell switches. A gate G having four inputs $g1$, $g2$, $g3$ and $g4$ is shown in Figure 3. The inputs all comprise a germanium diode and are connected to the positive terminal of a source $s$ through a resistance $r$ of high value in relation to the forward resistance of the diodes. In order to simplify the drawings, this resistance is shown only in Figure 3. It can be shown that if impulses of like sign having substantially the same level in absolute value are applied to the inputs $g1$ to $g4$, an impulse will only pass at $t$ if these impulses are simultaneous. On the other hand, if the rectifier cells are oppositely connected and if source $s$ has a constant negative potential, a positive impulse arriving alone through any one of the aforesaid inputs will always be received at $t$.

The arrangement thus obtained is hereinafter called a "buffer." Figures 5, 6, 7 and 8 show by way of non-limitative example an embodiment of a calculating arrangement corresponding, for memories having a capacity of twelve digits, to the diagrams of Figures 1 and 2. These figures must be assembled to form a rectangle, the upper left-hand corner of which consists of Figure 5 and the lower right-hand corner of which consists of Figure 8. These four figures show the connections of memories M1, M2 and M3 with comparator E, operator D, shift counting device G, counting and deducting device F and the elements which control the passage from one operating phase to another one. This assembly can be synchronized by means of the impulse trains represented in Figure 4. Counting and deducting device F is surrounded in memory M1 by a dot-and-dash rectangle, as is shift counting device G which is situated below comparator E.

Figure 5:
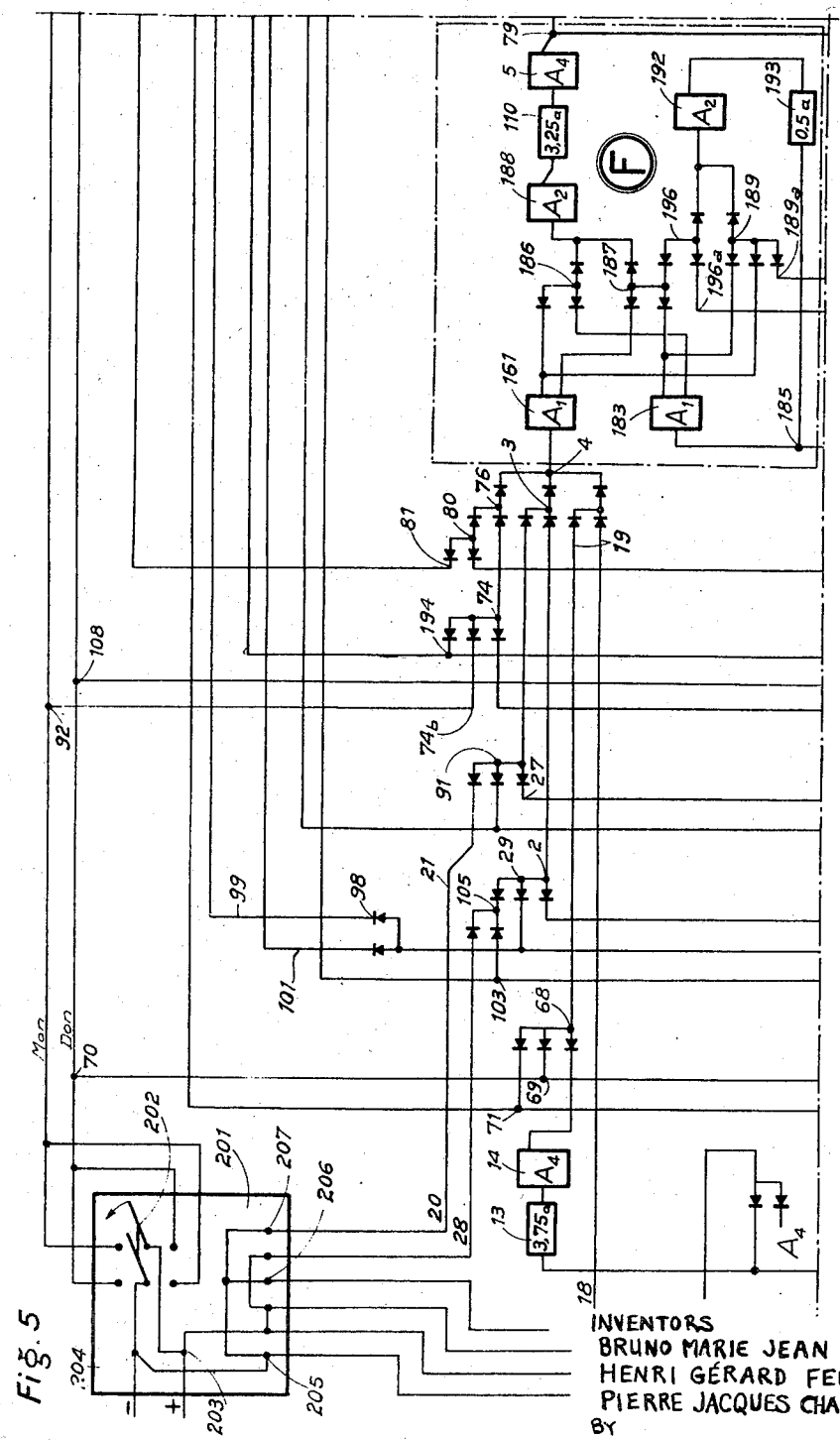
Figure 5 shows one part of a detailed scheme of connections of a constructional example of the apparatus according to the invention.

It is assumed that the calculating apparatus effects a division and that it is desired to produce one of the phases $P_3$, during which one of the digits of the quotient is formed. Adverting to Diagram IV of Figure 1, which corresponds to this phase, it will be seen that if it is applied to the case of Figures 5 to 8, each of the memories M1 and M3 must comprise a loop of a capacity of twelve digits. The loop of memory M1 comprises the terminal 1 and the elements 2, 3, 4, F, 6, 7, 8, 9, 10, 11 and 12. The rectangles 5 (Figure 5), 8, 9 and 11 (Figure 7) represent pulse regenerators. The passage of impulses into this loop is permitted by gates 29 (Figure 5) and 6 (Figure 7). Gate 29 (Figure 5), the output of which is 2, has its center input connected to gate 98. One of the inputs of the latter gate is connected to line 99—100 (Figures 5 and 7) and the other is connected to line 101—102 (Figures 5 and 7). The upper input of gate 29 is connected on the one hand to line 103—104 (Figures 5 and 7) and on the other hand to holding line 28—105 (Figure 5). Gate 6 is released by line 90—791 (Figure 7) as will hereinafter be explained. Delay line 13 situated at the left-hand end of the memory (Figure 5) and regenerator 14 both correspond to compartment A.4 of Fig. 1. The regenerators represented by rectangles 5, 8, 9 and 11 are further on described in details. Each of them is controlled by the impulses of one of the timing trains $A_1$, $A_2$, $A_3$ and $A_4$ and the numbers of the suitable timing trains are indicated in the corresponding rectangles. The lines through which the impulses A are fed to the regenerators have been omitted in order to simplify the drawing.

Since regenerators of this type regenerate each impulse received with a delay of a quarter of a binary period, i. e. $a/4$ it will be seen that the time taken by a pulse in travelling through the aforesaid loop is the sum of the following intervals of time:

| | |
|---|---|
| Figure 5—counting and deducting device F-regenerator A1 | $0.25a$ |
| Figure 5—counting and deducting device F-regenerator A2 | $0.25a$ |
| Figure 5—delay line 110 | $3.25a$ |
| Figure 5—regenerator 5 | $0.25a$ |
| Figure 7—regenerator 8 | $0.25a$ |
| Figure 7—delay line 111 | $39.75a$ |
| Figure 7—regenerator 9 | $0.25a$ |
| Figure 7—delay line 112 | $3.50a$ |
| Figure 7—regenerator 11 | $0.25a$ |
| Total | $48.00a$ |

Since a decimal period or place is composed of four binary periods, it will be seen that the capacity of the loop is twelve digits.

During phase $P_3$, represented by Diagram IV of Fig. 1, the memory M2 is connected in series with the output 22 of the arithmetic element D (Fig. 8) through the line 22, 23 (Fig. 6), 24 (Fig. 6), 27 (Fig. 5). The gate 67 (Fig. 6) connected to this line is blocked by its upper input, connected to the line 67, 66, 206. The gate 91, likewise connected to this line in Fig. 5, is blocked by its upper input, connected to the line 21, 20, 207 (Fig. 5). In the direction of the arrow 89 (Fig. 6) this memory M2 comprises in Fig. 6 the line 61, 60, 32, 33, 34, 116, 35, in Fig. 8 the line 36, 84, 37, 117, 38, 39, 118 40—in Fig. 6 again, the line 30, 41, 42. It is terminated at its lefthand end by the gate 73 (Fig. 6) which is blocked by its upper input, brought to potential —V by the line 71 (Fig. 5), 72 (Fig. 7). It will be seen in the following that gate 31 (Figure 6), which would permit the formation of a twelve digit loop, is then blocked while gates 36 (Figure 8) and 61 (Figure 6) are put in transmitting condition. Gate 36 is connected to line 90, 91 (Figure 7) in the same way as the gate 6. Rectangles 33, 35 (Figure 6) and 37, 38, 40 (Figure 8) are regenerators enclosing delay lines 116 (Figure 6) and 117, 118 (Figure 8), the respective delays of which are equal to $3.5a$, $40.5a$ and $2.75a$. Memory M2 is connected to inputs 25 and 26 (Figure 8) of comparator E by connection 34 (Figure 6), gate 43 (Figure 8) (rendered permeable to the impulses) and 17, 25, 26. It is connected to input 44 of operator D by connection 39, 44. Gate 61 (Figure 6) which connects memory M2 to the output of operator D is put in transmitting condition by giving voltages +V to lines 119 (Figure 6), 120 (Figure 7) and 59 (Figure 6), which are connected respectively to the center and upper inputs of this gate.

Memory M3 forms a closed loop in Figs. 6 and 8, Figure 6 shows elements 45, 46, 47, 48, and Figure 8 shows elements 49, 50, 51. It will hereinafter be explained how gate 45 is put in a transmitting condition by holding line 64—107 so that it can be traversed by the impulses which move in the direction of the arrow 52 (Figure 8). Connection 48 (Figure 6), 54 (Figure 8) connects memory M3 to a third input of comparator E. The connection 53—55 connects this same memory to a second input of the operator D.

The connections for bringing about phases $P_0$, $P_1$, $P_2$ in division and $MP_1$, $MP_2$, $MP_3$ in multiplication will hereinafter be successively examined.

Considering first of all, phase $P_0$ for the introduction of the terms of a division into memories M1 and M3, and referring for this purpose to Diagram I of Fig. 1, it will be seen that memories M1 and M3 comprise the same loops as during phase $P_3$. In contrast to what exists in this phase, memory M2 comprises a loop, Figure 6: 30, 75, 31, 32, 33, 34, 35 and Figure 8: 36, 84, 37, 38, 39, 40, in which the passage of positive impulses is permitted by gates 31 and 36. The setting in transmitting condition of gate 36 is concomitant with that of the aforesaid gate 6 since the two gates are connected to line 90—791.

With regard to gate 31, its center input is connected to the aforesaid gate 98 (Figure 5) and its upper input is connected on the one hand to holding line 58—106 (Figure 6) and on the other hand to line 115 (Fig. 6), 103 (Figure 5), 104 (Figure 7) already mentioned in reference to gate 29. It is put in transmitting condition by bringing to a suitable voltage +V the holding line 58—106 and the output of gate 98, as will hereinafter be explained.

It can be operatively connected also to be noted that memory M1 is connected to two inputs 25 and 26 (Figure 8) of comparator E by a connection 10 (Figure 7), 17 (Figure 8), 25, 26, which comprises gate 16. This gate 16 is blocked during divisions by line 92—93—94—95 (Figures 5, 7, and 8), while the adjacent gate 43 is put in transmitting condition by line 70, 108, 85, 86 (Figures 5, 7 and 8). Similarly, gate 114 of comparator E is blocked by the said line 92, 93, 94, 95, while the adjacent gate 113 (Figure 8) is conditioned by the aforesaid line 70—108—85—86. In other words, in multiplication, line 92—93—94—95 is brought to a positive permissive voltage +V, and in division it is brought to a blocking (negative) voltage —V. The reverse is true for line 70—108—85—86.

The introduction of the data into memory M1 is effected through input 18, 4 (Figure 5), which comprises buffer 19. The introduction thereof into memory M3 is effected through the input or line 62, 46 (Figure 6). Should it be desired to store in empty memory M1 a multiplier equal to the sum or the difference of two numbers A and B previously registered in the other two memories, operator D will be used to effect the addition $A+B$ or the subtraction $A-B$, provided that the term A of subtraction is greater than B. The introduction of the result into memory M1 could be permitted by a line connecting the operator output 22 (Fig. 8) to the inputs 23, 24 (Fig. 6) and 27 (Fig. 5) of the three gates 67, 61, 91. It would then be necessary to block gate 29 (Fig. 5) and to condition gate 91 (Fig. 5). Gates 61 (Figure 6) of memory M2 and 67 of memory M3 would then be simultaneously blocked. The use of commutation means here mentioned, which are associated with two inputs 44 and 55 of operator D, and other similar means, which will be described further on, and are associated with the outputs of the operator, also make it possible to place, in any of the memories, the result of an addition or subtraction concerning the figures placed either in the other memories or in this memory and one of the two others. It is therefore possible to store a term $(A \pm B)$ in memory M2, a term $(C \pm D)$ larger than $(A \pm B)$ in memory M3 and to execute the division $(A \pm B) \times 10^{12}$ by $(C \pm D)$.

The upper input of gate 91 (Fig. 5) is connected to line 20, 21. It will hereinafter be seen that the application of a suitable voltage $+V$ to this line puts the gate 91 in transmitting condition.

When the computer operates in the exchange phase $P_1$ corresponding to Diagram II of Figure 1, counting and deducting device F is operatively connected to the normal input 32 of memory M2, (input of regenerator 33) through connection 32—78 (Figure 6)—79 (Figure 5), which comprises gate 77. The upper input of the latter is connected to line 96—97 (Fig. 7) and its center input is connected to branch 108 (Figure 5)—77 (Figure 6) extending from line 70—108—85—86—87. Gates 29 (Figure 5) of memory M1 and 31 (Figure 6) of memory M2 are then blocked by the application of voltage $-V$ to one of the inputs of gate 98, while gates 6 (Figure 7) and 36 (Figure 8) of memories M1 and M2 are put in transmitting condition as in the previous case. Gate 80 is blocked by line 81—82.

A third stage to be envisaged is that of the shift phase $P_2$. Referring to Diagram III of Figure 1, it will be seen that all the compartments of memory M1 are connected into a single loop and that the same is the case with memory M2.

With regard to memory M1, in the case of Figures 5 to 8, the connection of delay line 13 and regenerator 14 (Figure 5) to the counting and deducting device F is assured by gate 68 comprising three inputs. The center input is connected to branch 69—70 of line 70—85—86—87 (Figures 5, 7 and 8) while its upper input is connected to line 71 (Figure 5)—72 (Figure 7). As will later be seen, this gate is blocked during all the other phases. With regard to memory M2, delay line 41 and regenerator 42 (Figure 6), situated at its left-hand end, may similarly be connected to a regenerator 33 by a gate 73 which has three inputs, two of which are connected respectively to line 69—70 (Figure 5) on the one hand and 71—72 (Fig. 7) on the other hand, which have hereinbefore been referred to.

Another possible case is that of phase $MP_1$ for the formation of the product in the multiplication. Referring to Diagram III of Figure 2, which corresponds to this phase, and comparing it with Diagram IV of Figure 1, which corresponds to phase $P_3$, it will be seen that the two diagrams differ by the fact that comparator E in Diagram III has an input connected to memory M1 and that in the other diagram has an input connected to memory M2. Now, this change results first of all in the blocking of the gate 43 (Figure 8) inserted in connection 34 (Figure 6)—43, 17 (Figure 8)—25—26 and the conditioning of gate 16 which forms part of connection 10 (Figure 7) 16, 17, (Figure 8), the blocking of gate 113 (Figure 8) connected to input 25 and the conditioning of gate 114 connected to input 26. All these blockings and conditioning are effected by applying voltages $+V$ and $-V$ to lines 92 (Figure 5), 93 and 94 (Figure 7), 95 (Figure 8) and 70—108—85—86—87—(Figures 5, 7 and 8), as has hereinbefore been explained with reference to the phase $P_0$.

It should be observed that actually the voltages $+V$ and $-V$ are substantially equivalent to those indicated respectively as V6 and $-V5$, which will be referred to later on in relation to the regenerator of Figures 18 and 19.

The case may also be considered of phase $MP_2$ for the transfer of a digit of the product from memory M2 to memory M1. Referring to Diagram VI of Figure 2, which corresponds to this phase, it will be seen that memories M1 and M2 are then connected in series. The corresponding elements, Figure 6: 33, 116, 35, Figure 8: 37, 117, 38, 118, 40 Figure 6: 30, 75, Figure 5: 74, 76, 4, 161, 188, 110, 5, 79, Figure 7: 6, 7, 8, 111, 9, 112, 11, Figure 8: 12, Figure 6: 1 and Figure 5: 13, 14, are connected in series. The passage of the impulses through this circuit is rendered possible by the blocking of gate 31 (Figure 6) and the conditioning of gates 36 (Figure 8), 74 and 6. The blocking of gate 31 is the consequence of the blocking of gate 98 (Figure 5), the output of which is brought to a negative potential by imparting to line 101, 102 (Figures 5 and 7) a negative blocking voltage $-V5$.

The conditioning of gates 36 and 6 is effected by imparting to line 90, 791 (Figure 7) a permissive voltage V6, the value of which will hereinafter be defined. The conditioning of gate 74 (Figure 5), the center input of which is connected to line 92 (Figure 5), 93, 94 (Fig. 7) 95 (Figure 8) and the upper input of which is connected to line 96, 97 (Figure 7) is effected by applying a voltage $+V$ to these two lines. For the sake of simplicity, line 92—93—95 will hereinafter be called line MON to indicate its function in the multiplication, and line 70—108 (Figure 5)—85 (Figure 7)—86—87 (Figure 8) will be called line DON, by reason of the permissive voltage $+V$ which it supplies during the division.

During a phase $MP_2$, the regenerator 14 (Figure 5) of memory M1 is disconnected from counting and deducting device F by the blocking of gate 68, while the output of regenerator 42 (Figure 6) of memory M2 is blocked by gate 73.

These blocking actions are obtained by means of lines DON and 71 (Figure 5)—72 (Figure 7), both of which are brought to the blocking voltage $-V$.

The circulation of the impulses is simultaneously permitted in memory M3 by the conditioning of gate 45 (Figure 6), effected by applying the voltage V6 to which line 115—103—104 (Figures 6, 5 and 7) is brought by the method which will hereinafter be described.

The shift phase $MP_3$ during multiplication may next be considered. Referring to Diagram VII of Figure 2, which corresponds to this phase, it is seen that memory M1 therein comprises two closed loops, memory M2 a single loop and memory M3 also a single loop. It is seen that in order to conform to this diagram with the circuit arrangement of Figures 5 to 8, memory M1 shall comprise a first loop formed by counting and deducting device F. Elements 8, 111, 9, 112, 11 shall form a second loop. Similarly, elements 37, 117, 38, 118, 40 (Figure 8) of memory M2 shall form a closed loop with a return path passing at 84. The first loop 4—F—79—78 (Figures 5 and 6) of memory M1 is formed by the conditioning of gate 80 (Figure 5) and the blocking of gates 6 (Figure 7), 68 and 29 (Figure 5). The upper input of gate 80 if for this purpose brought to a permissive voltage V6 through line 81—82 (Figures 6, 5 and 7) by means which will hereinafter be defined. Gate 68 is blocked by line DON, while the blocking of gate 29 results from the blocking of gate 98. The latter blocking is effected by the voltage of line 98—99—100 (Figures 5 and 7). The blocking of gate 6, which is concomitant with that of gate 36 (Figure 8) of memory M2 results from the voltage applied to line 90—791 (Fig. 7). The conditioning of gate 80 (Figure 5) is concomitant with that of gate 121 (Figure 7), because this latter gate is connected to line 81—82 (Figs. 5 and 7) by 123. Consequently, elements 8, 111, 9, 112, 11 (Fig. 7) of memory M1 form a closed loop, and another loop is formed by elements 37, 117, 38, 118, 40 (Figure 8) owing to the conditioning of gate 122 situated just below gate 121 and connected, like the latter, by 123 to the aforesaid line 81—82. The left-hand elements 41 and 42 of memory M2 are disconnected from the right-hand elements by gate 73 (Figure 6), which is blocked for the same reason as gate 68.

There are indicated in the following, in table form, the voltages which must be applied to the lines controlling the gates hereinbefore enumerated, in order to assure the proper inter-connections during each of the phases $P_0$ multiplication and $P_0$ division, when the division and multiplication terms are placed in the memories herein assigned. The blocking voltages are designated therein by I and permissive voltages by A.

| Designation of the lines | PO Mul | PO Div | P1 | P2 | P3 | MP1 | MP2 | MP3 |
|---|---|---|---|---|---|---|---|---|
| MON | A | I | I | I | I | A | A | A |
| DON | I | A | A | A | A | I | I | I |
| 82-123 | I | I | I | I | I | I | I | A |
| 90-791 | A | A | A | A | A | A | A | I |
| 71-72 | I | I | I | A | I | I | I | A |
| 99-100 | A | A | A | I | A | A | I | A |
| 96-97 | I | I | A | I | A | I | A | I |
| 101-102 | A | A | I | A | A | A | I | A |
| 119-120 | I | I | I | I | A | A | I | A |
| 115-103-104 | A | A | A | A | I | I | A | A |
| 20-21 | I | I | I | I | I | I | I | I |

During the multiplication and the division, lines 28—105 (Fig. 5), 59—61 (Figs. 5, 6) and 64—107 are brought to a permissive voltage and lines 58—106, 20—21 and 66—67 are brought to a blocking voltage —V. The means employed for this purpose will hereinafter be described.

The voltages of lines MON, DON (Figs. 5, 7 and 8), and the auxiliary lines 20—21 (Figure 5), 28—105 (Fig. 5), 59—61 (Fig. 6), 58—106 (Fig. 6), 66—67 (Fig. 6) and 64—107 (Fig. 6) are fixed at the very commencement of a multiplication or of a division by a panel of connections 201 (Fig. 5), to which these lines lead. In order to simplify the figure, it is assumed that the changes in the polarity of lines MON and DON, which correspond to the passage from a multiplication to a division or vice versa are manually effected. Actually, this change-over is effected by a remote control, for example with the aid of electromagnetic relays which are controlled in known manner in accordance with the program of operations to be successively carried out.

Each of lines MON and DON is therefore connected to two terminals of a bipolar reversing switch 202 (Fig. 5), the two blades of which are connected respectively by terminals 203 and 204 to sources which supply a permissive voltage +V and a blocking voltage —V. The movement of this reversing switch in the direction of the arrow brings it into the closing position for multiplication, while the opposite movement brings it into the corresponding position for division.

Input terminals 205, 206 and 207 of lines 58—106, 66—67 and 20—21 are connected to terminal 204 and the input terminals of the other lines 59—61, 28—105 and 64—107 are connected to terminal 203.

Actually, as has already been stated, the voltages applied to the six aforementioned auxiliary lines, are also commutable, this being accomplished by using known means, which allow for the introduction of addition or substraction results into any of the three memories, these results being obtained from two numbers placed in any of the three memories. A connection 87—792 (Fig. 8) connects control inputs of operator D to the line DON. During multiplications, this line DON is brought to a negative voltage —V and consequently the operator D operates as a decimal adder. During divisions, the line DON is brought to a positive voltage +V and the operator D operates as a decimal subtractor.

The combined operation of memories M1, M2 and M3, of shift counting device G, of comparator E and of counting and deducting device F in the course of the successive phases of a division will now be studied with reference to a second illustrative problem. During phase $P_0$ for the introduction of the data, a divisor 000, 000, 000, 951 is introduced into M3, the first group 781, 116, 420, 023 of the dividend is introduced into M1 and the second group 000, 000, 000, 105 of this dividend is introduced into M2. It will be assumed that by reason of the rate of introduction adopted, the first binary impulse of the digit 5 of the second group of the dividend and the impulse of value 1 representing the least significant digit of the divisor reach, at the instant 1/1/1 which corresponds, according to Figure 4 and to the definition given in the foregoing, to the decimal place 1, to the binary place 1 and to the timing pulse train A1, the inputs 25 and 54 of comparator E (Figure 8) through connections 34, 43, 17 and 48—54 (Figures 6 and 8) respectively. It will be recalled that these impulses have been introduced into memory M2 through line 56—32 and into memory M3 through line 62—46. The introduction of the impulses into the memories takes place by means which will be described further on.

The line DON is brought to a permissive voltage +V in the neighbourhood of 0 volts, so that any positive numerical impulse of which the crest voltage is substantially equal to zero and the lower level equal to —V, passes through gate 113 of the comparator when it comes from memory M2 and through gate 124 when it comes from memory M3. Gates 114 and 195 are in fact blocked by line MON brought to a potential —V.

As already mentioned, the comparator E is described in details at the end of the specification. From instant 1/1/1, the comparator receives successively the digits of increasing decimal denominations and at the end of the third decimal period from instant 1/1/2, i. e. at instant 3/1/2, it emits an impulse into a loop partially shown (Figure 8) at 125—126—127—128, because the divisor is greater than the second group of the dividend. This impulse continues to circulate in the loop whose pulse travel time is one binary bit period and at instant 12/8/2 it returns to 125. The said impulse is regenerated at instant 12/8/3 by regenerator 126. As it is shown further on with the support of Fig. 18 the arrangement of the pulse regenerators used in this calculating machine is such that, in the inoperative condition, the lower output of any of them is brought to voltage +V6, that is zero volts substantially, that is to a voltage chosen as permissive relative to the timing pulses, and the corresponding upper output has a voltage —V5, chosen as blocking with respect to the timing pulses and to the regenerated numerical pulses. On the passage of a regenerated impulse, these voltages are changed over and return to their previous values as soon as the impulse has passed. It will thus be seen that from instant 3/1/3 until instant 12/8/3 inclusive, an impulse of time $n/p/3$ will be received at output 127. Now, the higher output 127 of regenerator 126 is connected to the higher input of a gate 129 (Figure 7). The center input of the latter which is connected to the input of like name of a gate 135 (Figure 8), is connected on the one hand to regenerator 132 of shift counting device G by connection 131—132 and on the other hand to line DON by connection 130—136 (Figures 8 and 7). The lower input 129a of gate 129 is connected in parallel with the upper input of gate 135 to the upper output of a regenerator 133 (Figure 7) connected by its input to a gate 134 having six inputs. These inputs receive respectively the impulse trains D5, $\overline{D2}$, $\overline{D1}$, $\overline{B2}$, B1 and A2. The coincidence of the impulses of these trains gives every twelfth decimal period a positive impulse 12/8/2 which is converted into an impulse 12/8/3 by regenerator 133. It will thus be seen that impulse $n/p/3$ supplied by comparator E can only pass through gate 129 at instant 12/8/3=12/8/1+0.5a. The instant 12/8/1 is, in accordance with what has been stated in the foregoing, that at which the comparison of the numbers stored in memories M2 and M3 is completed. It will hereinafter be seen that the impulse passing to 127 (Figure 8) at instant 12/8/3 is blocked in the comparator before returning to 125. The impulse coming from 127, having passed through gate 129 (Figure 7) penetrates on the one hand into regenerator 137 through buffer 138 and on the other hand into regenerator 139 of shift counting device G through connections 153—152 (Figures 7 and 8). The higher output of this regenerator is connected (Figure 8) to one of the inputs of a gate 140, the other input of which is connected to the lower input of a regenerator 141. The higher output of the latter is connected to a gate 142, in parallel with the lower input of regenerator 139. These two gates 140 and 142 have their outputs connected in parallel to the input of a loop 143—144—145—146—147—148, which closes at the input of the aforesaid regenerator 141. The upper output of regenerator 141 and the upper output of regenerator 139 are connected on the other hand to the two inputs of a gate 149 which forms one of the elements of a circuit 149—150—151—152 for the transmission of the carry-overs, which is connected to the input of the aforesaid regenerator 139. The aforesaid elements 143 and 150 are regenerators, while elements 144, 146, 148 and 151 are delay lines, the times taken in passing through which are equal respectively to 0.25a—a—2.25a—0.5a. Examination of the diagram of shift counting device G (Figure 8) shows that the impulse which penetrates at time 12/8/3 into regenerator 139 passes through gate 140 and is set in circulation in loop 143—144—146—148, the time taken in passing through which, calculated in the direction of propagation of the impulses is equal to $0.25 \times a + 0.25a + 0.25a + a + 2.25a = 4a = T$. This impulse cannot pass through gate 154 by way of 145 because, at the instant at which it passes to 145, the voltage at 147 is equal to —V5. It will hereinafter be seen how this shift counting device stops the division after the reception of the twelfth impulse fed through connection 153 (Figure 7)—152 (Figure 8). The impulse which has penetrated at the instant 12/8/3 into regenerator 137 (Figure 7) enters closed loop 97—96—155—156—157—158—138 which comprises regenerator 155 delay line 156, the time taken in passing through which is $0.5 \times a$ and gate 158. This impulse passes to 96 at instant 12/8/4 and reaches gate 158 at instant 12/8/4+0.25a+0.5a=13/1/3. The gate 158 is put in a transmitting condition because no negative impulse leaves regenerator 159 connected to gate 158 at this instant. The input of this regenerator is in fact connected to gate 160 comprising six inputs. The latter supplies, owing to the coincidence of the impulses D5, $\overline{D2}$, $\overline{D1}$, $\overline{B2}$, B1 and A2 which arrive through its six inputs, an impulse 13/8/2 converted into an impulse 13/8/3 by regenerator 159. The impulse therefore returns into regenerator 137, is reproduced therein and again passes to 96 at instant 13/1/4, again passes through the loop twice in the course of which it returns to 96 at instants 13/2/4 and 13/4/4 and is finally blocked by gate 158 at instant 13/8/3 in the fourth circuit. Each time the impulse passes through terminal 96, it is propagated along line 97—96 (Figure 7)—194 (Figure 5) and reaches gates 74 (Figure 5) and 77 (Figure 6). Gate 74 is blocked by line MON brought to the potential —V, as has been seen in the foregoing, but the impulse conditions gate 77. In fact, the center input of this gate is brought through line DON to the permissive voltage, and at instant 12/8/4 at which it receives a first impulse through connection 96/194, its lower input receives, through connection 79—78 (Figures 5 and 6), the first binary impulse of the digit 7, which constitutes the digit of highest order of the first group of the dividend 781, 116, 420, 023. In fact, it has been seen in the foregoing that at instant 1/1/1 there passes to point 34 (Figure 6) of memory M2 the first numerical impulse of the digit 5 which forms the digit of the units of the second group of the dividend. This impulse has therefore reached regenerator 33 at instant 1/1/1—0.25a=0/8/4, and simultaneously in memory M1 the impulse of value 1 of the digit of the units 3 of the first group of the dividend enters regenerator 161 (Figure 7) which constitutes the input of counting and deducting device F.

It will thus be seen that at instant 11/8/4 the impulse of weight 1 of the digit 7 penetrates into regenerator 161 of the counting deducting device F (Figure 5). The said impulse leaves regenerator 5 of counting and deducting device F, one decimal period later, that is to say, at instant 12/8/4 and, by passing through 79—78 (Figures 5 and 6), travels through gate 77. It then leaves regenerator 33 at instant 13/1/1 and, through connection 34—43—17—25 (Figures 6 and 8), simultaneously enters comparator E. At instant 13/1/2 the latter receives through connection 170—173—172 (Figures 7 and 8) a negative impulse which blocks the impulse emitted at 127 (Figure 8) at instant 12/8/3. In fact, delay line 173 (Figure 7) having a delay of 0.75a, which is inserted in this connection, converts impulse 12/8/3 which it receives from regenerator into an impulse 13/1/2.

The impulses of weight 2 and 4 which then leave regenerator 5 (Figure 5) reach gate 77 (Figure 6) at the same time as those which are fed through the aforesaid line 97—96—194 (Figures 7 and 5). Consequently, the digit 7 is then passed into memory M2 and leaves a space in counting and deducting device F.

However, the impulse circulating in loop 96—155—157 (Figure 7) and which has travelled four times past 157, has penetrated at its fourth passage, i. e. at instant 13/8/3, into regenerator 164 through connection 157—162—163 which comprises gate 162. The second input of this gate is in fact connected to line 162—165, which emits an impulse n/8/3. This line is, in fact, connected by a delay line 65 to the output of a gate 174, the three inputs of which receives the impulse trains A2, B1, $\overline{B2}$ respectively. The delay value of line 65 is 0.25a. The impulse which is regenerated by this regenerator 164 enters loop 72—166—167—168 (Figure 7), which includes delay line 166, the time of transmission through which is equal to 0.75a, and gate 167, the second input of which is connected through 167—169—170—171 to the lower output of regenerator 133. It has been seen in the foregoing that the latter receives a positive impulse at instants 12/8/2, 24/8/2, 36/8/2, etc. It therefore provides at this lower output at instants 12/8/3, 24/8/3, etc. a negative impulse which blocks gate 167 once at every twelfth decimal period. The positive impulse set in circulation in loop 72—166—167—168 will therefore pass every binary period to 72 from instant 13/8/4 until instant 24/4/4, which means that it will complete 44 circuits therein, corresponding to 11 decimal periods.

It is to be noted that said positive impulse will pass terminal 168 43 times, but that it cannot be propagated from there to regenerator 83 through gate 88 because one of the inputs of this gate is connected by 88—94 to line MON, which supplies a blocking voltage as indicated in the foregoing table. It will thus be seen that line 791—90 connected to the lower output of regenerator 83 remains constantly at a potential of approximately 0 volts during phases $P_1$ and $P_2$ and conditions gates 90 and 36 of memories M1 and M2.

Each time it passes 72, said positive impulse reaches and frees gates 68 (Figure 5) and 73 (Figure 6) through connection 72—71 (Figures 7 and 5). The center inputs thereof are connected to line DON, which provides a permissive voltage. Therefore, at instant 13/8/4, or more precisely one decimal period after the commencement of the introduction of the digit 7 into memory M2, regenerator 42 (Figure 6) situated at the left-hand end of this memory is connected to regenerator 33 (Figure 6) of the same memory.

At the same instant, the last digit on the right of the second group of the dividend, namely 5, which left the elements 118 and 40 (Figure 8) of memory M2 at instant 12/8/4, is now about to leave the added storage cell of this memory, consisting of delay line 41 and regenerator 42 (Figure 6). In other words, the impulse of weight 1 of the digit 5 is about to leave regenerator 42 at this instant. It will therefore enter regenerator 33. By reason of the repeated conditioning of gate 73 which occurs during eleven decimal periods, the digits stored in memory M2 will complete $1\frac{1}{13}$ of a circuit, so that at the end of phase $P_2$, i. e. at instant 24/8/4, the series of digits 0,000,000,001,057 will be found from left to right therein.

However, the comparison is already ended at instant 24/4/4+0.25a which would correspond to the hypothetical case where the second group of the dividend would include a digit equal to 8 or 9 at its left-hand end. The impulse of weight 8 would at this instant 24/4/4 enter regenerator 33.

In the present case, the comparator does not provide any impulse at this instant because the second group in question is higher than the divisor, so that the positive impulse 24/8/3 provided by regenerator 133 (Fig. 7) finds gate 129 blocked and reaches through 129a gate 135 (Figure 8), which is put in a transmitting condition. In fact, the center input of this gate is brought to a permissive voltage by regenerator 132 of the shift counting device.

It has in fact previously been seen that the impulse circulated in shift counting device G has not hitherto been able to pass gate 154 (Figure 8). Impulse 24/8/3 through connection 135a (Figure 8)—175 (Figure 8)—therefore reaches regenerator 176, which reproduces it. At instant 24/8/4, it is set in circulation in loop 177—178—179—180—181 (Figure 7), which contains a delay line 179 having a delay of 0.5a and a gate 180 connected to line 169—170. For the reasons already stated in the foregoing, the said gate is conditioned and will not be blocked until instant 36/8/3. The regenerated impulse will pass through this gate for the first time at instant 24/8/3+0.25a+0.25a+0.50a=25/1/3. It will therefore pass therethrough 47 times and will pass 177 48 times, that is to say, during 12 complete decimal periods from the instant 24/8/4 of the first passage. At each passage it reaches gates 91 (Figure 5), 61 (Figure 6) and 67 (Figure 6) and conditions gate 61 each time the latter simultaneously receives an output impulse from operator D through the connection 22—23—24 (Figures 8 and 6). In fact, it has herein been stated that reception line 59—61 (Figure 6) is then brought to a permissive potential. Gates 91 and 67 of memories M1 and M3, on the other hand, remain blocked by reason of the blocking potentials imparted by the corresponding reception lines, as stated herein. It has been stated that at the beginning of phase $P_2$, i. e. at instant 12/8/4, the numerical impulse of value 1 characteristic of the last digit to the right, 5, of the second group of the dividend was about to leave regenerator 40 of the memory M2. At the instant 24/8/4, the numerical impulse of value 1, which corresponds to the digit 7, i. e. to the last digit on the right of the new second group, similarly enters delay line 41 (Figure 6) situated at the opposite end of memory M2 and the binary impulses of weight 2 and 4 corresponding to the digit 6 and provided by operator D enter regenerator 33 at instants 25/1/4 and 25/2/4. Since gate 73 (Figure 6) of memory M2 is blocked, the digit 7 is absorbed by regenerator 42 and replaced by the digit of the units, namely 6, of the difference between the second group of the dividend and the divisor.

In fact:

$$000,000,001,057$$
$$-000,000,000,951$$
$$\overline{000,000,000,106}$$

The number 106 will be stored in memory M2 at instant 24/8/4+12T=36/8/4, but regardless of the digits compared, comparator E has completed its comparison one binary period earlier, that is to say, at instant 36/4/4+0.25a+0.25a=36/8/2 at which it regenerates the last impulse which it can receive from regenerator 33 (Figure 6).

In the present case, it has set an impulse in circulation in loop 125—126—127—128 (Figure 8) at instant 24/8/4+3T−a and this impulse passes to 127 at instant 36/8/3. It passes through gate 129 (Figure 7) for the reasons already stated in the foregoing. By reference to instant 24/8/3 at which the impulse provided by regenerator 133 (Figure 7) passes through gate 135 (Figure 8) and reaches regenerator 176 (Figure 7), it will be seen that it simultaneously reaches regenerator 182 through connection 175—182a (Figures 7, 8 and 6). The output of the said regenerator is connected to the input of a regenerator 183 (Figure 5) of counting and deducting device F by connection 184—185 (Figure 6), which comprises gate 184. The four outputs of regenerators 183 and 161 (Figure 5) are connected in pairs by two gates 186 and 187, the arrangement of which is the same as that of gates 140 and 142 of shift counting device G (Figure 8). The outputs of these gates are connected to regenerator 188 (Figure 5), which is connected in series with the aforesaid delay line 110. As in shift counting device G, an impulse arriving through only one of the regenerators 161 or 183 passes through one of the gates 186 and 187 and penetrates into regenerator 188. It will be seen that the duration of its passage through counting and deducting device F is equal to 0.25a+0.25a+3.25a+0.25a=4a=T. It will be seen that, as has been stated with reference to Figures 1 and 2, this time of transmission is the same as the time of transmission through the corresponding storage cells B1 and C1 of memories M2 and M3. On the other hannd, if two impulses simultaneously enter regenerators 161 and 183, they only have access into gate 189, the lower input 189a of which is connected to line DON by connection 189a (Figure 5), 190 (Figure 6), 191 (Figure 8), 85 (Figure 7). This line provides a permissive voltage, so that an impulse passes through gate 189 and enters a carry-over circuit 192—193—185—183 (Figures 5 and 6), the time of transmission through which is equal to a, since delay line 193 delays the impulses by 0.5×a. Although in diagram III of Figure 1 the counting and deducting device F is empty, it is occupied by an eight in the present case at instant 24/8/4 which marks the end of phase $P_2$. The aforesaid impulse emitted by comparator E at instant 24/8/3 reaches gate 184 (Figure 6) on leaving regenerator 182 and passes therethrough because its other input is connected through 199—190 (Figure 6)—191 (Figure 8)—85 (Figure 7) to line DON. It is therefore regenerated by regenerator 183 (Figure 5) so that at instant 24/8/4+T=25/8/4 an impulse of value 1 leaves regenerator 5, and forms the first unit of the digit of the quotient.

It has been seen in the foregoing that at the end of phase $P_3$, i. e. at instant 36/8/3, comparator E emits an impulse at 127 (Figure 8). Gate 129 (Figure 7) and regenerator 139 (Figure 8) of shift counting device G are again reached by this impulse, which again initiates phase $P_1$. Now, the impulse set in circulation in loop 142—143—148 (Figure 8) of the said counting device G at instant 12/8/3 entered regenerator 141 at instant 24/8/3, was regenerated therein and passed through gate 142 of the shift counting device, whereafter it returned into regenerator 141 at instant 24/8/3+T=25/8/3, at which phase $P_2$ is entered. It will therefore be seen that at instant 36/8/3 two impulses will simultaneously enter regenerators 139 and 141 and will set up a carry-over impulse which will enter regenerator 139 at instant $36/8/3+a=37/1/3$.

In phase $P_3$, the digit 1 will again be formed in counting and deducting device F in the place left vacant by the digit 8 of the first group of the dividend, which digit has been introduced into memory M2. The operations continue as indicated in Figure 1, and at the end of the division the quotient will be stored in memory M1 and the remainder of the division in memory M2.

The end of the division is initiated by shift counting device G because, at the end of the second phase $P_1$, all the digits of the first group of the dividend will have been introduced into memory M2, so that the twelfth digit to the right of the quotient will be formed during the consecutive phase $P_3$. This digit may be a zero. At the commencement $q/8/3$ of the phase $P_1$ mentioned above, the letter $q$ being a multiple of 12, the shift counting device G will receive the twelfth impulse. At this instant $q/8/3$, three impulses of values 1, 2 and 8 respectively are already circulating therein. The impulse of value 1 reaches regenerator 141 at the same time as the twelfth impulse already mentioned and, by means of two successive carry-overs, imparts an impulse of value 4 which returns into regenerator 141 at instant $$q/8/3+2a=(q+1)/2/3$$

The impulse of value 8 arrives in turn at 141 at instant $q/8/3+3a=(q+1)/3/3$.

The two impulses therefore circulate one behind the other in the loop, so that when the impulse of value 4 passes for the first time to 147 (Figure 8), the impulse of value 8 will pass to 145. Gate 154 is therefore reached by an impulse at instant $$(q+1)/2/3+0.25a+0.25a+0.25a+a$$
$$=(q+1)/2/3+1.75a=(q+1)/8/2$$

Regenerator 132 therefore provides a negative impulse at instants $(q+1)/8/3$, $(q+2)/8/3$, etc., so that the positive impulse subsequently provided by regenerator 133 (Figure 7) can pass through gate 135 (Figure 8) at instant $(q+12)/8/3$, but is blocked by gate 129 (Figure 7). In fact, connection 130—136 (Figures 8 and 7) of the center input of gate 135 to line DON maintains this input at the permissive potential. If the remainder obtained is greater than the divisor, the lower input of this gate will be at the permissive potential at this instant $(q+12)/8/3$. This impulse will therefore be transmitted to counting and deducting device F.

If, on the other hand, the remainder formed in memory M2 at the end of phase $P_3$ is lower than the divisor, the positive impulse provided by regenerator 126 (Figure 8) will be blocked by gate 129 (Figure 7) and the negative impulse provided by this regenerator will block gate 135 (Figure 8). No impulse will be transmitted to regenerators 176 and 137 (Figure 7) and phase $P_0$ will immediately be entered, as may be seen on examination of the foregoing table. The result will be extracted during this latter phase.

The means used for registering the number stored in a memory at the close of an operation in a totalizer, or for printing it on paper, will be described further on.

The combined operation of memories M1, M2 and M3, of comparator E of counting and deducting device F and of shift counting device G during the performance of a mulplication will now be studied with reference to the diagrams of Figure 2.

It will be assumed that during phase $P_0$ a multiplier 000,000,003,683 is introduced into memory M1 and a multiplicand 000,000,000,517 is introduced into memory M3. The rates of introduction are the same as for division, so that at instant 1/1/1 the first binary impulse of the digit 3 of the multiplier leaves regenerator 161 (Figure 5) which corresponds to regenerator 33 (Figure 6) of memory M2, and at instant $1/1/1+11T=12/1/1$ it passes to 10 (Figure 7) and simultaneously enters input 26 (Figure 8) of comparator E through connection 16—17—25—26 (Figure 8). The said impulse conditions gate 114, because the other input of this gate is connected to line MON, which is brought to a permissive potential, as already stated. On the other hand, gate 113 is blocked by line DON, which is brought to a blocking voltage. Now, line 165—195 (Figures 7 and 8) which comprises delay line 201, the time of transmission through which is $0.5a$, feeds impulse $n/1/1$ to the input of gate 195, because delay line 201 receives impulses $n/8/3$ at its input. One of the impulses $n/1/1$ therefore enters comparator E at the same time as the aforesaid impulse 12/1/1.

It is known that, at the end of the comparison, i. e. at the instant 12/8/3, the comparator emits an impulse to the output of regenerator 126 (Figure 8) if the least significant digit on the right of the multiplier is equal to zero. In the present case, it does not emit such an impulse and the phase $MP_1$ is immediately initiated, which corresponds to Diagram II of Figure 2. In fact, impulse 12/8/3 coming from regenerator 133 (Figure 7) is blocked by gate 129, but it passes through gate 135 (Figure 8). It therefore reaches regenerator 176 (Figure 7) and is set in circulation in loop 120—177—178—179—180 (Figure 7) during 12 decimal periods, as has hereinbefore been seen. It simultaneously reaches counting and deducting device F (Figure 6) through regentrator 182 and the gate 184 conditioned.

It will hereinafter be shown that the member F now operates by subtraction. In fact, gate 189 (Figure 5) situated at the input of the circuit for the introduction of the carry-overs is blocked by line DON, while gate 196, which has one input 196a connected to line MON by connection 196a—197—198—93 (Figures 5, 6, 8 and 7), only allows the impulses coming from regenerator 183 (Fig. 5) to enter the carry-over circuit 192—193—185 (Figures 5 and 6). It will therefore be seen that if, at instant 12/8/4, only one impulse coming from comparator E (Figure 8) enters the said regenerator, it penetrates at instant 13/1/1 into regenerator 188 (Figure 5) and returns thereto at instants 13/2/1, etc., while a numerical impulse does not enter regenerator 161 at the instants when the impulse in circulation passes into regenerator 183, that is to say, at one of the instants 12/8/4, 13/1/4, 13/2/4, 13/4/4. When this simultaneous arrival occurs, the numerical impulse is blocked by gates 186 and 187. If, therefore, this latter impulse has the value 4, the impulse emitted by comparator E will produce an impulse of weight 1 and an impulse of weight 2. The digit 4 will therefore have been reduced by one unit.

In the present case, the digit 3 will have been reduced to zero at its third passage into counting and deducting device F. From instant 48/1/1 to instant 48/8/1, the comparator will compare the first digit of the multiplier with zero and will emit at instant 48/8/3 a positive impulse which will this time pass through gate 129 (Figure 7) while gate 135 (Figure 8) will be blocked by the simultaneously emitted negative impulse. The positive impulse will initiate phase $MP_2$ after having entered regenerator 137 (Figure 7), as has hereinbefore been explained with reference to phase $P_1$ of the division.

During phase $MP_2$ the first digit on the right of the product is transferred from memory M2 into memory M1 as shown by diagram VI of Figure 2. In fact, gate 31 (Figure 6) is blocked by regenerator 137, which simultaneously conditions gate 74 (Figure 5) by the positive impulses fed through connection 96—97—194 (Figures 7 and 5). Gates 36 (Figure 8) and 6 (Figure 7) are freed by connection 90—791 (Figure 7), which connects them to the lower output of regenerator 83 (Figure 7) in the inoperative position.

As in the performance of the division, an impulse enters regenerator 164 (Figure 7) one decimal period after the commencement of phase MP₂ and causes the apparatus to pass into phase MP₃. The impulses leaving regenerator 164 circulates in the loop (Figure 7) 72—166—167—168 during 11 decimal periods. Each time it passes through 168, it enters regenerator 83 through gate 88, which is maintained in the unblocked position by its connection to line MON. Under the effect of the impulses simultaneously emitted over lines 82—81 (Figs. 7 and 5) and 82—121 (Figure 7—5), gates 80 (Figure 5) and 121 (Figure 7) of memory M1 are conditioned while gates 90 (Figure 7) and 74 (Figure 5) are blocked. Elements 8 to 11 of this memory (Figure 7) therefore form a closed loop, while counting and deducting device F is closed on itself. In memory M2, gate 122 (Figure 8) is freed and gates 36 (Figure 8) and 73 (Figure 6) are blocked. Elements 37 to 40 (Figure 8) of this memory therefore form a closed loop. In memory M3, gate 45 (Figure 6) is conditioned since regenerator 176 (Figure 7) to which it is connected by buffer 107 in the inoperative position, and the impulses therefore circulate in a closed loop therein.

At the end of phase MP₃, a last series of phases MP₁ is entered by the process hereinbefore described. The end of the multiplication and the passage to phase P₀ are determined by shift counter G. The end part of the multiplication will consist of a last series of phases MP₂ and MP₃ necessary to assume the correct positioning of the product in memory M1.

At the commencement of the last phase MP₂, the digits lodged in memory M1 from left to right are the following: 000,019,035,940, and at the end of the following last phase MP₃, memory M1 will contain the number 000,001,903,594. The number 1,903,594 is in fact equal to the product of 517 by 3682. At the same instant, the digits situated in memory M3 are, in the same order the following: 000,000,000,517. The registration of any of these numbers in a totalizer or on paper is effected by means which will be described further on with the aid of Figures 14 and 15.

The description will now be given of the organs used for introducing numerical impulses, forming a given number, into one of the memories of the calculator herein described. This memory, which may be the circulating memory M3 of Figures 6 and 8 for example, will be shown as a rectangle in Figures 9 to 12, which represent the organs in question and which will be described hereinafter. These organs make it possible to store in the memory during phase P₀, either numerical data recorded in a perforated card or the like, or a number stored in a totalizer, for the purpose of using it later as a factor of a multiplication or division, under the control of a tabulating machine. The introduction of data from a card is called kinematic introduction, while the term: static introduction is employed to designate the transfer into a memory of a number recorded by a totalizer. Figs. 9 to 12 show by means of diagrams, a preferred realization for the kinematic and static introduction means, which are not an object of the present invention. Fig. 13 shows part of the timing impulses that are used for the operation of these means.

The device described in Figs. 9 to 12, is associated with the memory M3 previously referred to, which at its input 62, 46 (Fig. 6), receives impulses coded in accordance with the binary-coded decimal system which has hereinbefore been defined. The kinematic introduction of these impulses will first be considered. In this case, memory M3 (Fig. 12) diagrammatically represented by a rectangle, is connected by its input 62 to the output of a gate 212. The latter receives at one of its inputs 212a, by means which will later be described, a succession of coded groups of binary impulses representing the digits 9 to 0. The other input 212b of the gate is connected by circuits which will hereinafter be studied in detail, to 12 brushes 213 to 224 which analyse 12 columns of a perforated card. These 12 columns contain for example the divisor of a division to be effected, expressed in the decimal system of notation. These 12 brushes are connected by the lines 213—225 (Fig. 9), 214—226, 215—227, 216—228, 217—229, 218—230, 219—231, 220—232 (Fig. 10), 221—233, 222—234, 223—235, 224—236 respectively to the movable contacts of twelve relays 237 to 248, the lower fixed contacts of which are connected to 12 lines 249 to 260 through two-input buffers, while the upper fixed contacts thereof are connected to the coils of twelve relays 261 to 272. The coils of relays 237 to 248 are connected in parallel at their upper ends to an auxiliary line 273—274—275 and at their other end to an auxiliary line 276—277, the function of which will hereinafter be described with reference to the static introduction. The outputs of the twelve lines 249 to 260 are connected in parallel to the input of an impulse regenerator 278 (Fig. 12), which receives a so-called exploration impulse from any of said brushes, when it comes into contact with the conducting card feed roll 322, connected to the ground by a conductor not represented on the drawing. Connected in these twelve lines are gates 279 to 290, each gate having one diode in the corresponding line and two diodes connected on the one hand to the said line and on the other hand to two vertical lines. There are seven vertical lines 291 to 297 of this type, each of them being connected to at least three gate inputs. These lines will hereinafter be called "decimal timing lines".

The output of regenerator 278 is connected in parallel to two gates 298 and 299, the common outputs of which are connected to the input of a loop 300—301—302—303—304 which will hereinafter be called an "impulse quadrupler". In connection with Fig. 4, it will later be shown that the time periods of coincidence resulting from the exploring impulses applied over lines 291 to 297 are each equal to approximately $$\frac{T}{2}$$

T being equal to one decimal period. Under these conditions, the four binary impulses capable of representing a decimal digit cannot be transmitted to the input of gate 299 and the impulse delivered by regenerator 278 controlled by timing impulses n/8/3. When existing at the output of 278, such a pulse n/8/3 should be transformed into four successive pulses at the output 302 of 301 in order to mark the beginning of the four binary periods of the following decimal period. By means which will hereinafter be described, gate 299 is opened during the kinematic introduction and closed during the static introduction. Conversely, gate 298 is closed during the kinematic introduction and opened during the static introduction. Output 302 of the quadrupler is connected to input 212b of the aforesaid gate 212. Input 212a of this gate, which receives the codes of the digits 9 to 1 as hereinbefore stated, is connected through the contact 305a of a relay 305 and of regenerator 306 to output 307 of a device 308, which is hereinafter called the coding memory and which is enclosed in a rectangle drawn in dot-and-dash lines. A complete description of the circuit arrangement of this coding memory will hereinafter be given and it is sufficient to state now that it is connected by 309—310 to a generator 311 providing timing impulses A2, which will hereinafter be called the "unifier". This coding memory 308 is connected through 312—313 to the upper output of an impulse regenerator 314 and by connection 351—348 to a relay 316 called a resetting to-nine relay, and by connection 317—318 to a generator 326 providing timing impulses A3. Unifier 311 is controlled by the brush feeding relay 320 of the tabulating machine associated with the calculator through a gate 321 having two inputs. Regenerator 314 regenerates the impulses supplied by a gate 550 having six inputs. Gate 299 which controls the arrival of the exploration impulses in the quadruplers 300, 302, 304 has its intermediate input connected to a generator 323 supplying negative impulses A3, which is surrounded by a dash-dotted rectangle. The upper input of gate 299 is connected to a stud 324 of the tabulating machine by connection 325. The said stud delivers a permissive voltage from instant 9/7 to instant 0/7 of each scanning cycle of the tabulating machine and a blocking voltage from instant 0/7 of this cycle to instant 9/7 of the following cycle, figure 7 designating the degree 7 of the machine point, while the preceding figure 0 or 9 designates the value of this point. It will be remembered that one degree is equal to 1/24 part of a (machine cycle point) and that each tabulating machine cycle is divided into 15 "machine points." Starting from the beginning of each cycle, the machine points follow in the order 9, 8, 7, 6, 5, 4, 3, 2, 1, 0, 11, 12, 13, 14, 15. The essential devices constituting a cycle controller in a tabulating machine may be found in U. S. Patent No. 2,722,375 issued November 1, 1955. Generator 326, which emits positive impulses, is controlled jointly as will be seen by unifier 311 and by generator 314.

Figure 9:
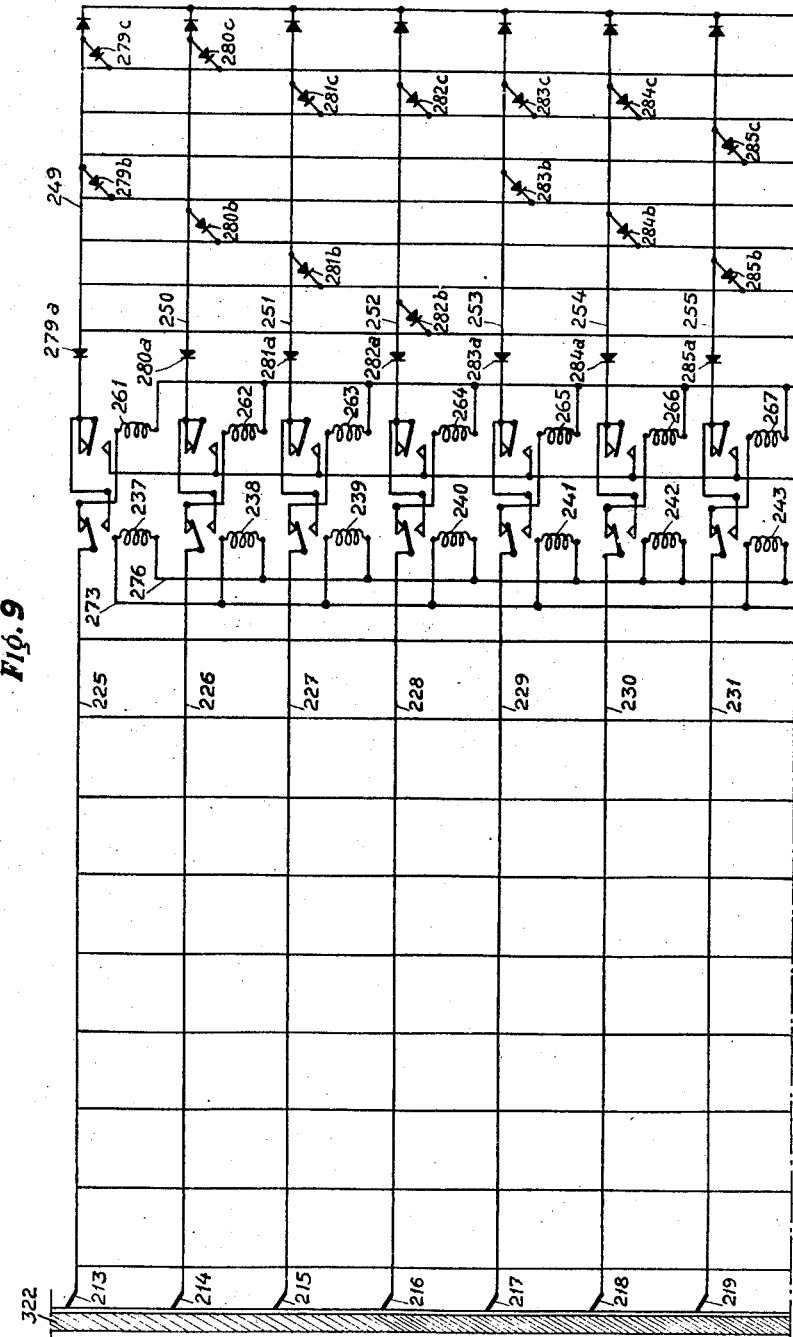
Figure 11:
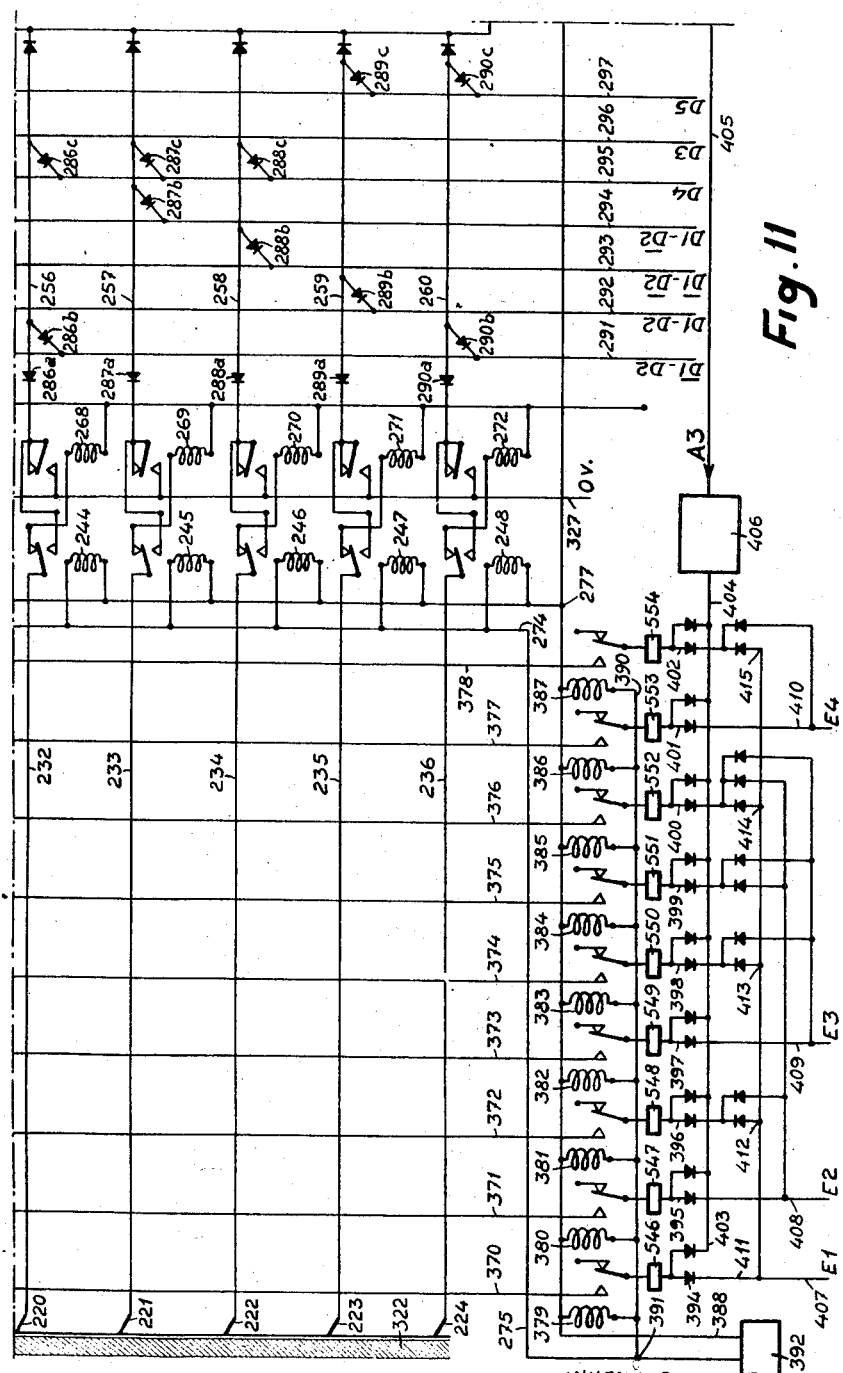

During the kinematic introduction, relays 237 to 248 Figs. 9 and 11 are de-energised as will later be explained, so that brushes 213 to 224 (Figs. 9 and 11) are connected to the coils of relays 261 to 272, which are shown in Figs. 11 and 9 in the de-energised condition. These brushes correspond to denominational orders which increase from top to bottom in the figure. When one of the brushes passes over a perforation, the relay of the series 261—272 to which it is connected becomes energized and the lever spring thereof comes into contact with the lower spring of the contact unit; line 327—328, which is maintained at a potential of 0 volts, is therefore put in contact with that one among the lines 249 to 260 to which the said lever spring is connected. The impulse thus set up can be transmitted to regenerator 278 only if the other two inputs of the gate provided in this line between the relay and the regenerator are simultaneously brought to potentials substantially equal to 0 volts. Now, lines 294—293—292 and 291 are connected to the impulse sources D1, $\overline{D1}$, D2 and $\overline{D2}$ by connections which are not shown in the drawings and which permit of bringing them respectively to 0 volts during the coincidences of impulses D1—$\overline{D2}$, $\overline{D1}$—$\overline{D2}$, D1—D2 and $\overline{D1}$—D2. Lines 297, 296 and 295 are brought to 0 volts by the impulses of the trains D5, D3 and D4 respectively. Considering, for example, lines 249 and 250 provided for conveying the scanning impulses corresponding to the units and to the tens of the term to be introduced into the memory, it will be seen with reference to Figure 4 that these pulses pass through gates 279 and 280 respectively during two consecutive intervals of time, the individual duration of which is substantially equal to a decimal half-period, i. e.

$$\frac{T}{2}$$

These permissive times commence at instants separated from one another by one decimal period T. Considering the intervals of time during which the other gates 281 to 290 are permeable to scanning impulses, it will be seen that they succeed one another at the aforesaid rate and that they are all equal to about $$\frac{T}{2}$$

Lines 249 to 260 therefore permit effecting the step-by-step exploration of the twelve columns of the analysed card in twelve decimal periods. With suitably chosen timing rates, this total duration of exploration, equal to the time taken by a pulse to travel round the memory M3, is less than one hundredth of the duration of one machine point. The aforesaid duration of exploration is equal, with the aforesaid rates, to about one-fifth of a degree.

Figure 10:
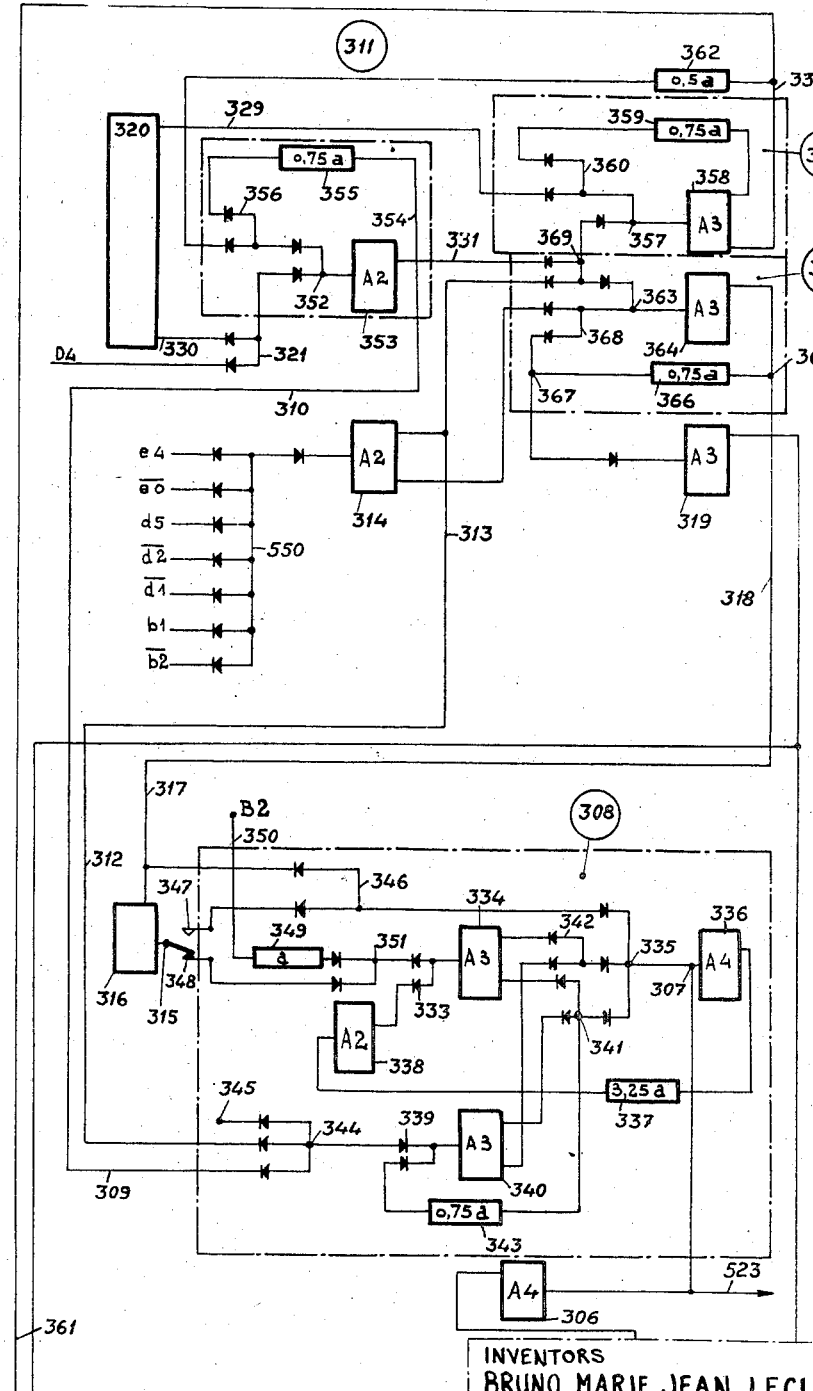

Fig. 10 shows a "circuit-breaker" 320, forming part of the tabulating machine associated to the computer. Several relay contacts in the circuit-breaker are so actuated that from degree 14 of each "machine-point" to degree 0 of the following one, outputs 329 and 330 will be brought to a voltage +V. During the remainder of each machine point, that is from degree 1 to degree 13 inclusive, these outputs are brought to a negative blocking voltage —V5. In the following, the intervals 14–24 will be called the relay closing periods and the intervals 0–14 will be called the relay opening periods. The manner of operation of generators 311, 326 and 323 represented by dash-dotted rectangles will hereinafter be described. It is sufficient for the moment to assume that each relay closing initiates, immediately or after a very short time, the emission of an impulse train A2 through output 331 of unifier 311. Gate 321 situated at the input of this unifier is in fact closed by an impulse D4 fed through its lower input, and the times of emission of these impulses are not in any way related to the beginnings and ends of the "machine points."

The emission of a positive impulse, hereinafter called I.96, by regenerator 314 can only take place at every 96th decimal period and at an instant $r/8/2$, $r$ being a multiple of 12, the digit 8 designating an impulse B1 of value 8 (see Fig. 4), and 2 designating the timing impulse A2 which controls the operation of the regenerator. The seven inputs of gate 550, in fact, receive the impulse trains E4, $\overline{E0}$, D5, $\overline{D2}$, $\overline{D1}$, B2 and B1. The impulse trains E1, E2, E3 and E4 are shown in Figures 4 and 13, while the trains E0 and $\overline{E0}$, are shown in Fig. 13 only. This figure shows the following 9 timing impulses: D3, D4, D5, E0, $\overline{E0}$, E1, E2, E3 and E4. It is known that these impulses have not actually the rectangular form shown in this figure, but their width corresponds to the useful part of the real trapezoidal impulses. The impulse trains D3, D4 and D5 are being shown in Figure 4 and their characteristics have been given in the foregoing.

The impulses E1, E2, E3 and E4 also shown in Fig. 4 have an individual duration equal to 8 decimal periods, that is 8T, and a repetition period equal to 32T. These impulses are used mainly in static introduction, as will later be seen in connection with the impulses $\overline{E0}$. Certain coincidences of impulses which, as will be later seen, are used mainly in static introduction and for the extraction of data from memories, are shown by identical hatchings (Fig. 13). It will be seen from Figure 13 that the front edges of impulses C and D of train D5, which coincide with two impulses $\overline{E0}$ and two impulses E4 respectively, are spaced 96 decimal periods apart. During this space of time, 8 explorations by the 12 brushes 213 to 224 take place, since each exploration lasts 12 decimal periods. The delivery of a pulse by regenerator 314 at an instant $p/8/2$, $p$ being a multiple of 12, takes place 4 decimal periods after the commencement of the impulse D4 which is produced just after or at the beginning of the degree 14 of any "machine point." This impulse initiates the impulse train A2 which will hereinafter be called the "unifier train." This delay of four periods T always permits the formation of this train in the two cases considered in the foregoing.

It will also be assumed that the coincidence of a unifier impulse with an impule I.96 has the effect on the one hand of initiating the emission of negative timing impulses A3 by generator 323, and on the other hand of stopping the circulation of the impulses in unifier 311. The impulses thus emitted through output 332 of generator 323 stop at the beginning of the following machine point. It will therefore be seen that there is only one coincidence of an impulse I.96 with a unifier impulse for each machine point. It will further be assumed that this coincidence initiates the emission of positive timing impulses A3 by generator 326. This emission is blocked, as will be seen, by the impulse I.96 which follows the aforesaid coincidence. The coding memory 308 comprises an impulse-circulation loop 333—334—335—336—337—338. This loop comprises three regenerators 334, 336 and 338 and a delay line 337, the time of transmission of which is equal to 3.25a. The upper input of the loop consists of a gate 333 having two diodes, and its lower input of a gate 344 which controls the access of the impulses to a regenerator 340. The outputs of opposite polarity of these regenerators 334 and 340 are connected in pairs to form two gates 341 and 342 which both give access to the loop 333 ... 338 at the point 335. Consequently, two impulses arriving simultaneously through inputs 333 and 339 cannot enter the loop, while an impulse arriving alone through one of the inputs penetrates therein. Input 307 of regenerator 336, connected to input 212a of gate 212 (Fig. 12), by regenerator 306, forms the output of the loop 333—334 ... 338. The output of gate 341 is in addition connected to the lower diode of buffer 339 by connection 341—343, which comprises delay line 343, the time of transmission through which is equal to 0.75×a. The upper diode of buffer 339 is connected to the output of a gate 344 having three inputs. The centre input of the latter gate is connected to line 312—313, its upper input is connected to a contact 345, controlled by a cam not shown in the drawing, and its lower output with the unifier by connection 309—310. It will thus be seen that this gate 344 receives at the commencement of each "relay closing period" unifier impulses and an impulse I.96. Its upper input is brought by the aforesaid contact to a permissive potential during the part 9/7 to 0/7 of each cycle of the tabulating machine, the first figure representing the machine point and the second, the corresponding degree. During the remainder of the time, this input is brought to a blocking potential. Loop 333—334 ... 338 is in addition connected at 335 to the output of a gate 346 having two diodes. The latter are connected respectively to generator 326 by connection 317—318 and to the spring 347 of a contact unit of a relay 316 called the "resetting to nine relay." The spring 348 of this relay is connected to the upper diode of the aforesaid gate 333, by way of a buffer 351. The upper input of the latter is connected with a delay line 349, the delay value of which is a. This line is in turn connected at its other end to a stud 350 through which timing impulses B2 arrive. Means not shown in the drawing energize relay 316 from degree 7 of the zero machine point (instant 0/7) to degree 7 of machine point 11 (instant 11/7) of each scanning cycle of the tabulator. Consequently during this time, hereinafter called the interval M, the spring 347 is in contact with the lever spring 315, whereby it is brought to a permissive voltage with respect to gate 346, while line 348—351 is brought to a blocking voltage. During the remainder of the time, i. e. from instant 11/7 of one cycle to instant 0/7 of the following cycle, the spring 348 in contact with the lever spring 315 is open, so that gate 346 is blocked because the voltages of the contact springs 347, 348 are then permuted. It has been seen that at degree 14 of each machine point, positive timing impulses A3 arrive at this gate 346 through connection 317—318. They only pass through this gate from instant 0/14 to an instant prior to instant 0/24, because their crest voltage is then substantially equal to that of spring 347, from there they penetrate into loop 335—336—338 by means of input 335. After having passed completely around the said loop, they reach gate 333, which is periodically closed during the interval of time M in question, through line 349—350. During this interval of time M, the said gate is therefore periodically closed during two out of every four binary periods, these closing periods being designated by 4 and 8 in Fig. 4 and corresponding to trains B1 and $\overline{\text{B1}}$ owing to a delay $a$ introduced by delay line 349. Regenerator 334, therefore receives during the time M, impulses equivalent to impulses B1 and $\overline{\text{B1}}$ already mentioned and can regenerate them at instants $n/4/3$ and $n/8/3$ because no impulse reaches regenerator 340 during time M, by reason of the fact that the upper input 345 of gate 344 is blocked from the instant 0/7 of one scanning cycle to the instant 9/7 of the following machine cycle. If the impulses emitted by regenerator 306 (Fig. 10) for the timing impulse A4 could be regenerated during the time M by the regenerator 47 situated in Fig. 6 at the input of memory M3, they could reach the point 48 of this memory at instants $n/8/1$ and $n/1/1$. With respect to the impulses circulating in this memory they would therefore have the values 8 and 1 and would constitute the coded representation of the digit 9, which would be emitted at every decimal period. Actually, this pulse group circulates in loop 333—334—336—338 without leaving it, from instant 0/7 until instant 9/7 because input 212b of gate 212, Fig. 12, is during this time brought to a blocking voltage. In effect, on one hand, input 324—325 of gate 299 (Fig. 12) is brought to a blocking voltage by the tabulator, during this time, and on the other hand there are no impulses in circulation in quadrupler 300—301—302—303 at the machine point 0. It will hereinafter be seen that the emission of the pulse group representing 9 into the memory M3 takes place repeatedly from the degree 7 of the point 9 to degree 14 of this point.

The circuit arrangement and the operation of the quadrupler in conjunction with regenerator 278 and gate 299 will now be described, which operation permits introducing at the proper place the pulse groups representing the machine points in memory M3 in the course of points 9 to 1.

As has already been stated, this quadrupler consists of a loop 300—301—302—303—304, and it comprises a regenerator 301, a delay line 303, the delay value of which is equal to 0.75a, and a gate 304 having two diodes, one of which receives negative impulses $n/8/3$ through a regenerator not shown in the drawing. Regenerator 278 is also controlled by impulses $n/8/3$. Referring to Figure 4, it will therefore be seen that, taking into account the passages permitted by lines 291 to 297, called decimal timing lines, the exploration impulses corresponding to the increasing decimal orders will leave regenerator 278 at the following successive instants: 11/8/3, 12/8/3, 13/8/3, 14/8/3, 15/8/3, 16/8/3 ... 22/8/3, the decimal periods being determined to within a multiple of 12. It is known that at the beginning of machine point 9, i. e. from degree 7 to degree 14 of this point, gate 299 is permeable to the impulses for the exploration of the perforations in the card because its upper and center inputs are brought to a continuous permissive potential. Gate 298 is then blocked by its input 298b, which is brought to a blocking potential by the tabulating machine during each scanning cycle, except during one of the calculation points 0 to 15 of this cycle, chosen at will. During this point input 298b is brought to a permissive voltage. During the closing periods of the circuit breaker 320, gate 344 of the machine point deducting device is blocked by its lower input connected to the upper output of regenerator 353 of the unifier and no impulse is therefore introduced during this period into loop 333—334 ... 338 of this deducting device. If the number perforated in the analysed card has a unit digit equal to 9, line 249 transmits an exploring impulse at instant 11/8/2 to regenerator 278, which reproduces it at the instant 11/8/3. It passes through gate 299 and regenerator 301 and finally reaches input 212b of regenerator 212 at instant 11/8/4. At the same instant, an impulse emitted by regenerator 306 reaches the other input 212a of the gate. At its arrival at point 48 (Fig. 6) of memory M3, this impulse has a value or weight 1 after regeneration by the regenerator 47 (Fig. 6), as has been stated in the foregoing. The impulse set in circulation in loop 300—301—302—304 returns three times into regenerator 301, and arrives for the fourth time at output 302 of the loop at instant $11/8/2 + 3.25a = 12/4/4$. It reaches the gate 212 at the same time as one of the impulses $n/4/4$ emitted by the machine point deducting device 308 and penetrates into the memory at instant $n/4/4$, it therefore has the value 8. The impulse in circulation in the loop then reaches gate 304 at instant $$12/4/4 + 0.75a = 12/8/3$$

and is therefore blocked by this gate, which receives impulses $n/8/3$. The code 9 has therefore been introduced into the memory in its proper position because, as has been seen in the foregoing, the total duration of exploration of the 12 columns of the perforated card is equal to the time taken in travelling through the memory. The passages from the digit 9 to the digit 8, and then from the digit 8 to the digit 7, etc. and the digit cancellation take place during the opening times of the circuit breaker, which correspond to the machine points 9, 8, etc. . . . 1. In fact, at degree 14 of point 9 the opening of the circuit breaker 320 determines, as has been seen, a single coincidence of an impulse I.96 with a unifying impulse. This coincidence occurs at an instant $r/8/2$, $r$ being a multiple of 12. A positive impulse passes through gate 344 of the deducting device 308 at this instant and is transmitted by regenerator 340 to gate 341 at instant $r/8/3$. At the same instant, a negative impulse emitted by regenerator 334 reaches the same gate, which does not transmit anything into loop 333—334 . . . 338, in the same way as gate 342 which also receives a positive impulse from regenerator 334. Impulse $n/4/3$ of value 8 at point 48 of memory M3 therefore continues to circulate alone in the loop for the duration of one machine point. At degree 14 of point 8, another impulse $r'/8/3$ ($r'$ still being a multiple of 12) is produced by regenerator 340, arrives alone at gate 341, passes therethrough and simultaneously enters loop 335—336 . . . 333 and loop 341—343—339, the time of transmission through which is $a$. The said impulse again passes through gate 341 at the instant $(r'+1)/1/3$ and $(r'+1)/2/3$ and is blocked thereby at instant $(r'+1)/4/3$ at the same time as the positive impulse emitted at the same instant by regenerator 334 is blocked by gate 342. Now, the three fresh impulses thus set in circulation in the loop have the values 1, 2 and 4 at point 48 of M3 (Fig. 6). The new pulse group introduced into this loop thus represents the digit 7.

The combined operation of unifier 311, impulse generators 326 and 323 and regenerator 314 will now be examined in detail. The general features of this operation have been given in the foregoing. The unifier consists of a loop 352—353—354—355—356, which comprises an impulse regenerator 353, a delay line 355, having a delay value 0.75$a$ and gate 356. Impulse generator 323 comprises a loop 357—358—359—360, which comprises an impulse regenerator 358, a delay line 359 having a delay value 0.75$a$ and a gate 360. The lower output 332 of regenerator 358 is connected by line 361—362 to the center input of gate 299 Fig. 12 on the one hand, and to one of the two inputs of gate 356 of the unifier through a delay line 362 having a delay value of 0.5$a$ on the other hand. Impulse generator 326 is formed of a loop 363—364—365—366—367—368, which comprises a regenerator 364, a delay line 366 having a delay value of 0.75$a$ and a gate 368. Inputs 357 and 363 of regenerators 358 and 364 are connected to the output of a gate 369 connected by its inputs to the outputs of unifier 311 and of impulse regenerator 314. Immediately after the excitation of the brush feeding relay 320, an impulse is regenerated by regenerator 353 and set in circulation in loop 352—353—355—356. The said impulse passes through gate 356 because the instant regenerator 358 is in the inoperative state, and it continues its circulation in the loop until instant 8/2, at which an impulse I.96 is emitted. At this instant, these two impulses pass through gate 369 and are directed, the first towards loop 357—358—360 and the second towards loop 363—364—366—368. A first impulse circulates in loop 357—358—360 as long as gate 360 is closed, that is to say as long as the relay 320 is energized. It is known, in fact, that the deenergization of the said brush feeding relay brings the output 329 to a blocking voltage and blocks gate 360. During the closing period of the relay 320 and after the first impulse I.96 which occurs then, the negative timing impulses A3 which reach gate 356 block it at the instants $n/n/1$ and consequently after the first coincidence before mentioned stop the impulse circulating in the loop of unifier 311.

The impulse which has penetrated into loop 363—364—366—368 circulates therein until the emission of the following impulse I.96 by regenerator 314. This impulse blocks gate 368 at the precise instant at which it is reached by the impulse circulating in the loop in question, so that regenerator 364 emits 96 consecutive impulses. Furthermore, regenerator 319 regenerates the last impulse in circulation and therefore also provides 96 consecutive impulses. The static introduction, the performance of which will hereinafter be considered with reference to Figures 9 to 12, the manner of assembly of which is indicated in the right hand corner of Figure 12, differs from the kinematic introduction in that, instead of entire coded decimal digits being sent into circulating memory M3, exploring impulses are employed in order to send successively into the said memory selected impulses of value 1, 2, 4 or 8. This method of introduction is particularly designed for exploring the read-out commutators of an accumulator as those of a tabulating machine in the inoperative state. By means which will hereinafter be described, the introduction in memory M3 of all the digits of same value stored in the totalizer is effected entirely during the machine point designated by this value. The operations are effected by means here described and shown in Figs. 9 to 12. The introduction of a complete decimal digit into a storage cell of memory M3 therefore takes place a number of times equal to the number of binary components contained in the said decimal digit. The horizontal lines 225 to 236 of Figure 9 now represent the vertical bars of read-out commutators and brushes 213 to 224 have no significance here. There correspond to these bars nine horizontal bars represented by vertical lines 370 to 378. These bars are connected at their lower ends to springs of the make-contact units of a series of relays 379 to 387, the coil inputs of which are connected in parallel to a line 388—277—389 (Figs. 11, 12) of which the left-hand side 388 is connected to one of the output of a continuous voltage source 392 and the right-hand end 389 of which is connected to the coil of aforementioned relay 305. The output ends of the coils of the said relays are connected to a line 390—391, this line is itself connected at 391 to line 273—274—275, which is in turn connected to source 392, above mentioned, whose function will be explained later on and also to the output ends of coils 237—248. Relay 305 connects to input 212$a$ of gate 212 either the output of the coding memory 308 during the kinematic introduction by contact 305$a$, or the pyramid of gates 393 permitting the static introduction through contact 305$b$. The lever springs of these nine relays 379 to 387 are respectively connected to the nine secondary windings of nine transformers which form the outputs of nine power stages. These stages receive timing impulses at their inputs through 9 gates 394 to 402. These power stages are represented by rectangles 546 to 554. They permit of considerably increasing the energy of the impulses which they receive in order to enable the exploring impulses to pass through numerous high-capacity cabled circuits. The two input gates 394 to 402 each have an input connected to a line 403—404—405, in which is inserted a circuit diagrammatically represented by rectangle 406. This circuit which is hereinafter described in connection with Figs. 16, 17a and 17b, permits transforming each series of timing impulses A3 supplied by regenerator 319 to a continuous permissive voltage imparted during a period, the commencement and end of which coincides respectively with the first and last impulse provided by the aforementioned device i. e. during a time interval equal to 96T. The other inputs of gates 394 to 402 are individually connected to one or more of the lines 407—408—409—410 through which impulses $E_1$, $E_2$, $E_3$ and $E_4$ respectively (see Figure 4) arrive. The impulses $E_1$ have the object of seeking the binary components 1, that is to say the odd numbers stored in the totaliser. Line 407 is for this reason connected in parallel by connections 411—412—413—414—415 to gates 394—398—400 and 402, which are as has been seen connected respectively to the horizontal bars of the lines of studs 1, 3, 5, 7 and 9 of the read-out commutator. The impulses $E_2$ have the object of seeking the binary component 2. Line 408 is therefore connected to one of the inputs of gates 395—396—399 and 400 which correspond to the stud lines 2, 3, 6 and 7 respectively of the read-out commutator. Line 409 through which the impulses $E_3$ intended to seek the binary component 4 arrives, is connected in parallel with one of the inputs of gates 397, 398 and 399 which correspond to the lines of contacts 4, 5 and 6 respectively. Line 410 which feeds the impulses $E_4$ for seeking the binary component 8 is connected to two inputs of gates 401 and 402 which correspond to the lines of studs 8 and 9 of the read-out commutator. It will be noted that the inputs of the coils of relays 237 to 248 are connected in parallel to a line 276—277, which is connected to line 388—277—389 which connects coils 379 to 387 to one of the terminals of an aforementioned continuous current source 392. This source is suitable for creating a sufficient potential difference between its terminals to energise relays 379 to 387 and 237 to 248 during time of the static introduction by means not shown in the diagram, and is sufficient to cancel their voltage during other times. It will be seen that static introduction lasts 96T as has been stated in the foregoing, the relay 305 connects a pyramid of gates 393 to the input 212a of the gate 212 during the static introduction.

The 8 inputs 416 to 463 of this pyramid introduce the impulse trains E1, $\overline{B2}$, E2, $\overline{B1}$, E3, B2, B1 and E4 respectively.

It will be seen that lines 416—417 and 422 form the inputs of a gate 424 which supplies a permissive voltage during the coincidence of impulses E1, B1 and $\overline{B2}$. Lines 417, 418 and 419 form the inputs of a second gate 421 which opens during coincidence E2, $\overline{B1}$ and $\overline{B2}$. The lines 420, 421 and 422 form the inputs of a third gate 426 which is opened during coincidence E3, B1 and B2. Finally, lines 419, 421 and 423 form a fourth gate 427 which closes during the coincidence of impulses E4, $\overline{B1}$ and B2.

The outputs of the four gates 424, 425, 426 and 427 are connected in parallel, through an impulse regenerator 428 for providing the timing impulse A4, to the off-normal contact of the aforesaid relay 305b of relay 305, already mentioned.

Concerning gate 550 (Fig. 10), it has been seen in the foregoing that coincidences B1, $\overline{B2}$ define impulses which, when regenerated by a regenerator for timing impulses A4, correspond to instants $n/8/4$, and that these impulses $n/8/4$ are converted into impulses of value 1 when they pass to point 48 (Fig. 6) of memory M3. This is the kind of impulses provided by gate 424 referring to Figures 4 and 13, it will be seen that gate 425 associated with regenerator 428 similarly supplies impulses $n/1/4$ which will have the value 2 at passage to the point mentioned of memory M3.

Gate 426 similarly provides, in conjunction with the aforesaid regenerator, impulses $n/2/4$ having the value 4 in the memory. Finally, gate 427 provides under the same conditions impulses $n/4/4$ which have the value 8 in the memory.

The static exploration voltages which are provided by gates 394 to 402, and are transmitted by gates 279 to 290, controlled by the decimal impulse trains D, reach impulse regenerator 278 and are regenerated therein at instants $n/8/3$.

The said impulses are blocked at the outlet during the static introduction gate 299, as has already been stated. Gate 298 is connected by its lower output to an impulse source $\overline{E0}$. The third input of this gate from the top is connected to a regenerator 319 which at each opening of circuit breaker 320 supplies the same timing impulses A3 in synchronism with generator 326 and also supplies a 96th impulse, one binary period after the 96th impulse emitted by this generator, actually the input of regenerator 319 is connected to point 367 of loop 364—365—366—368.

According to Fig. 13 the impulses issuing from regenerator 278 (Fig. 12) therefore will only be permitted to pass through gate 298 during the second half of impulses E. These impulses take a certain time to be set up in the circuits and the timing impulse $\overline{E0}$ permits of eliminating all the uncertainties regarding the suitable establishment thereof. Examination of Figure 13 shows that no exploration takes place during the coinciding of impulse C of train D5 with the first impulse E4 resulting from the delay introduced by regenerator 319. Impulse J of train E1 coincides in its second half with an impulse D4 designated by B. Now, the latter impulse only permits, over lines 249 to 260, the passage of exploring impulses corresponding to vertical bars corresponding to the decimal orders 7 to 10 inclusive.

It will therefore be seen that if one of these bars is connected to a horizontal bar corresponding to an odd digit, it will allow an exploring impulse to pass during coincidence D4, E1.

On examination of Figure 4, it will be seen that this impulse will pass through bar 7 from instant 17/4/3 to instant 18/1/3, these decimal periods being given.

The passage of the impulse corresponding to the last bar 10 will take place from instant 20/4/3 to the instant 21/2/2.

In the aforesaid case in which vertical bar 7 is connected to horizontal bar 1, an impulse will therefore be regenerated by regenerator 278 at instant 17/8/3. At this same instant, regenerator 319 will send an impulse into the corresponding input of gate 298, so that the regenerated impulse will pass through this gate and penetrate into quadrupler 300, 301, 302, 303, 304. At instant 17/8/4, regenerator 301 of this quadrupler will send an impulse to input 212b of gate 212. The latter will at the same time receive at its input 212a an impulse emitted by regenerator 428.

It will therefore be seen that there will correspond to the digit 1 registered in the sixth denomination of the totaliser from the units denomination, an impulse of weight 1 sent in to memory M3 through pyramid 393.

Figure 13 also shows that the second half K of the second impulse $E_1$ coincides with impulse E of the timing system D3. During this coincidence, the decimal timing lines 291 to 297 will permit of exploring the vertical bars falling into the decimal orders 3 to 6 inclusive. It will likewise be seen that the second half L of the third impulse $E_1$ coincides with impulse F of the timing system D5. During this coincidence, the exploration of bars 11, 12 and 1, 2 will take place. At the end of this third impulse, all the impulses of weight 1 will therefore have been brought into position in memory M3. In like manner the second half M of the first impulse $E_2$ coincides with impulse G of the timing system D3. During this coincidence, vertical bars 3 to 6 inclusive will be explored in order to identify the binary component 2. During the second half N of the second impulse $E_2$, which half coincides with the impulse H of the timing system D5, the binary component 2 will be sought in bars 11, 12, 1 and 2, while during the second half 0 of the third impulse $E_2$, this component will be sought in bars 7 to 10. During the second half B of the first impulse $E_3$, which coincides with impulse S of the timing system D5, the binary component 4 will be sought in bars 11, 12, 1 and 2. During the second half Q of the second impulse $E_3$, which coincides with impulse R of the timing system $D_4$, the binary component 4 will be sought in bars 7 to 10, and the same search will take place in bars 3 to 6 in the course of the second half T of the third impulse $E_3$, which coincides with an impulse $D_3$. The second half U of the second impulse $E_4$ which coincides with an impulse D4, will be employed to seek the binary component 8 in bars 7 to 10. The second half V of the third impulse E4 will likewise be utilised to seek this component in bars 3 to 6 and the second half W of the fourth impulse $E_4$ will be utilised to seek this same component in bars 11, 12, 1 and 2.

It will therefore be seen that at the end of three repetition periods of the impulses E, that is to say, at the end of $3 \times 32 = 96$ decimal periods, all the binary components of the digits registered in the totaliser will have been entered in memory M3.

As in the case of the kinematic introduction, any impulse regenerated by regenerator 278 at an instant $n/8/3$ will be quadrupled in the quadrupler, but gate 212 will only allow that one of the four successive impulses thus obtained to pass which coincides with the binary impulse emitted at this instant by regenerator 428.

According to the embodiment of the data-extracting device which is illustrated in Figures 14 and 15, the manner of assembly of which is indicated in Figure 14, a device 429, hereinafter called the extraction comparator, is bounded by a dash-dotted rectangle. The said comparator is connected by its input 430 to an impulse-circulation loop 431, hereinafter called the extraction quadrupler, which is bounded by a dash-dotted rectangle.

The said comparator 429 is connected by two other inputs 432, 433 and 434 to the lower and upper outputs respectively of a regenerator 435 for timing impulses A4. The said regenerator can supply, as will hereinafter be explained, pulse groups representing the number of the machine point which is in progress and which groups are transmitted by lines 436—437—523 connected to output 307 of loops 334, 335, 336, 337, 338 (Fig. 10) of machine point deducting device 308. The said comparator 429 is connected by a fourth input 438 to memory M3 of Figs. 6 and 8. The sole output 439 of comparator 429 forms one of the three inputs of a gate 440 which is connected by its output to an impulse-widening device 441 similar to device 406 of Figure 9. This widening device is connected by its output 442—443 to one branch of each of the twelve impedances 444 to 455, which are formed respectively by groups of three resistances having a common point. The other 24 resistances of these twelve impedances are individually connected to one of the seven lines 456 to 462 which transmit timing impulses D3, D4, D5, E1, E2, E3 and E4 respectively and which are shown in Figures 4 and 13. The point common to the three resistances of each of the impedances 444 to 455 is connected to the grid of a thyratron which energises a relay. The latter controls a make-and-break contact which, in the operative position, energises through a contact stud a printing device corresponding to a predetermined column of a document on which it is desired to reproduce the result of the operation effected. In other words, impedances 444 to 455 are connected in the manner described to twelve thyratrons 463 to 474 respectively, the anodes of which are connected to the coils of the twelve relays 475 to 486. There correspond to these twelve relays twelve make-and-break contacts 487 to 498 and twelve control studs 499 to 510 above which the corresponding orders of unities from 1 to 12 have been traced.

It will be obvious that these studs may control totaliser wheels or any other device for recording data instead of printing devices. The said studs 499 to 510 correspond respectively to the increasing decimal orders, that is to say, to orders ranging from the units order to the order $10^{11}$.

The extraction quadrupler 431 hereinbefore referred to is connected by its input 511 to various combinations of gates having five inputs. The first three inputs 512a, 512b, and 512c forming a gate 512 transmits the impulse trains $\overline{E0}$, $\overline{B1}$, B2 respectively. The other two inputs may be chosen from four combinations owing to the connection 513 by which input 511 of the quadrupler is connected to the outputs of four gates 514, 515, 516 and 517 having two inputs.

Gate 514 receives at its input 514a the coincidences of the impulse trains D1 and D2 and at its input 514b the impulse train E1. Gate 515 receives at its input 515a the coincidences of the impulse trains $\overline{D1}$ and D2 and at its other input 515b the impulse train E2. Gate 516 receives at its input 516a the coincidences of the impulse trains D1 and $\overline{D2}$ and at its other input 516b the impulse train E3. Gate 517 receives at its input 517a the coincidences of the impulse trains $\overline{D1}$ and $\overline{D2}$ and at its other input 517b the impulse train E.4.

Considering the gate having five inputs formed by the combination 512—514, it will be seen on reference to Figures 4 and 13 that during the second half J of the first impulse E1 this gate will be opened during an interval of time substantially equal to one quarter of a decimal period $18/1/n$, varying between 1 and 4.

According to what has been stated in the foregoing regarding the decimal timing lines 291 to 297, shown in Figure 9, this opening period of the gate during coincidence D1, D2 corresponds to the introduction of the digit of the seventh decimal order. When this semi-impulse J is ended, the second half M of the following impulse E2 will correspond to the closing of gate 512—515 for a new period of time substantially equal to the first and which will correspond to the introduction of the digit of the fourth decimal order.

Considering the second halves P and U of impulses E3 and E4 which succeed the aforesaid impulse E2, it will be seen that the opening intervals of the corresponding gates 512—516 and 512—517 will correspond to the introduction of the unit order and of the decimal order 10 stored in the memory.

On examining the freeing of impulse cycles E following the first aforesaid cycle, it will be seen that gate 512—514 will always open during periods of time corresponding to the introduction of the decimal orders 3, 7 and 11 of the aforesaid number. Similarly, gate 512—515 will open at periods corresponding to the introduction of the decimal orders 4, 8 and 12 of the same number. Gate 512—516 will correspond to the introduction of the decimal orders 1, 5 and 9 of this number and gate 512—517 will be opened during periods corresponding to the introduction of the decimal orders 2, 6 and 10 of the said number.

Connection 438 by which memory M3 communicates with the extraction comparator 429 is connected (Fig. 6) to a point of this memory separated from its input 46 by regenerators and delay lines not shown in Fig. 12, which correspond to a total delay of $0.75a$.

Now, the impulse emitted by machine-point deducting device 308 (Fig. 10) at instant 13/8/3 leaves regenerator 77 (Fig. 6) of this memory at instant 14/1/1, and then has the value 1 as a result of two regenerations of timing impulses A4 and A1. This regenerator 47 of timing A1 is not shown in Figure 12. In order to remain in synchronism with the impulse of value 1 which arrives by input 438 of comparator 429 at instant $3/8/4+0.75a=14/1/3$ the impulse of value 1 of the code transmitted by line 436—437 must arrive in regenerator 435 at instant $13/8/3+0.75a+0.25a=14/1/3$. Delay line 437 will therefore have a time of transmission equal to $a$. If connection 438 has been connected to a point of memory M3 separated from its input 46 by devices which introduce a delay $f$ of twelve or less decimal periods, delay line 437 should have a value equal to $(f+0.25a)$ and the timing impulses applied to gates 512, 514, 515, 516 and 517 should be chosen so as to have at output 430 of quadrupler 431 impulses of value 1, 2, 4 and 8 of a decimal order which will be fixed by Figures 4 and 13 as a function of the value $f$.

Extraction quadrupler 431 consists of a circulation loop 518—519—520—521—522 which comprises a regenerator 519 for timing impulses A3, a delay line 521 having a transmission time equal to $0.75a$ and a gate 522 having two inputs.

One of the inputs of this gate 522 is connected by a buffer to two lines 524, 525 which introduce the impulse trains B1 and B2 respectively, the permissive periods which are translated by the symbols $n_1/2/n_2$ and $n_1/4/n_2$ and $n_1/8/n_2$, it being possible for the figures $n_2$ to have one of the values 1, 2, 3 and 4, while $n_1$ may be of any value.

On examining Figures 4 and 13, it will therefore be seen that during the second half J of the first impulse $E_1$ which corresponds to the closing of the combined gate 512—514, initial impulse will be produced at instant 18/1/3 by regenerator 519, the value 18 of the decimal period being given to within a multiple of 12. This impulse will therefore enter loop 520—521—522 and will be brought to gate 522 at instant 18/2/2. The said impulse will be permitted to pass by this gate and will make three ¾ further circuits of the loop before returning to this gate at instant 19/1/2. At this instant, it will be blocked by the said gate.

It will therefore be seen that regenerator 519 will have emitted in all, four regularly recurrent impulses in a time equal to $3a$. The first of these impulses will coincide with an impulse of weight 1 sent into memory M3 by machine-point deducting device 308 during a kinematic introduction and collects at 438.

Extraction comparator 429 comprises two regenerators 524, 525 for timing impulses A4, the inputs of which are connected to lines 430 and 438 respectively. The upper output 525$a$ of regenerator 525 forms one of the three inputs of a gate 526. The lower input of the latter gate is connected to the lower output 433 of regenerator 435, and its upper input is connected to upper output 524$a$ of regenerator 524. The lower output 525$b$ of regenerator 525 forms the upper input of gate 527, the second input of which is formed by connection 434 and the lower input of which is connected to the upper output 524$a$ of regenerator 524.

The outputs of gates 526 and 527 are connected in parallel to the input of a loop 528—529—530—531, in which are situated a regenerator 529 and a delay line 530, the time of transmission of which is equal to $0.75a$.

The lower output 439 of regenerator 529 forms one of the three inputs of the aforesaid gate 440. The lower input 440$b$ of this gate is connected to a line 532—533 to which means not shown in the drawing impart a permissive voltage when the calculator is not effecting any operation, that is to say, in the introduction or extraction phase $P_0$. These means may consist of a regenerator, the input of which is connected to all the loops such as 176, 177, 178, 181, in which impulses circulate in the course of operation. When no impulse is circulating therein, this regenerator produces a permissive voltage at its lower output.

In other words, this line 532—533 is brought to the same voltage as the aforesaid output 439 of regenerator 529 when these operations are completed.

The center input 440$c$ of gate 440 is conencted to output 536 of a loop 534—535—537—538. This loop comprises an input 534, a regenerator 435 for timing impulses A1, a delay line 537, the delay value of which is equal to $0.75a$, and gate 538 having two inputs. The lower input of the gate 538 is connected to the lower output of regenerator 539. The said regenerator is in turn connected at its input to a gate 540 having three inputs. The upper input of the latter feeds impulses $n/8/3$, the center input feeds impulses E0 and the lower input is connected to input 517$a$ of gate 417, i. e. it causes permissive voltages during coincidences $\overline{D1}$ and $\overline{D2}$.

Input 534 of the aforesaid loop 535—537—538 is connected through a delay line 541, the time of transmission through which is equal to $0.5a$, to the output of a gate 542 having four inputs, which supplies impulses $x/1/2$.

In fact, the upper output of this gate introduces impulses E0. The second input of the said gate from the top is connected to input 514$a$ of gate 514 and therefore feeds thereto one impulse for each coincidence of D1 with D2.

The third input of the said gate from the top introduces impulses $\overline{B1}$, while its fourth input introduces impulses $\overline{B2}$. These timing impulses are obviously chosen as a function of the delay undergone in memory M3 by an impulse of a weight of a predetermined decimal order, before being transmitted to comparator 429.

As has been stated in the foregoing, the center input of gate 527 and the lower input of gate 526 are connected to the outputs of regenerator 435. The input of the latter is connected in parallel, through rectifier cells 545, to line 436—437—523 which transmits the machine point coded value, in this manner to lines 543 and 544.

Line 543 feeds to the input of regenerator 435 positive impulses supplied by the aforementioned generator 326 of Fig. 10.

Line 544 feeds thereto negative impulses supplied by generator 323 of Fig. 10.

It will thus be seen that during the emission of positive timing impulses A3 by generator 326 (Fig. 10) that is to say, during part of the opening of circuit breaker 320 corresponding to the machine point in progress this part being equal to 96 decimal periods which pass between the first and the second impulse I.96 which succeed this opening, these timing impulses A3 are substituted for the coded value of the machine point in progress. In fact, the presence of cells 545 prevents the transmission of the negative impulses transmitted by line 544, but permits the passage of the positive impulses transmitted through the other two lines. When the second impulse I.96 takes place, the train transmitted through line 543 is cancelled out and the negative impulses are maintained. Said coded value is then transmitted during $n$ time intervals, all equal to 96 decimal periods, so that it is possible, as will be seen, to extract from the memory all the digits which it contains, which are equal to the machine point in progress. During the first aforesaid interval of 96 decimal periods, regenerator 435 receives impulses which, in binary figures, represent the number $15=1+2+4+8$. Since this number is not stored in any decimal place of memory M3, comparator 429 cannot register during this period any equality of the machine point coded value with the impulses which it receives from the memory. Examination of the circuits of the comparator shows that if three impulses arrive simultaneously in regenerators 524, 525, and 435 none of them will pass through gates 526 and 527. On the other hand, if only one of the regenerators 525 or 435 emits two impulses at the same time as regenerator 524, an impulse passes through one of the gates 526 and 527 and is set in circulation in loop 528—529—530—531. It will therefore be seen that if the machine point in progress differs from the digit which is stored in memory M3 in the decimal place corresponding to a group of 4 impulses of extraction quadrupler 431, regenerator 529 will supply negative impulses at its output to the upper input 440a of gate 440. These impulses follow one another at intervals of one binary period. According to what has hereinbefore been stated, gate 542 is freed during impulse E0 which follows impulse E0 during which the machine point value has been transmitted. If, for example, the transmission to comparator 429 of the digit lodged in the seventh decimal place of memory M3 in coincidence with the closing of the combined gate 512—514 is considered, it will be seen that whatever this digit may be, gate 542 transmits to its output, during the aforesaid impulse E0, impulses $x/1/2$, $x$ being equal to one of the four decimal periods limited by impulse E0. These impulses are set in circulation in loop 534, 535, 537, 538.

Assuming that the digit of the seventh decimal order has been introduced into comparator 429 during the 18th decimal period, it will be seen that, according to Figures 4 and 13, the first positive impulse transmitted to gate 440 by regenerator 535 reaches it at instant 22/2/1. Other impulses forming a regular timing train A1 then reach it during this same impulse E0, the last of them preceding, at instant 25/8/1, the emission of a negative impulse 25/8/4 by regenerator 539. This impulse 25/8/4 blocks gate 538, at the actual instant when it is reached by the positive impulse which is circulating in the aforesaid loop 534, 535, 538. Through connection 546—547 between the output of this regenerator 539 and gate 531 of loop 528—529—530—531, this impulse 25/8/4 also blocks in this latter loop the positive impulse circulating therein. It will therefore be seen that this impulse 25/8/4 returns the comparator to zero before a further comparison.

If the digit of the seventh decimal order of the number stored in memory M3 is equal to the coded value of the machine point in progress, gate 440 is periodically deblocked during the impulse E0 which succeeds coincidence E1, E0 corresponding to the seventh decimal order. Impulse-widening device 441 therefore supplies a continuous positive voltage at the aforesaid instant 22/2/1 until instant 25/8/51 by known means, which are not shown in the drawing. Output 442—443 of device 441 is brought during this interval of time to a potential sufficient to free the thyratrons 463 to 474. In order that the grid of one of them may be brought to this ignition potential, the two right-hand resistances of the impedance connected to this grid, which are normally at an extinction voltage, must be brought to the same potential as the left-hand resistance. Now, it will be seen that when output 442—443 is at the ignition potential, lines 458 and 460 transmit impulses D5 and E2 respectively to the two right-hand resistances of impedance 449 which corresponds to the seventh decimal order. The crest voltages of these impulses are substantially equal to the voltage transmitted by output 442—443.

The grid of the thyratron 469 is therefore brought to an ignition voltage during the period of the impulse D5, which coincides with the aforesaid impulse E0. This period of time is ample to permit it to energize the corresponding relay 481. The latter relay closes its off-normal contact and actuates through stud 505 the device of the tabulating machine which has the object of registering a digit of decimal order 7 equal to the machine point in progress.

It will be seen from the foregoing that in the course of one machine point, it is possible to register, either by printing or by actuating a totaliser, or by any other means, all the figures stored in memory M3, which are equal to this machine point.

The extinction of the thyratron is effected by the negative voltage applied to line 442—443 by the aforesaid impulse-widener 441, at the end of an impulse E0 during which a digit of a predetermined decimal order has been registered.

By means of Figs. 16, 17a and 17b, the device 406 which has been diagrammatically represented by a rectangle in Fig. 11 will now be described.

Fig. 16 shows diagrammatically, by way of a non-restrictive example, the arrangement of the aforementioned circuit, which will hereinafter be called impulse broadening circuit. The upper output 319a of regenerator 319 of Fig. 10 is, through the intermediary of a two input buffer 555, connected to the control grid 556c of a pentode 556. The screen grid 556a of this pentode is coupled with its anode 556b by means of the primary 557a of a transformer 557 and to its cathode 556d by a source 569. The unit 570—571 forms a decoupling filter. Primary 557a is coupled to a secondary 557b and 557c the middle 558 of which is connected to the earth by connection 558, 559. The two outputs of this secondary are respectively connected to the input 560 of a pi-filter, by rectifier 561 and 562. The other input 563 of the aforementioned filter is connected to the earth at 559, like the output 564 of this filter.

The other filter output 565 is connected to line 294, 295 of Fig. 11 through a voltage limiter, of which the branches 566 and 567 are respectively connected to terminals 568a and 568b of a source 568. These terminals are brought to voltages $+V_1$ and $+V_2$ which are considerably higher than the voltage of the earth, which is 0 volt.

The buffer 555 herein mentioned, which is placed at the input of the impulse broadening circuit includes a terminal 555c, which is kept at the potential $-V_3$ and is connected to inputs 555a and 555b by a large resistor 570. It is seen that input 555a of buffer 555 is directly connected to output 319a of regenerator 319, while the other input 555b is connected to this output through the intermediary of a delay line 569 having a value of $0.125a$, $a$ being equal to one binary period.

If the diagram of impulse train A3 of Fig. 4 were sufficiently enlarged, it would be seen that the utilizable time length of an A3 impulse, measured along a straight line passing through the middle of these impulses, is equal to $0.375a$. The delay line 569 allows for sending impulses, having a total time length equal to $(0.375+0.125)a = 0.5a$, into the larger resistor 571; the impulses are separated from one another by time intervals equal to $0.5a$, the period $a$ being around $$\frac{1}{170.000}$$

sec. The primary and secondary circuits of transformer 557 are established in such a way that if an isolated flat-topped impulse, having a time length equal to $0.5a$, is sent to grid 556c of pentode 556, it gives rise to a positive impulse in part 557c of the secondary and to a negative impulse in part 557c. A wide-spread negative impulse, called back-swing impulse, of which the time length is well over $0.5a$, succeeds the positive impulse. If the voltage of the output terminal of winding 557c is plotted vs. time, the diagram of Fig. 17a is obtained, wherein it may be noted that impulses $b$, $b_1$, $b_2$, $b_3$, $b_4$, $b_5$, etc. which are successively produced, have the same maximum voltage $V_4$, which is included between $+V_1$ and $+V_2$, but that their minimum voltages algebraically decrease till a value $-V_5$ is reached. This value differs only slightly from $-V_4$ which characterizes the steady-state operation of device 406 of Fig. 11. Owing to the value which has been assigned to the time constant of the electric and magnetic elements of this device, this steady-state operation is established after the fourth impulse. Owing to the crest clipping produced by voltage limiter 566—567, only the part of these impulses shown as hatchings, which is situated above the straight line of ordinate $V_1$, is transmitted to damping filter 560, 563, 564, 565, which includes an induction coil 572. This filter is calculated according to the method described by Terman in pages 494-495 of the book entitled "Radio Engineering" which was published in 1937 by the McGraw Hill Publishing Co.

Fig. 17b shows a diagram which indicates the voltage of the lower extremity of secondary winding 557b, plotted vs. time. This diagram is obviously symmetrical with the one shown in Fig. 17a with respect to an axis X'X, which is equidistant from the axes of the abscissa of these two figures. In effect, a negative impulse $b'$ of Fig. 17b corresponds to a positive impulse $b$ of Fig. 17, which has the same amplitude as the impulse $b$. Limiter 566, 567 transmits to line 294, 295 of Fig. 11 the parts of the backswing impulses which are limited by the straight line $y=+V_1$. The total voltage supplied on line 294, 295 is represented in Fig. 17a by the heavy line which borders the upper hatched area $b$, $b_1$, $c_1$, $b_2$, $c_2$, $b_3$, $c_3$, $b_4$, $c_4$, $b_5$ etc. The irregularity of this total voltage is manifested by harmonics which, for the greater part, are smothered by filter 560, 565, 563, 564 so that the voltage of line 294, 295 will be sufficiently constant for obtaining a good functioning of the gates 394, to 402, which are connected to this line.

The establishment time for the aforementioned direct positive voltage in no way interferes with the scanning of the totalizer by the impulses $E_1$, $E_2$, $E_3$, $E_4$. Indeed, this exploration only begins 4 decimal periods after the beginning of the impulse train emitted by regenerator 319 shown in Fig. 10. The impulses coming from the vertical strips of the totalizer explored should, in effect, cross the gate 298 of Fig. 12, which receives the $\overline{E_0}$ impulses on one of its input terminals.

The Fig. 18 represents a pulse regenerator of the type hereinabove mentioned, whose output is supposed to be connected with a gate. This regenerator is described in the patent application 307,325 filed on August 30, 1952, by Henri Gérard Feissel.

It essentially includes a pentode 642, whose control grid 642a, which is biased below cut-off, receives the positive numerical impulses to be regenerated, while its cathode 642b simultaneously receives negative unblocking impulses under conditions that are indicated further on. The numerical impulses received are reproduced in opposite polarity in the cathode-plate circuit of the pentode and transmitted in positive polarity to the normal output 618a by means of an output transformer 662, which includes a primary 662a, incorporated in this plate circuit, and two secondaries 662b and 662c. These two windings have identical characteristics, except that they are wound in inverse senses. The lower terminal 658 of winding 662c is connected by the line 658, 657, 613b to a top of voltage —V5 on source 613, whose positive terminal is connected to earth. The upper terminal of winding 662b is connected to the earth. The outputs 618a and 618b of these two windings form respectively the normal and inverted outputs of the pulse regenerator. Terminal 613a, which delivers a voltage —V2, is connected by the resistance 661 and through the rectifying cells 651, 659 respectively to the upper and lower extremities of winding 662c. The same terminal 613a is connected to the terminal 647 of the input channel 644, 645, 647 by the line 550, 652. The values of resistors 654 and 652 with respect to the back resistance of element 646a are such that, in the rest condition, the voltage of control grid 642a is —V5.

The distorted impulses to be regenerated, represented by U2, as plotted versus time in Fig. 19, are transmitted by channel 644 and reach the control grid 642a of the pentode 642 through the rectifier element 645 and the resistor 646. The rectifier element 646a, which connects this grid to the ground is used as a voltage limiter.

Terminal 647, which is common to this element 645 and to resistor 646, is itself connected to the upper extremity of the afore-mentioned winding 662c by means of connection 647—648, which includes a rectifier 650.

The cathode-plate circuit of pentode 642 includes a source 653. The screen grid is connected to it through a decoupling filter formed by resistor 654 and condenser 655. The cathode 642b of the pentode is connected to a terminal 653a of this source, which delivers a potential +V4, through the intermediary of the secondary 656a of an impulse transformer 656, whose primary 656b, is connected to the output of a generator G, which delivers to it positive trapezoidal timing impulses. These impulses are transmitted to the cathode in the form of negative impulses of amplitude U1, which are represented in Fig. 19. In the absence of numerical and of timing impulses, the potential difference between control grid 642a and cathode 642b, of pentode 642 is substantially equal to —(V5+V4) that is beyond the cut-off value of this pentode when the anode-to-cathode voltage is (V3—V4).

The Fig. 19 shows that when a distorted impulse arrives at grid 642a at a time $b$ before the corresponding timing impulse of amplitude U1, the pentode remains blocked during that time $b$. It conducts only when the amplitude of this impulse reaches the threshold voltage V6 substantially equal to zero volts, and when simultaneously the cathode voltage becomes substantially equal to (+V4—U1) as a result of the timing impulse. The feedback network 662c, 648, 650, 647, 646, 642a is designed for holding the control grid at an absolute voltage at least equal to +V6 during the duration of this timing impulse. By using rectifier cells of low forward resistance, for example germanium diodes, as rectifier elements 645, 646a, 650, 651 and 659 and by giving the resistance of resistor 652 a very high value as compared with the forward resistance of these cells, the voltage of terminal 647 is very nearly equal to —V5, in the absence of distorted input impulses.

The input and output circuits of the pentode 642 are so designed that the two phase-inverted trapezoidal impulses created in the secondary windings 662c and 662b by a distorted impulse have amplitudes substantially equal to V volts. As a result the output 618a of regenerator is brought by a positive output pulse to a potential substantially equal to zero volts. The rectifier cell 659 then prevents the short-circuiting of winding 662c by circuit 648, 651, 659, 658, 662c.

The circuits of the decimal operator or arithmetic element D of Fig. 8 will now be described with the support of Figs. 20 and 21. This operator consists of two conveniently connected binary adders OA and OB. The decimal operator can be used as a decimal adder or subtractor under the control of a voltage which is or not thereon impressed. The 8 cases of binary addition $[a+(b+c)]$ or $[a-(b+c)]$ of two binary terms $a$ and $b$ are indicated in the following table, wherein the binary carry-over, eventually resulting from an addition or subtraction made in the immediately lower binary order, is shown in the line $c$. In the three lower lines of this table are respectively recorded the sum or difference $d$, the addition carry-over $ra$, to be transmitted to the binary order of higher rank and the subtraction carry-over $rb$.

| | I | II | III | IV | V | VI | VII | VIII |
|---|---|---|---|---|---|---|---|---|
| a | 0 | 0 | 0 | 0 | 1 | 1 | 1 | 1 |
| b | 0 | 0 | 1 | 1 | 0 | 0 | 1 | 1 |
| c | 0 | 1 | 0 | 1 | 0 | 1 | 0 | 1 (carry-over). |
| d | 0 | 1 | 1 | 0 | 1 | 0 | 0 | 1 |
| ra | 0 | 0 | 0 | 1 | 0 | 1 | 1 | 1 |
| rb | 0 | 1 | 1 | 1 | 0 | 0 | 0 | 1 |

It is to be noted that $b$ and $c$ fulfil the same functions, so that it may in fact be considered that there are only six distinct cases, cases II and III on the one hand, VI and VII on the other hand being analogous. Moreover, the number B is assumed to be smaller than A in the following in order that the subtraction may give a positive result.

Fig. 20 is a circuit diagram of a binary adder-subtractor, which is provided with four inputs E$a$, E$b$, E$c$ E$s$. The inputs E$a$ and E$b$ respectively receive the positive impulses designated by $a$ and $b$ in the table shown hereinabove. The carry-over impulses are impressed on the input E$c$ and the positive pulses of the train A4 in Fig. 4 are impressed on the input E$s$ when a subtraction is being made, whilst this input is kept at a potential —V in case of addition. It is seen at first glance that the binary operator of Fig. 20 essentially consists of five gates, respectively enclosed in dash-and-dot rectangles, which are called upon to rout to one of the operator outputs D$_0$ and R, or eventually to both of them, the impulses that are thereon eventually applied by the said inputs.

The output D$_0$ is intended to deliver impulses representing the result $d$, whilst the output R delivers the carry-over impulses which correspond to the lines $ra$ and $rb$ of the hereinabove shown table.

The gates and buffers are designated by the letter A followed by the reference numeral of the corresponding resistance. The gates A662, A663, A664, A665, A666 are connected to the four aforesaid inputs by four impulse regenerators 667, 668, 669, 670 which are of the hereinabove described type. The inputs E$c$ and E$b$ are respectively connected to the inputs 671 and 672 of the regenerators 667 and 668 by a gate A675 and a buffer A674. The input E$a$ is connected to the gates A662, A663, A664, A665, A666 by the regenerator 669 and the input E$s$ is connected to the gates A665 and A666 by the regenerator 670. This input E$s$ is connected to the line 87, 86, 85 (Fig. 8), DON (Fig. 5).

The upper and lower outputs of each of the regenerators 667, 668, 669, 670 correspond respectively to the lower and upper outputs of the impulse regenerator of Fig. 18. It results therefrom that when one of these regenerators, the regenerator 667 for example, is in quiescent condition its outputs 667$a$ and 667$b$ have respectively the voltages zero and —V5 while they have potentials —V5 and zero volts in pulse transmitting condition. The operation of the adder-subtractor in addition and subtraction, in the Cases II to VIII of the table is the following:

*Case II.*—$a=b=o$ and $c=1$.

In case of addition the voltages of the outputs, designated by their reference numerals without discriminating symbol, are the following at the time of transmission of the regenerated carry-over pulse:

667$b$=668$a$=669$a$=670$a$=O$v$.
667$a$=668$b$=669$b$=670$b$=—V5.

The gate A664 transmits a positive pulse to the output D$_0$ through the buffer A676 and the gates A662, A663, A665, A666 are blocking.

In case of subtraction the simultaneous output voltages are the same as above, except that 670$a$=—V5 and 670$b$=O$v$. The gates A664 and A666 transmit positive impulses respectively to the outputs D$_0$ and R.

*Case III.*—$a=c=o$ and $b=1$.

The voltages of the outputs of the regenerators 667 to 670 are the same as in Case II, as well in addition as in subtraction, for the impulse applied by the input E$b$ or E$c$ in both cases traverses the regenerator 667. In Case III, therefore, the operation of operator is good.

*Case IV.*—$a=o$, $b=c=1$. The voltages of the regenerator outputs at the time of transmission of the regenerated pulses are as follows in case of addition:

667$b$=668$b$=669$a$=670$a$=O$v$.
667$a$=668$a$=669$b$=670$b$=—V5.

The gates A662 to A666 are blocked but a positive pulse sent by regenerator 668, reaches the regenerator 678 through the line 680, 681, and the buffer A677. The positive regenerated pulse propagates along the connection 682, 683, 684, E$c$ which comprises a delay line 682. The delay value of this line is $$\frac{a}{2}$$

$a$ designating the binary period. This result is conformable to the indications of the table. In subtraction the voltages of 670$b$ and 670$a$ are respectively equal to zero and —V5. As in the case of addition a positive pulse is transmitted to the regenerator 678 over the line 680, 681, A667 and another positive pulse reaches this regenerator through gate A666 and buffer A667.

The gates A662 to A665 are blocked. In consequence the operator operates well in the Case IV.

*Case V.*—$a=1$, $b=c=0$. In case of addition, the voltages of the regenerator outputs at the time of transmission of the regenerated pulse are the following:

667$a$=668$a$=669$b$=670$a$=0
667$b$=668$b$=669$a$=670$b$=—V5

The gate A662 transmits a positive pulse to the output D$_0$. The gates A663 to A666 are blocking. In case of subtraction all hereinabove given voltages remain unchanged, with the exception that 670$a$=—V5 and 670$b$=O$v$. The gate A662 is closed and all other gates open. The result is the same as in case of addition. All this is conformable to the indications of the table.

*Case VI.*—$a=c=1$, $b=0$. In case of addition, the voltages of the regenerator outputs are the following at the time of transmission of the regenerated pulse:

667$b$=668$a$=669$b$=670$a$=O$v$
667$a$=668$b$=669$a$=670$b$=—V5

The gate A665 is closed and the gates A662, A663, A664, A666 are blocking. A carry-over impulse is therefore transmitted to the terminal E$c$ through the line 678, 682, 683, 684. In subtraction the only change in the hereinabove enumerated voltages is the following: 670$a$=—V5, 670$b$=O$v$. Consequently the gate A665 is blocked by its lower input and the gate A666 is blocked by its median input. No impulse is transmitted by the operator in response to the two incoming pulses. The operation of the operator is therefore good.

*Case VII.*—$a=b=1$, $c=0$. This case is equivalent to Case VI because in both cases the regenerators 669 and 667 are excited and the regenerator 668 remains at rest.

*Case VIII.*—$a=b=c=1$. In case of addition, this corresponds to the following voltages, at the time of transmission of the regenerated pulses:

667$b$=668$b$=669$b$=670$a$=O$v$
667$a$=668$a$=669$a$=670$b$=—V5

A carry-over pulse propagates itself over the line 680, 681, 678, 682, 683, 684, E$c$ whilst the gate A663 transmits a positive pulse to the output D$_0$. In subtraction 670$a$=—V5 at the same time and 670$b$=O$v$. Despite this change a carry-over voltage is still transmitted by the line 680, 681, A677, 678.

These results are all conformable to the indications of the table.

The description of the decimal operator or arithmetic element D of the Fig. 21 will now be made. It essentially consists of two binary adders OA and OB of the type of Fig. 20, which are connected to one another by two connections. The first one transmits from OA to OB the binary sum or difference ($N1 \mp N2$) of two terms N1 and N2, expressed in the binary-coded decimal system heretofore employed. The second connection comprises a comparator D1, which is called upon to compare to 9 the result R of the binary addition or subtraction executed by the operator OA in each decimal period. Obviously, in subtraction, this result can be equal to or greater than 10 only when a decimal digit $n1$ of $N1$ is smaller than the corresponding decimal digit $n2$ of $N2$. For example, the result of the subtraction $(0-1)$, where $n1=0$, is $1+2+4+8=15$ is the binary adder OA, as is shown by the table hereinbefore reproduced. This subtraction creates a binary carry-over which becomes a decimal carry-over when it enters the adder OA.

Every time $R \geqslant 10$ the comparator D1 introduces two pulses in the operator OB over the said second connection. These pulses represent the binary components 2 and 4. If a sum $x$ equal or superior to 10 is obtained at the output of the adder OA, this sum is transformed into a decimal figure, by adding 6 and subtracting 16, since $x+6-16=x-10$. This subtraction of 16 is executed when a carry-over pulse of value 1 is not introduced in the next higher decimal order.

On the other hand, if a difference equal to or greater than 10 is obtained at the output of the adder OA this difference is transformed into a decimal figure by subtracting 6 from it. By way of example, if the adder OA delivers the difference 15, the adder OB delivers $15-6=9$ and this result is correct since $0-1=9$ in a decimal order when a decimal carry-over is introduced in the next higher denominational order. As has been said the decimal operator of Fig. 21 gives a correct result in subtraction only when $N1 > N2$. The adder OA schematically represented by a rectangle has the internal arrangement shown by Fig. 20. Its four inputs E$c$, E$b$, E$a$, E$s$ correspond therefore respectively to the inputs of same denomination in Fig. 20. Its output 685 can deliver pulses representing binary sums or differences while its output 686 can deliver carry-over pulses. The latter are applied on the input E$c$ through the connection 686, 687, 689, 690, 691, E$c$ which comprises a delay line 688, whose delay value is $0.5a$, a buffer 689 and a pulse regenerator 690, which is similar to the one of Fig. 18, as are all those in Fig. 21. The regenerator 690 can deliver positive pulses at its upper output.

The binary adder OB is identical to the adder OA. It has four inputs E$c1$, E$b1$, E$a1$, E$s1$. The input E$a1$ is connected to the output 685 of the adder OA through the line 685, 692, 693, 694 which includes an impulse regenerator 692 and a delay line 694, whose delay value is $2.5a$. The input E$b1$ is connected to the output of the comparator D1 through the line 695, 696, 697 which includes a delay line 696, whose delay value is $0.25a$. The inputs ES and ES1 of OA and OB are both connected to the line 87—DON of Figs. 8, 7 and 5. The input E$c1$ can receive carry-over pulses which are emitted by the output 698 of the adder OB and transmitted over the connection 698, 699, 700, E$c1$. This connection comprises a pulse regenerator 700 and a delay line 699, whose delay value is $0.5a$. The upper output 701 of the adder OB can deliver pulses which represent $(N1 \pm N2)$ in the binary-coded decimal system under the assumption hereinabove formulated.

The comparator D1 receives the pulses delivered by the output 685 of the adder OA through a channel 685, 692, 693, 701, 702, 703, 704$a$ which, at point 702, is provided with a branch 702, 705, 706, 707, 708, 704$b$. The extremities 704$a$ and 704$b$ of the channel and branch are the inputs of a gate 704, whose resistance 704$c$ permanently brought to the potential $+V_1$ of the source 613 of Fig. 18 by a connection not represented. The branch 702, 705, 706, 707, 708 comprises two delay lines 705, 707, whose delay value is $a$, and a buffer 708. The output of the gate 704 is connected to the lower input of a buffer 713 through a pulse regenerator 709. The upper input of this buffer is connected to the carry-over output 686 of the adder OA by the line 687, 710, 711, 712 which comprises a pulse regenerator 712 and a delay line 710, whose delay value is $0.25a$. An output of this buffer 713 is connected by the line 713, 714, 689 to the buffer 689, which is inserted in the circuit of the carry-over pulses of the adder OA.

Another output 713$a$ of this buffer 713 is connected through two branches to the two inputs 695$a$ and 695$b$ of a buffer 695, which can deliver pulses to the adder OB, as has been said hereinabove. One of said two branches, the branch 715, 716 comprises a delay line 716, whose delay value is $a$. The regenerators 690 and 692 are excited by timing pulses, which are supplied by a line 717, 718, 719, 720 to a primary winding 721$a$ of a pulse transformer 721. The latter is provided with a second primary winding 721$b$, which is connected by the line 722, 723, 724, 725 to the output of a gate not represented, which can deliver pulses identical to the timing pulses A4 at instants $p/8/4$. It has been said hereinabove, in relation with Fig. 8, that at instants $p/1/4$ the operator can receive pulses whose value is $1 \times 10^n$ with the code adopted, the exponent $n$ being variable from zero to 11. The two windings 721$a$, 721$b$ are identical, but wound in inverted senses. When both of them receive a timing pulse they develop no inductive voltage in the secondary winding, which normally excites the regenerator 700.

The regenerators 709 and 712 of comparator D1 are excited by pulses transmitted through the line 725, 724, 726, 727, 728. They are delayed by $0.75a$ by means of the delay line 726, and reach these regenerators at times $p/8/3$.

In conformity with what has been said about the role imparted to the comparator D1 it can be understood that the line 686, 687, 710, 711, 712 permits the comparator to sense the carry-over pulses of value 16 which can leave the operator OA at times $(t1+0.25a)$, $(t1+4.25a)$, $(t1+n.4a+0.25a)$ with $t_1 = 1/8/4$. These pulses are delayed by the delay line 710 and regenerated by the regenerator 712.

It can also be understood that the line 693, 701, 702 and the two branches linking the terminal 702 with the gate 704 permit the regenerator 709 to transmit a pulse every time the operator has received, for a given decimal period, an impulse of value 2 or 4 and a pulse of value 8. In the latter case the adder OA does not deliver a decimal carry-over pulse at its output 686. This carry-over pulse is transmitted to its input E$c$ by the line 713, 714, 689, 690, 691. Every time a positive pulse traverses the buffer 713, the digit 6 must be introduced in form of two pulses into the adder OB. The said pulses traverse the buffer 695 and reach the adder OB through the delay line 696. Supposing a pulse of value 8 leaves the output 685 of the adder OA at a time $(t1+p.4a+0.25a)$, it arrives at the input E$b1$ of OB at the time $$t1+p.4a+0.25a+0.25a+0.25a+0.25a = t1+(4p+1)a$$

by reason of its traversing the elements 692, 709, 696. If, in the corresponding decimal period, a pulse of value 2 leaves the output 685 of adder OA, it reaches the input E$a1$ of adder OB at the time $$t1+p.4a-2a+0.25a+0.25a+2.5a = t1+(4p+1)a$$

The said impulse of value 8, which traverses the gate 704 of comparator D1, has therefore the value 2 with respect to those which propagate along the channel 685, 692, 694, E$a1$. The pulse derived therefrom by the delay line 716 of D1 has the relative value 4 on reaching the adder OB. If a carry-over pulse of value 16 is produced by the adder OB during the operation discussed it is sent by the output 698 of this adder at a time $$t1+(4p+1)a+2a+0.25a = t1+p.4a+3.25a$$

After having traversed the delay line 699 and the pulse regenerator 700, it should reach the input E$c1$ of adder OB at the time $$T = t1+p.4a+3.25+0.75a = t1+(p+1)4a$$

It is seen that the regenerator 700 must not be excited at time T for, as has been said hereinabove, this carry-over pulse of value 16 must be blocked. Now, at time T, the windings 721$a$ and 721$b$ received simultaneously a timing pulse and no exciting pulse is sent into the regenerator 700 by the secondary winding. The latter is connected to the terminal 653a of the source 653 represented in Fig. 18. The operation of the decimal operator of Fig. 21 is therefore good in all cases.

The Fig. 22 shows a circuit diagram of the comparator E of Figures 1, 2 and 8. In Fig. 8 this arrangement is partially represented by the input gates 114, 113, 195, 124, the rectangle E and the circuit part 125, 126, 127, 128. Identical elements in Figures 8 and 22 bear the same reference numbers.

Accordingly the channel 48 (Fig. 6), 54 (Fig. 8) which connects the memory M3 to the comparator E is located in the left-hand lower corner of Fig. 22. It is connected to the gate 124 (Fig. 8). The upper input of gate 195 is connected to delay element 201 (Fig. 7) to receive impulses of value 1. The channel 17, 25, 26 of Fig. 8 is drawn in Fig. 22. It is connected to the gates 113 and 114. During multiplications, gates 114 and 195 are put in transmitting condition because their lower inputs are connected to line MON (Fig. 5). These gates are in a blocking condition during a division. Gates 124 and 113 are put in a transmitting condition during divisions because their upper inputs are connected to line DON (Fig. 5.). These gates are in a blocking condition during a multiplication.

The outputs of the gates 113 and 114 are connected to a pulse regenerator 733 through a buffer 734, whilst the outputs of the gates 124 and 195 are connected to a pulse regenerator 735 through a buffer 736.

The pulses simultaneously sent by the regenerators 733 and 735 are routed to a gate 737 and a buffer 738. The gate 737 is itself connected to an input of a buffer 739, which is part of a circulating memory 739, 126, 127, 128 740, 741, whose pulse travel time is equal to a binary period $a$. This memory includes a pulse regenerator 126 (Fig. 8) a delay line 740, whose delay value is $0.75a$ and a gate 741, whose input 741a is connected to the output of the buffer 738. The input 741c of the said gate is connected to an input of gate 129 (Fig. 7). This connection permits to deliver to gate 741 negative reset pulses at times $1/1/2, 13/1/2, \ldots (1+n.12)/1/2$ which coincide respectively with the beginnings of the successive cyclic comparisons effected during the divisions.

The examination of Fig. 22 will now permit explaining the operation of the comparing device of Fig. 8. During a division, if the divisor N2 is greater than the left part N1 of dividend, a positive impulse is always obtained at the terminal 127 of the circulating memory 729, 126, 128, 740 at the end of the comparison of the two numbers, while a voltage $-V$ is obtained at 127 if N2 is equal to or less than N1. Among the various cases possible, the four following ones, which concern the last digits on the right of the numbers N1 and N2, will now be examined:

(A) The first digit on the right $n1$ of number N1 is even, while the first digit on the right $n2$ of N2 is odd, so that the first numerical impulse arriving in the comparing device is fed by channel 48, 54.

(B) The digit $n1$ is odd, digit $n2$ is even so that this first impulse is led by channel 17, 25.

(C) Digit $n1$ is even and $n2$ is equal to one, so that the first impulse arriving by channel 48, 54 is followed, before the end of the first decimal period, by at least one impulse arriving by channel 17, 25.

(D) Digits $n1$ and $n2$ are equal.

In the first case, the first numerical impulse passes at time $1/1/1$ through the gate 124 and is then transmitted to regenerator 735 by the buffer 736.

The negative flat-topped impulse provided by the lower output of regenerator 735 has a voltage level which is equal to $-V$. It is blocked at time $1/1/2$ by the buffer 732. At the same time a negative impulse sent by regenerator 742 blocks the impulse eventually circulating in the said memory.

The positive impulse of the regenerator 735 has a crest voltage equal to zero; it passes through the rectifier cell 737a of gate 737, because the output 733a of the regenerator 733 is at a zero potential.

This impulse penetrates into the circulating memory 739, 126, 127, 128, 740, 741. It is regenerated in regenerator 126 which receives the timing impulses A3, then crosses delay line 740 and circulates in the memory as long as it is not blocked by the gate 741.

In the second case, the first impulse passes through the gate 113, the buffer 734, and penetrates into the regenerator 733. This regenerator provides a negative impulse at its output 733a, which brings it to the same voltage $-V5$ as the upper output of regenerator 735, and leaves in two directions.

In one of these directions, it passes through gate 737 but does not modify the voltage $-V$ of the input of the memory. It is therefore not regenerated by the regenerator 126.

In the other direction, the negative impulse passes through buffer 738 and the potential of the input 741a of gate 741, which was previously equal to zero volt, is made equal to $-V$. The gate 741 can therefore block a positive impulse arriving at the same instant at its input 741d.

In the third case, the first numerical impulse arriving by way of channel (48, 54) is followed at a time $t1$, whose value is at most equal to $1/1/1+3a$, by another positive numerical impulse arriving by way of channel 17, 25. As in the second case, a regenerated negative impulse reaches the gate 741 at a time $t1+0.25a$, when the impulse previously put into circulation in the aforementioned loop by the first numerical impulse reaches it.

The gate 741 therefore blocks this circulating impulse and, as in the second case, the negative impulse provided by regenerator 733 is not able to penetrate into the memory.

At the end of the comparison of $n1$ and $n2$, there will therefore be no impulse in the circulating memory.

In the fourth case, the impulses arriving simultaneously by way of channels 17, 25 and 48, 54 are regenerated by regenerators 733 and 735 respectively. Each positive impulse issuing from the upper output of regenerator 735 is blocked by the gate 737, of which the single output is brought to potential $-V5$ by the simultaneous negative impulse issuing from regenerator 733.

The aforementioned positive impulse reaches the input 741a of gate 741 through the buffer 738, and if a positive impulse is then in circulation in the memory, it arrives at the same instant at the input 741d of the gate, and passes through the latter, since its other inputs are held at a zero potential.

It is now evident that if the number N2 is greater than N1, a positive impulse called final, is supplied by the output 127, at the end of the last decimal period of the comparison of these two numbers. The sending of a negative impulse, at time $13/1/2$, on the input 741c of the gate 741 when this final impulse reaches the input 741d, allows for the blocking of it, and for the resetting of the comparing device to zero, before beginning of new comparison. The use of gate 129 of Fig. 7 in the operation of the calculating machine is indicated hereinabove. The explanations already given about the operation of the comparator enable to understand how it works in multiplication, when the digits of increasing order of the multiplier are fed into the comparator through the channel 17, 25 and are successively compared to the digit one, represented by impules $n/1/1$, transmitted by the channel 165, 195. At the beginning of each comparison, the negative pulse issued by the regenerator 735 traverses the buffer 732 and blocks the gate 741, at the time when it is reached by the impulse eventually circulating in the memory in consequence of the last comparison. The positive impulses sent at the instants $0/8/3, 12/8/3 \ldots (12+n.12)/8/3$ on the input 129a of gate 129 of Figure 7 permit to take in account only the comparison with one of the unit digits of the multiplier.

It will be obvious that the invention is not limited to the embodiments hereinbefore described, and that numerous modifications may be made to these arrangements without departing from this invention.

With the aid of easily realizable commutation devices, it is possible to record the numbers stored in one or the other of the two calculator memories, at will, with the aid of a single extraction device, of the type represented in Figures 14 and 15.

Moreover, the use of commutation means similar to device 201 of Fig. 5 cooperating with the inputs and outputs of operator D and memories M1, M2 and M3 allows for the execution of the addition or subtraction of numbers previously introduced into the memories, in such a way as to then execute the multiplications or divisions of which the terms are of the form $(A \pm B)$ and $(C \mp D)$.

Without leaving the domain of the invention, it is also possible to replace the delay lines by mercury tanks, where the impulses are displaced at the rate of about 1,450 meters per second. The transformation of electric impulses into plane waves, changing place in liquids, is then brought about in a known manner. Other known devices permit maintaining the mercury at a sufficiently constant temperature for preventing any perceptible variation in the speed of the waves which are being propagated.

What we claim is:

1. Electronic digital computer for calculating the product of a multiplicand by a multiplier, these product and factors being represented in the binary-coded decimal notation by serial pulse trains, comprising three pulse circulating memories, the first initially storing a multiplier, the second for constituting a product, the third initially storing a multiplicand, each of said memories including pulse regenerator devices and delay networks adjusted to a pulse travel time, or "memory cycle" which corresponds to $n$ coded decimal digits, an input terminal and an output terminal, a tap substantially one decimal-digit position before said output terminal said first and second memories having each an input element whose travel time corresponds to one decimal digit period, said input element of said first memory being formed by a binary 1-subtracting device with a separately accessible input; a pulse source for supplying timed pulses of value 1; a comparing device including a pulse circulating loop and connected to said tap of said first memory and to said pulse source for continuously comparing to 1 the successive digits of the multiplier from the pulses circulating in the first memory, the comparing device having an output for delivering at the end of a memory cycle a control signal when the least significant digit of the multiplier is smaller than 1 or causing a 1-representing pulse to be applied from said source to said separately accessible input of said 1-subtractor device when it has detected that the least significant digit of the multiplier is equal to or greater than 1; a decimal adder with two inputs respectively connected to said taps of said second and third memories, and an output terminal for delivering the decimal sum of the values represented by the pulses circulating in both memories; a coincidence circuit which can operatively connect the output terminal of said adder to the input terminal of said second memory, a series of gating circuits which can, on the one hand, connect the output of said second memory to the input of said first memory, and on the other hand, exclude the input element from the recirculation path of each of these memories; operating phase selector means comprising a number of pulse generators for supplying pulse trains synchronized with said memory cycle, these means being connected to be controlled by said comparing device and to control accordingly the conditions of said coincidence circuit and of said series of gating circuits so that, as long as said control signal is not emitted at the end of a memory cycle by the comparing device, one of said generators supplies one or several pulse trains which cause the progressive formation of a partial product by the addition of the multiplicand in said second memory, whereas if said control signal is emitted, other generators in said means are set into operation during a following memory cycle in the course of which the least significant digit of the partial product is transferred from said second memory to said first memory, and then the partial product and the multiplier, or its remainder, are each time shifted by a decimal position toward the least significant positions in said second and first memories respectively.

2. Electronic digital computer as claimed in claim 1, wherein said other pulse generators include a second generator and a third generator, each with a pulse circulation loop; and comprising a second coincidence circuit controlled by said comparing device and connected to transmit said control signal to said second generator for starting the latter into operation at the outset of the following memory cycle, connections and resetting means, arranged to limit the operation of said second generator to a first decimal period, to start then the third generator into operation and stop the operation of the latter after $n-1$ decimal periods.

3. Electronic digital computer as claimed in claim 2, wherein some gating circuits of said series are controlled by said second generator when operative, so that each of said second and first memories are open-circuited during said first decimal period, and other gating circuits of said series are controlled by said third generator when operative so that, in each of said second and first memories a separate closed circulation loop includes the input element and another closed circulation loop includes the other elements during the following $n-1$ decimal periods.

4. Electronic digital computer as claimed in claim 2, comprising an electronic counter provided with an input and pulse storing members such that the numerical capacity of the counter be at least equal to said number $n$; a connection from said second coincidence circuit for transmitting said control signal to the input of said counter which counts the numbers of said signals and thus stores the numbers of shift phases effected, and number detecting means associated to said counter and controlling said gating circuits for preventing the operation of said phase selector means to stop the multiplication as soon as said counter stores a number equal to $n$.

5. Electronic digital computer for calculating the quotient of a dividend divided by a divisor, these quotient and factors being represented in the binary-coded decimal notation by serial pulse trains, comprising three pulse circulating memories, the first for constituting a quotient, the second and third memories initially storing a dividend and a divisor respectively, each of said memories including pulse regenerator devices and delay networks adjusted to a pulse travel time or "memory cycle" which corresponds to $n$ coded decimal digits, an input terminal and an output terminal, said second and third memories each having a tap substantially one decimal digit position before its output terminal and said first memory having an input element whose travel time corresponds to one decimal digit period and which is formed by a binary 1-adder with a separately accessible input; a decimal subtractor having two inputs respectively connected to said taps of said second and third memories, and an output terminal for delivering the decimal difference of the values represented by the pulses circulating in both memories; a first coincidence circuit which can operatively connect the output terminal of said decimal subtractor to the normal input of said second memory; a comparing device including a pulse circulating loop and connected to the normal inputs of said second and third memories for comparing, from the pulses circulating in these memories, the relative magnitudes of the division factors, said comparing device supplying at the end of a memory cycle a control signal when the dividend is smaller than the divisor, or causing a 1-representing pulse to be applied to said separate input of said 1-adder device when it has detected that the dividend is equal to or greater than the divisor; additional time delay elements each corresponding to one decimal position; a series of gating circuits which can alter the normal structure of said second and first memories by inserting therein one of said additional elements; operating phase selector means comprising a number of pulse generators for supplying pulse trains synchronized with said memory cycle, these means being connected to be controlled by said comparing device and to control the conditions of said series of gating circuits and of said coincidence circuit so that, when said control signal has been emitted by sad comparing device a group of said generators is set into operation during a following memory cycle in the course of which the dividend is time shifted by one decimal position toward the most significant denominations in said second memory, whereas if said control signal is not emitted at the end of a memory cycle, another generator in said means is set into operation during one, or several following memory cycles whereby the remainder of the subtraction: left-hand part of the dividend-divisor, or dividend remainder-divisor, is entered in said second memory while a "1" for the most significant digit of the quotient is added by the input element of said first memory, this most significant digit being increased by one unit at each subtraction of the divisor.

6. Electronic digital computer as claimed in claim 5 wherein said group of pulse generators comprises a first and a second generator, each with a pulse circulation loop; and including a second coincidence circuit controlled by said comparing device and connected to transmit said control signal to said first generator for starting the latter into operation at the outset of the following memory cycle, connections and resetting means arranged to limit the operation of said first generator to a first decimal period, to start then the second generator into operation and stop the operation of the latter after $n-1$ decimal periods.

7. Electronic digital computer as claimed in claim 6, wherein some gating circuits of said series are controlled by said first generator when operative, so that in each of the said second and first memories, only the input of said additional element is operatively connected with the output of the memory during the first decimal period of said memory cycle, and other gating circuits of the same series are controlled by said second generator being operative so that each of said second and first memories forms a closed loop of $n+1$ decimal positions during the $n-1$ decimal periods of the same cycle.

8. Electronic digital computer for calculating the quotient of a dividend divided by a divisor, these quotient and factors being represented in the binary-coded decimal notation by serial pulse trains, comprising first, second and third pulse circulating memories for initially storing the right hand part and the left-hand part of a dividend and a divisor respectively, each of said memories including pulse regenerator devices and delay networks adjusted to a pulse travel time or "memory cycle" which corresponds to $n$ coded decimal digits, an input terminal and an output terminal, said second and third memories each having a tap substantially one decimal digit position before its output terminal and said first memory having an input element whose travel time corresponds to one decimal digit period and which is formed by a binary 1-adder with a separately accessible input; a decimal subtractor having two inputs respectively connected to said taps of said second and third memories, and an output terminal for delivering the decimal difference of the values represented by the pulses circulating in both memories; a first coincidence circuit which can operatively connect the output terminal of said decimal subtractor to the normal input of said second memory; a second coincidence circuit which can connect the output of said input element of said first memory to the input terminal of said second memory; a comparing device including a pulse circulation loop and connected to the input terminals of said second and third memories, for comparing from the pulses circulating in both memories, the relative magnitudes of the dividend left-hand part and of the divisor, said comparing device delivering at the end of a memory cycle a control signal when the left-hand part of the dividend is smaller than the divisor, or causing a 1-representing pulse to be applied from said source to said separately accessible input of said binary 1-adder when it has detected that the left-hand part of the dividend is equal to or greater than the divisor; additional time delay elements each corresponding to one decimal position; a series of gating circuits which can alter the normal structure of said second and first memories by inserting therein one of said additional elements; operating phase selector means comprising a number of pulse generators for supplying pulse trains synchronized with said memory cycle, these means being connected to be controlled by said comparing device and to control the conditions of said series of gating circuits and of said first and second coincidence circuits so that, when said control signal has been emitted by said comparing device a group of said generators is set into operation during a following memory cycle in the course of which, on the one hand the most significant digit of the right-hand part of the dividend is transferred from the first to the second memory, and on the other hand, the left-hand and right-hand parts of the dividend are time shifted by one decimal position toward the most significant denominations respectively in said second and first memories, whereas if said control signal is not emitted at the end of a memory cycle, another generator in said means is set into operation during one, or several following memory cycles during which the remainder of the subtraction = left-hand part of the dividend-divisor, or partial remainder of the dividend-divisor, is entered in said second memory, while a "1" for the most significant digit of the quotient is stored in the units denomination element of said first memory, the most significant digit of the quotient being increased by one unit at each subtraction of the divisor.

9. Electronic digital computer as claimed in claim 8 wherein said group of pulse generators includes first and second generators, each with a pulse circulation loop; and including a third coincidence circuit controlled by said comparing device and connected to transmit said control signal to said first generator for starting the latter into operation at the outset of the following memory cycle, connections and resetting means arranged to limit the operation of said first generator to a first decimal period, to start then the second generator into operation and stop the operation of the latter after $n-1$ decimal periods.

10. Electronic digital computer as claimed in claim 9, wherein some gating circuits of said series are controlled by said first generator when operative, so that in each of said second and first memories, only the input of said additional element is operatively connected with the output of the corresponding memory during the first decimal period of said memory cycle, and the other gating circuits of the same series are controlled by said second generator being operative so that in each of the second and first memories the output of said additional element is operatively connected to the normal input of the corresponding memory to form a closed loop of $n+1$ decimal positions during the $n-1$ decimal periods of the same cycle.

(References on following page)

References Cited in the file of this patent

UNITED STATES PATENTS

| | | |
|---|---|---|
| 2,377,762 | Daly | June 5, 1945 |
| 2,404,047 | Flory | July 16, 1946 |
| 2,409,689 | Morton | Oct. 22, 1946 |
| 2,445,215 | Flory | July 13, 1948 |
| 2,502,360 | Williams | Mar. 28, 1950 |
| 2,558,941 | Durfee | July 3, 1951 |
| 2,575,331 | Compton | Nov. 20, 1951 |
| 2,604,262 | Phelps | July 22, 1952 |
| 2,609,143 | Stibitz | Sept. 2, 1952 |
| 2,623,115 | Woods-Hill | Dec. 23, 1952 |
| 2,623,171 | Woods-Hill | Dec. 23, 1952 |
| 2,624,507 | Phelps | Jan. 6, 1953 |
| 2,624,508 | Dickinson | Jan. 6, 1953 |
| 2,629,827 | Eckert | Feb. 24, 1953 |
| 2,685,409 | English | Aug. 3, 1954 |
| 2,686,632 | Wilkinson | Aug. 17, 1954 |
| 2,701,095 | Stibitz | Feb. 1, 1955 |
| 2,718,356 | Burrell | Sept. 30, 1955 |

OTHER REFERENCES

A Functional Description of the EDVAC Moore School, Univ. of Pa. 1949, vol. I, pages 1–8; 4–18 to 4–29; 4–35 to 4–38; vol. II, Fig. 104–3LC–5, Fig. 104–3LD–2, Fig. 104–6LC–1, Fig. 104–10LD–6.

Progress Report, "24 Digit Parallel Computer with Magnetic Drum Memory" by ERA Inc., 1949, vol. I, pages 7 to 11; vol. II, Fig. 3.2–2.

"Journal of Scientific Instruments and of Physics in Industry" "The EDSAC" by Wilkes, pages 385–391, Dec. 1949.

Proc. Inst. of EE (British), "Universal High Speed Digital Computer: A Small Scale Experimental Machine" by Williams, pages 13–34, February 1951.

UNITED STATES PATENT OFFICE
Certificate of Correction

Patent No. 2,863,604                                                   December 9, 1958

Bruno M. J. Leclerc et al.

It is hereby certified that error appears in the printed specification of the above numbered patent requiring correction and that the said Letters Patent should read as corrected below.

Column 12, lines 45 and 46 should read as follows instead of as in the patent—

It is also to be noted that memory M1 can be operatively connected to two inputs 25 and 26 (Fig-column 34, line 39, after "$n$," and before "varying" insert —$n$—; column 35, line 7, for "3/8/4+" read —13/8/4+—.

Signed and sealed this 14th day of April 1959.

[SEAL]

Attest:
KARL H. AXLINE,
*Attesting Officer.*

ROBERT C. WATSON,
                                                                                  *Commissioner of Patents.*